US008687725B2

(12) United States Patent
Mihoto

(10) Patent No.: US 8,687,725 B2
(45) Date of Patent: Apr. 1, 2014

(54) WIRELESS TRANSMISSION SYSTEM, WIRELESS COMMUNICATION DEVICE AND WIRELESS TRANSMISSION METHOD

(75) Inventor: Norihito Mihoto, Saitama (JP)

(73) Assignee: Sony Corporation, Tokyo (JP)

( * ) Notice: Subject to any disclaimer, the term of this patent is extended or adjusted under 35 U.S.C. 154(b) by 370 days.

(21) Appl. No.: 12/805,875

(22) Filed: Aug. 23, 2010

(65) Prior Publication Data

US 2011/0075747 A1    Mar. 31, 2011

(30) Foreign Application Priority Data

Sep. 29, 2009   (JP) .................................. 2009-223683

(51) Int. Cl.
*H04B 7/04* (2006.01)
*H04B 1/40* (2006.01)
*H04L 1/02* (2006.01)

(52) U.S. Cl.
USPC .............................. 375/267; 455/500; 455/88

(58) Field of Classification Search
USPC .................. 375/259, 260, 267; 370/277, 278, 370/280–282, 310; 455/17, 22, 24, 25, 500, 455/63.4, 88, 553.1
See application file for complete search history.

(56) References Cited

U.S. PATENT DOCUMENTS

| 6,348,891 | B1 * | 2/2002 | Uemura ........................ 342/413 |
| 6,608,875 | B1 | 8/2003 | Wolaver |
| 2002/0080897 | A1 | 6/2002 | Main et al. |
| 2002/0191535 | A1 * | 12/2002 | Sugiyama et al. ............ 370/208 |
| 2005/0226355 | A1 | 10/2005 | Kibune et al. |
| 2007/0132521 | A1 | 6/2007 | Lee et al. |
| 2008/0285686 | A1 * | 11/2008 | Beaulieu et al. ............... 375/329 |
| 2009/0041149 | A1 | 2/2009 | Sarris et al. |

FOREIGN PATENT DOCUMENTS

| EP | 1 484 843 A1 | 12/2004 |
| EP | 1 821 418 A2 | 8/2007 |
| JP | 2003-179516 A | 6/2003 |
| JP | 2003-244016 A | 8/2003 |
| JP | 2005-303607 A | 10/2005 |
| JP | 2007-228499 A | 9/2007 |
| JP | 2008-535272 A | 8/2008 |
| JP | 2008-252566 A | 10/2008 |
| JP | 2008-271188 A | 11/2008 |

(Continued)

OTHER PUBLICATIONS

Extended European Search Report issue Mar. 16, 2012 for corresponding European Application No. 10 17 3823.

(Continued)

*Primary Examiner* — Young T. Tse
(74) *Attorney, Agent, or Firm* — Rader, Fishman & Grauer PLLC

(57) ABSTRACT

Disclosed herein is a wireless transmission system. Transmission antennas are provided on a first communication apparatus while reception antennas individually corresponding to the transmission antennas are provided on a corresponding second communication apparatus. Each reception antenna receives a desired wave from a corresponding transmission antenna as a direct wave and receives an unnecessary wave from a different transmission antenna as a direct wave. The first communication apparatus modulates only the amplitude of a carrier signal for all channels. The second communication apparatus demodulates composite waves of desired waves and unnecessary waves received by the reception antennas by envelope detection or square-law detection and carries out correction operation for the demodulation signals based on transmission characteristics of transmission spaces between the transmission and reception antennas to acquire transmission subject signals.

17 Claims, 21 Drawing Sheets

(56) References Cited

FOREIGN PATENT DOCUMENTS

| | | |
|---|---|---|
| JP | 2008-541639 A | 11/2008 |
| JP | 2009-033588 | 2/2009 |
| JP | 2009-049632 | 3/2009 |
| JP | 2009-055228 | 3/2009 |
| JP | 2009-182894 A | 8/2009 |
| JP | 2009-246764 A | 10/2009 |
| JP | 4708241 B2 | 6/2011 |
| WO | WO-01/58018 A2 | 8/2001 |
| WO | WO-2009/017230 A1 | 2/2009 |
| WO | WO-2009/026400 A1 | 2/2009 |

OTHER PUBLICATIONS

Japanese Office Action issued Aug. 13, 2013 for corresponding Japanese Application No. 2009-200118.
Japanese Office Action issue Oct. 22, 2013 for corresponding Japanese Application No. 2010-011360.
Chinese Office Action issued Nov. 4, 2013 for corresponding Chinese Application No. 201080048039.0.
Chinese Office Action issued Dec. 4, 2013 for corresponding Chinese Application No. 201080048039.0.

* cited by examiner

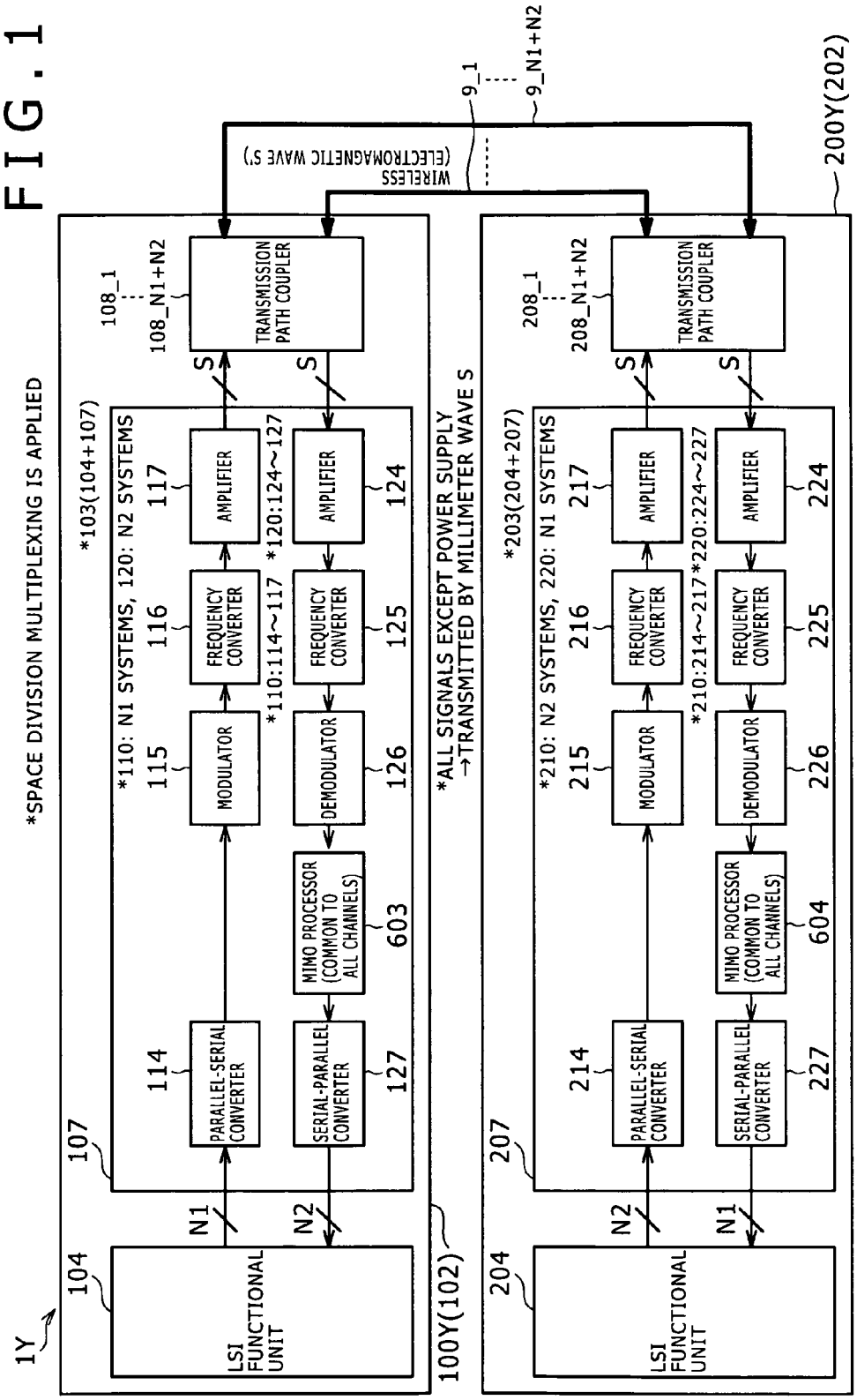

FIG. 3A
$$L\,[dB] = 10\log_{10}((4\pi d/\lambda)^2) \quad \cdots(A)$$
$$d_2/d_1 = 10^{(DU/20)} \quad \cdots(B)$$
FIG. 3B
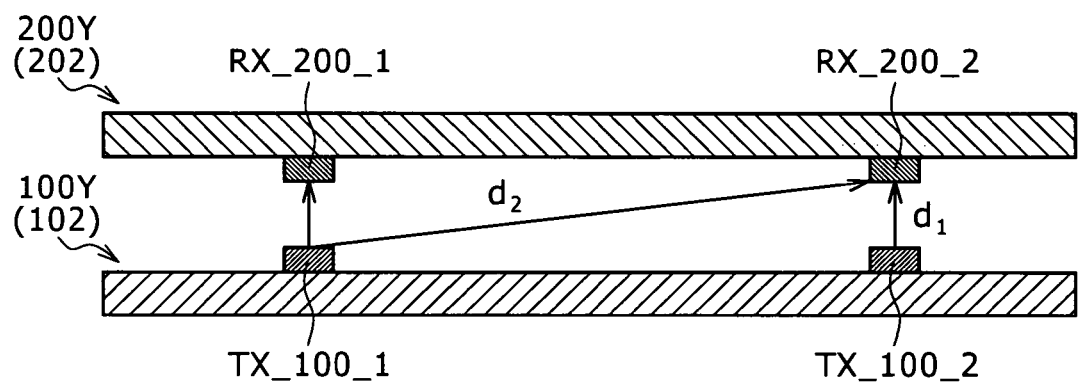
FIG. 3C
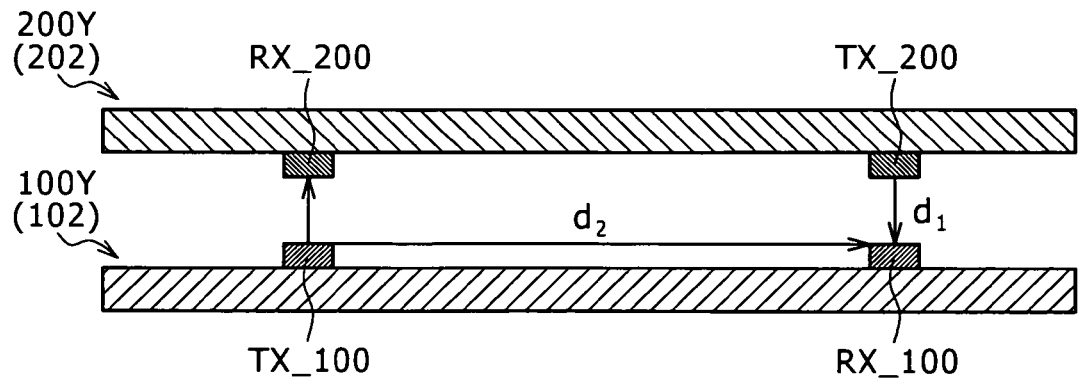

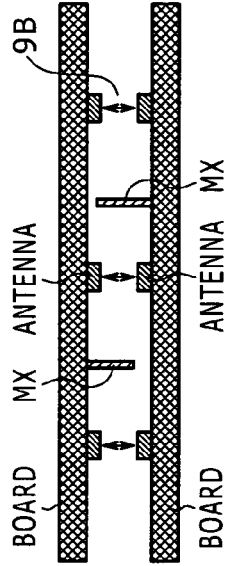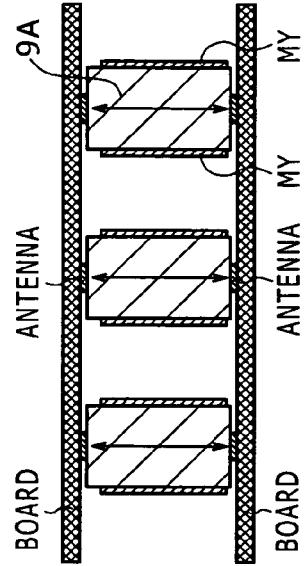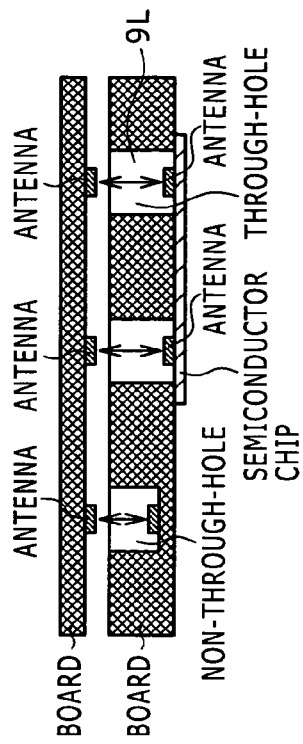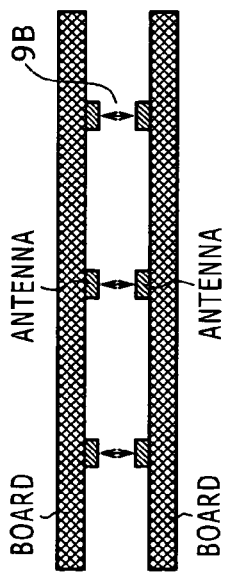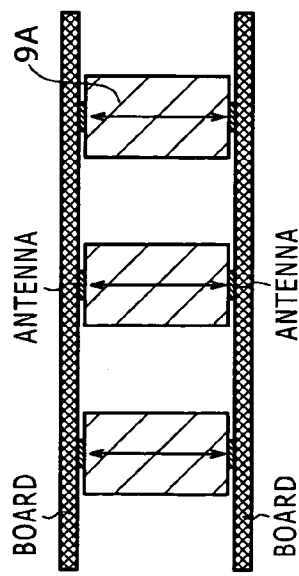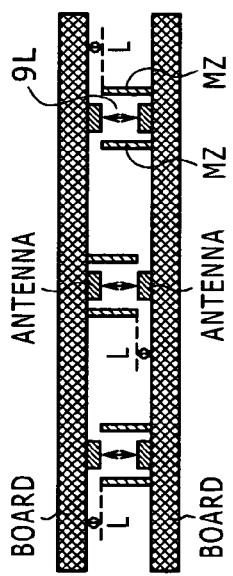

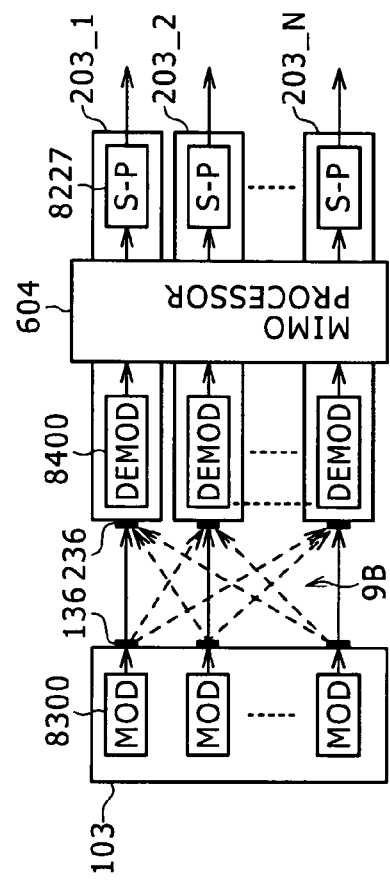
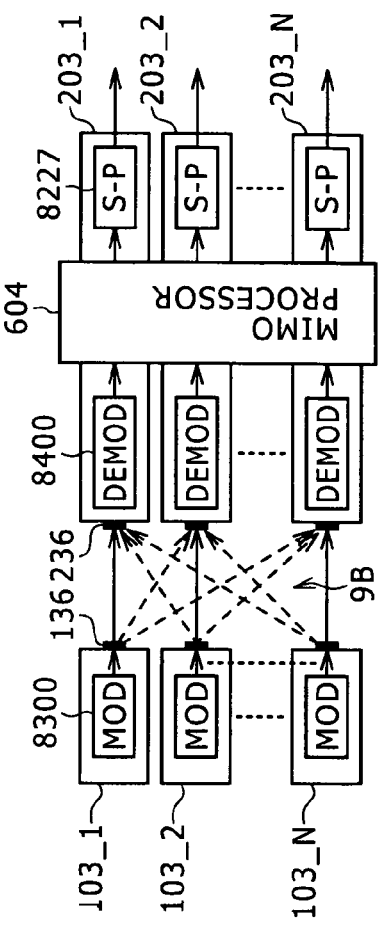
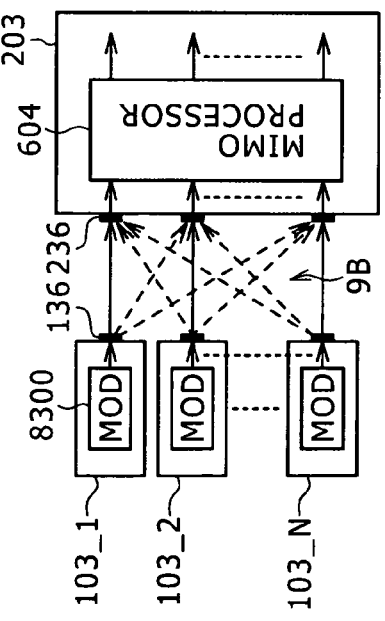
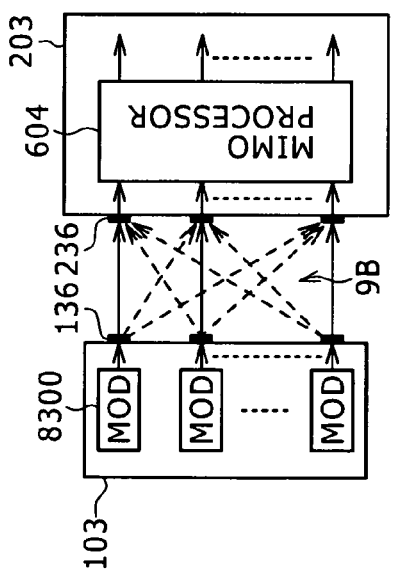

$$\hat{s} = H^{-1}r = H^{-1}Hs + H^{-1}v = s + H^{-1}v$$

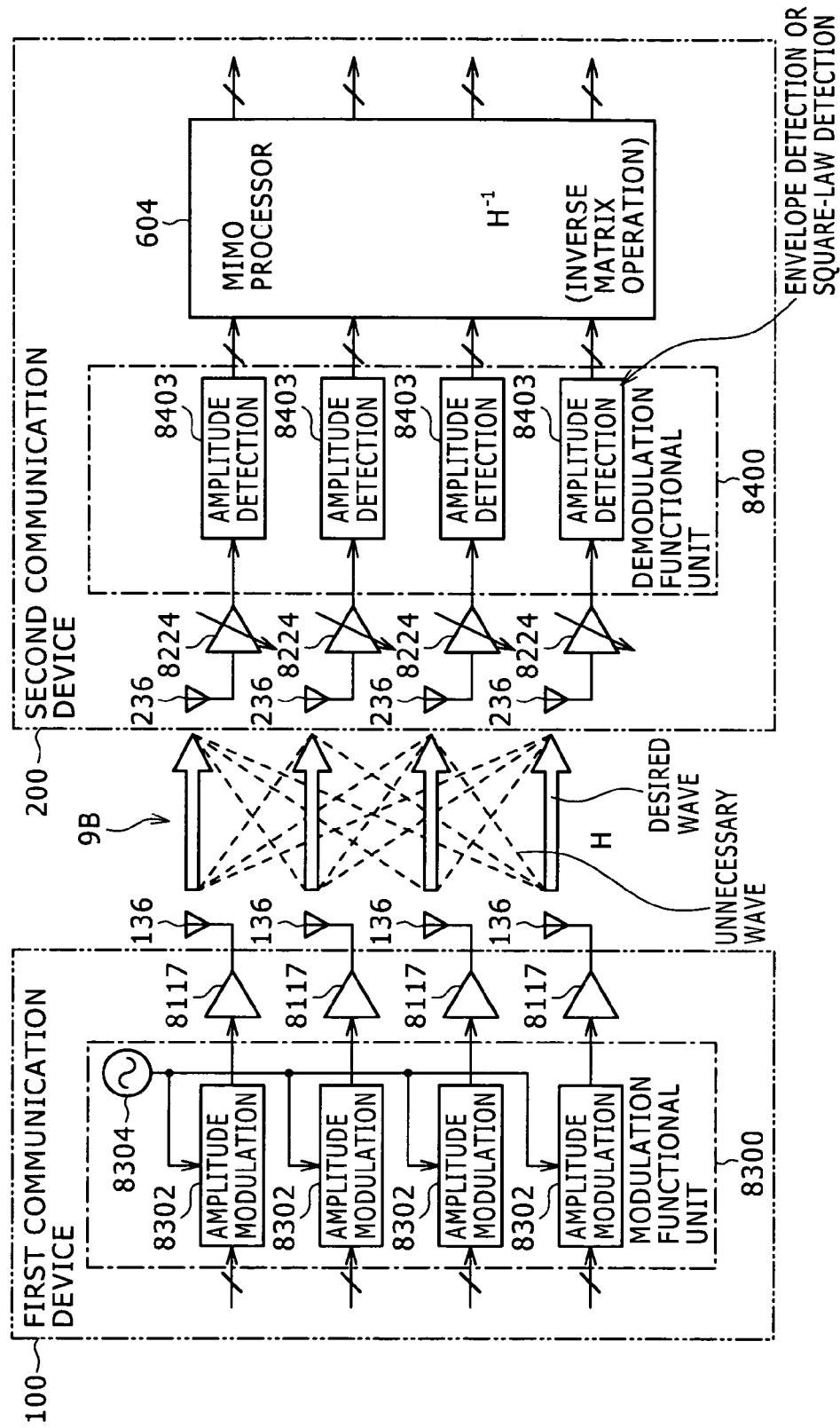

FIG.11A
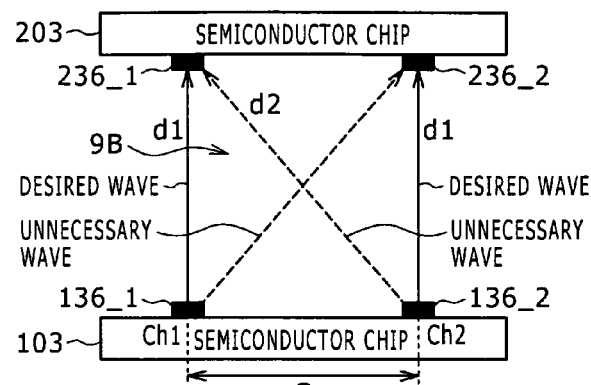
FIG.11B
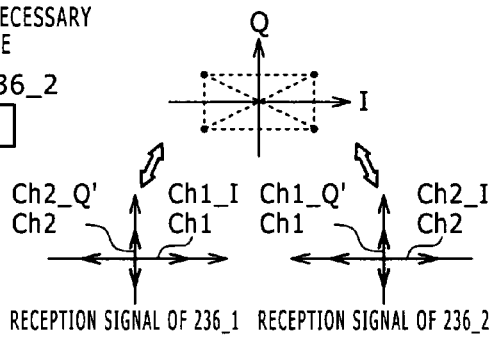
FIG.11C
FIG.11D
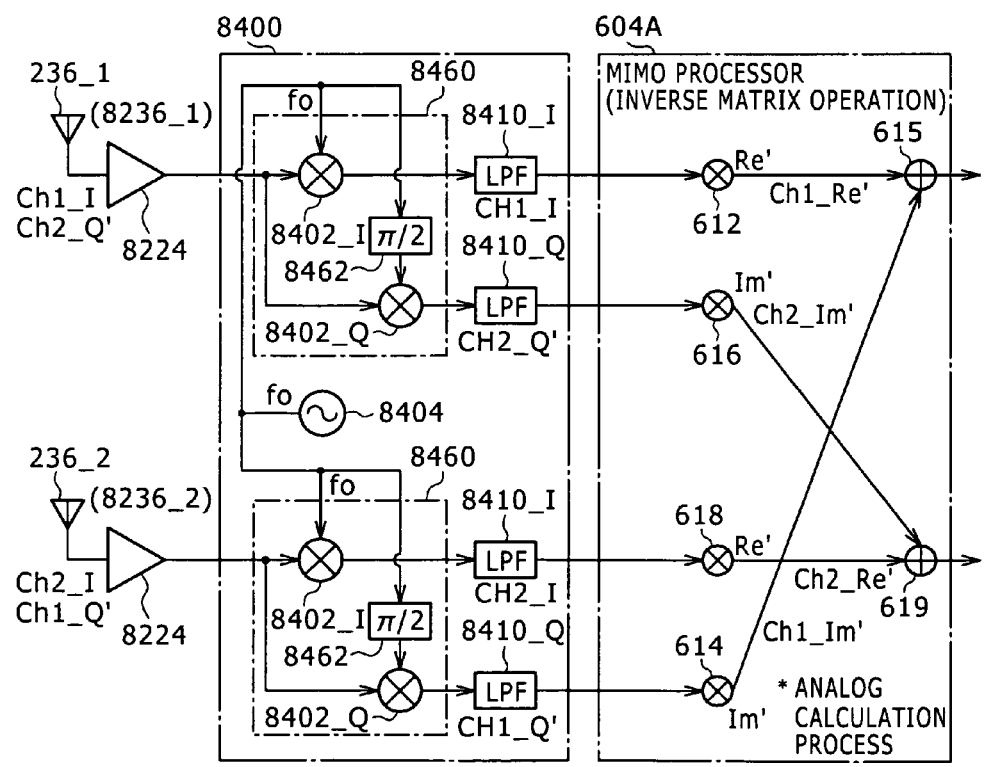

FIG.12A
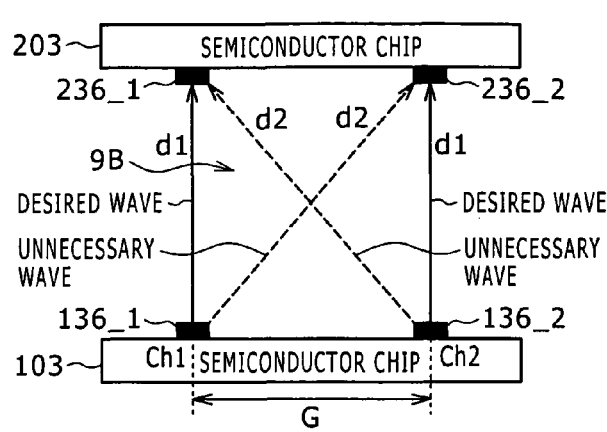
FIG.12B
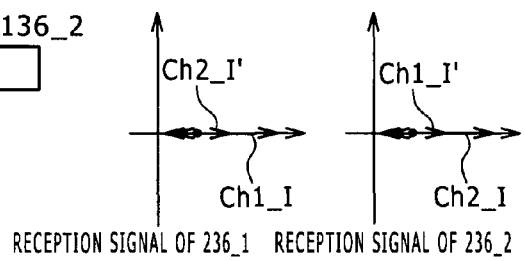
FIG.12C
FIG.12D
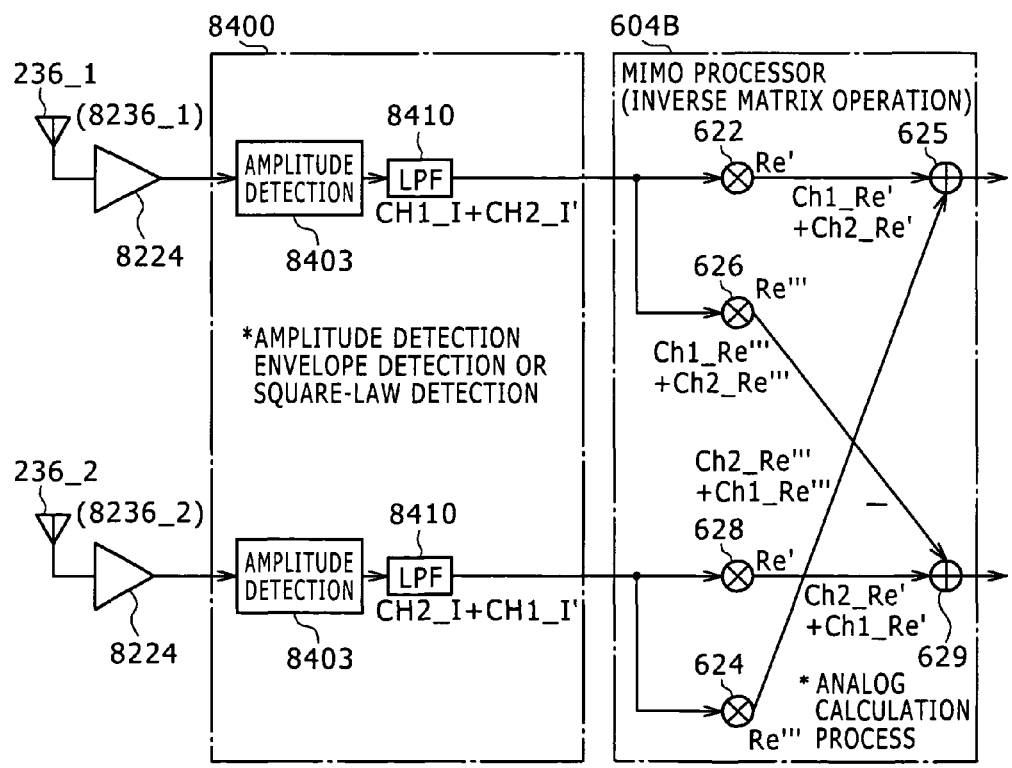

WIRELESS TRANSMISSION SYSTEM, WIRELESS COMMUNICATION DEVICE AND WIRELESS TRANSMISSION METHOD

BACKGROUND OF THE INVENTION

1. Field of the Invention

This invention relates to a wireless transmission system (including also a wireless communication device implemented in one housing), a wireless communication device for the reception side and a wireless communication method. More particularly, the present invention relates to a mechanism wherein space division multiplexing is applied to wirelessly transmit a plurality of transmission subject signals.

2. Description of the Related Art

As a technique for implementing a high-speed signal transmission between different electronic apparatus disposed in a comparatively short range (for example, within several centimeters to ten and several centimeters), or within an electronic apparatus, for example, a LVDS (Low Voltage Differential Signaling) is known. However, together with further increase of the amount of transmission information and further increase of the speed of transmission recently, increase of power consumption, increase of an influence of signal distortion by reflection and so forth, increase of unnecessary radiation and so forth have become problems. For example, the LVDS reaches a limit where a signal such as a video signal (including an image pickup signal), a computer image or the like is transmitted at a high speed (on the real time basis) in an apparatus.

As a countermeasure against the problem of increase of the speed of transmission data, it seems a possible idea to increase the number of wiring lines to decrease the transmission speed per one signal line by parallel transmission of signals. However, the countermeasure just described gives rise to increase of the number of input and output terminals. As a result, complication of a printed board or a cable wiring scheme, increase of the size of a semiconductor chip and so forth are required. Further, since a large amount of data is transmitted at a high speed along a wiring system, a problem of electromagnetic field interference occurs.

All of the problems involved in the LVDS or the technique of increasing the number of wiring lines are caused by transmission of a signal through an electric wiring line. Therefore, as a method for solving a problem caused by transmission of a signal along an electric wiring line, it seems a possible idea to eliminate electric wiring lines for signal transmission.

Also it seems a possible idea to apply space division multiplexing where a plurality of communication units are provided on the transmission side and the reception side to carry out duplex transmission. However, where the space division multiplexing is applied, an interference countermeasure between channels is required. It is a possible idea to apply a MIMO (Multi-Input Multi-Output) system as a technique for solving the problem described above (refer to, for example, Japanese Patent Laid-Open No. 2009-055228, Japanese Patent Laid-Open No. 2009-049632 and Japanese Patent Laid-Open No. 2009-33588, hereinafter referred as Patent Documents 1 to 3, respectively).

Patent Documents 1 to 3 are directed to wireless transmission in a comparatively long range with respect to wireless transmission within an apparatus or between different apparatus and disclose application of a MIMO process in combination with an OFDM modulation method. In other words, the MIMO process disclosed in Patent Documents 1 to 3 depends upon the OFDM modulation method.

SUMMARY OF THE INVENTION

However, where wireless transmission in a comparatively short range within an apparatus or between different apparatus is intended, it is considered that it is not always necessary to use the MIMO process together with the OFDM modulation method. Further, if the wavelength becomes short, then also an effect of directivity of an antenna is achieved. Therefore, it is considered that use of the MIMO process with the OFDM modulation method is not required after all.

Therefore, it is desirable to provide a wireless transmission system, a wireless communication device and a wireless communication method wherein a MIMO process is applied suitably for wireless-signal transmission within an apparatus or between different apparatus.

In a wireless transmission system, a wireless communication apparatus and a wireless transmission method according to an embodiment of the present invention, a communication unit for transmission and a communication unit for reception are arranged in a housing of an electronic apparatus.

The communication unit for transmission frequency-converts a transmission subject signal with a carrier signal for modulation to generate a modulation signal and signals the generated modulation signal to a wireless signal transmission path. Preferably, the communication unit for transmission modulates carrier signals of the same carrier frequency. The communication unit for reception demodulates a modulation signal received through the wireless signal transmission path to acquire an output signal corresponding to the transmission subject signal. Preferably, the communication unit for reception uses the signal received through the wireless signal transmission path as an injection signal to generate a carrier signal for demodulation synchronized with the carrier signal for the modulation. Then, the communication unit for reception frequency-converts the modulation signal received through the wireless signal transmission path with the carrier signal for demodulation to acquire an output signal corresponding to the transmission subject signal.

In short, the wireless signal transmission path is configured between the communication unit for the transmission side arranged in the housing of the electronic apparatus and the communication unit on the reception side similarly arranged in the housing of an electronic apparatus, which may be same or different from the electronic apparatus in which the communication unit on the transmission side is arranged. Then, signal transmission is carried out by wireless between the two communication units.

Here, in a mechanism according to the present invention, space division multiplexing is applied to wireless transmission within an apparatus or between different apparatus. To this end, a plurality of transmission antennas are provided on a wireless communication device on the transmission side, and a plurality of reception antennas are provided also on a corresponding wireless communication device on the reception side such that the transmission antennas and the communication antennas correspond in a one-by-one corresponding relationship to each other. Between each corresponding antennas, a desired wave radiated from the transmission antenna is received as a direct wave by the reception antenna. However, between those transmission and reception antennas which do not correspond to each other, an unnecessary wave radiated from the transmission antenna is received as a direct wave by the reception antenna.

Further, the wireless communication device on the reception side adapts a method for modulating only the amplitude of a carrier signal for all channels of a plurality of transmission subject signals. The wireless communication device on the reception side includes a demodulation functional unit and a transmission characteristic correction unit. The demodulation functional unit demodulates modulation signals received by the reception antennas. For the demodulation process, not the synchronous detection but the envelope detection or the square-law detection circuit is adopted.

The transmission characteristic correction unit carries out a correction calculation process, that is, MIMO process, based on the transmission characteristic of a transmission space between the transmission antennas and the reception antennas based on the demodulation signals demodulated by the modulation functional unit and individually corresponding to the reception antennas to acquire an output signal corresponding to the transmission subject signal.

In short, in the mechanism according to the present invention, modulation signals of desired waves and unnecessary waves with the amplitude of the carrier signals are demodulated, received by the reception antennas, that is, composite waves of the desired waves and the unnecessary waves, are demodulated first by envelope detection or square-law detection and then subjected to the MIMO process in the baseband region. Taking the demodulation process such as envelope detection or square-law detection on the reception side into consideration, a method which modulates only the amplitude is adopted for all channels. Further, in the mechanism according to the present invention, the transmission characteristic of the transmission space is handled such that both of desired waves and unnecessary waves are defined as direct waves which are emitted from the transmission antennas and arrive at the reception antennas and, in the MIMO process on the reception side by the transmission characteristic correction unit, inverse matrix calculation based on a matrix which defines the transmission characteristic is carried out.

Here, the antenna arrangement is determined so as to be convenient for the MIMO process. As a point of view in this instance, an approach of defining a path difference which is a difference between an inter-antenna distance of a desired wave and an inter-antenna distance of an unnecessary wave, another approach of prescribing matrix elements which define transmission functions and a further approach of defining a demodulation process and the MIMO process on the reception side by the transmission characteristic correction unit.

Where a path difference is prescribed, where the wavelength of a carrier signal is represented by λc and the phase characteristic which relies upon the directivity of an antenna is represented by zero, the path difference is set to (n/2)λc as a pass condition. When a phase characteristic which relies upon the directivity of an antenna is found, the phase characteristic is corrected by an amount which relies upon a radiation angle of a desired wave or an unnecessary wave from a transmission antenna and an incidence angle to a corresponding reception antenna.

If the path condition described above is replaced into the approach of prescribing matrix elements, then this signifies that a path difference is set such that elements of desired waves in a matrix which prescribes a transmission characteristic are represented only by a real number term while also elements of unnecessary waves are represented only by a real number term. On the other hand, if the first condition is replaced into the approach of prescribing matrix elements by a demodulation process and a MIMO process on the reception side by the transmission characteristic correction unit, then envelop detection or square-law detection of reception signals received by the reception antennas is carried out first to carry out modulation without carrying out quadrature detection or synchronous detection. Then, in the transmission characteristic correction, for each of the channels of the reception channels, correction calculation regarding the real number terms corresponding to desired signals and correction calculation regarding the real number terms corresponding to unnecessary signals are carried out for the demodulated demodulation components. Then, the corrected signals regarding the real number terms corresponding to the desired signals and the corrected signals regarding the imaginary number terms corresponding to the unnecessary signals regarding the channels of the other reception antennas are added to acquire an output signal corresponding to the transmission subject signals.

With the embodiment of the present invention, a mechanism suitable for wireless signal transmission between different apparatus or within an apparatus wherein the MIMO process is applied on the reception side is implemented without using the OFDM modulation method together. By applying the MIMO process to the reception side, the antenna distance can be reduced.

Since both of a desired wave and an unnecessary wave are handled as direct waves, it becomes possible to manage the path difference regarding the desired wave and the unnecessary wave and it becomes possible to determine the antenna arrangement so as to be convenient for the MIMO process on the reception side. Particularly, the antenna arrangement is determined taking it into consideration that demodulation is carried out by envelope detection or square-law detection. As a result, in comparison with an alternative case wherein the present invention is not applied, the calculation scale of the MIMO process can be reduced.

Preferably, the carrier signals used for the modulation and the demodulation use a common frequency. Where the common frequency is used in this manner, since the influence of the carrier frequency becomes same among the different channels with certainty. Therefore, the MIMO process in the baseband region can be carried out with certainty and efficiently. In addition, the circuit scale for modulation and demodulation can be reduced in comparison with that in an alternative case wherein the carrier frequencies of the channels are different from each other.

The above and other features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 1 is a block diagram showing a functional configuration of a signal interface of a wireless transmission system of an embodiment of the present invention;

FIGS. 3A to 3C are schematic views illustrating an appropriate condition or application condition of space division multiplexing adopted in the embodiment;

FIGS. 4A to 4F are schematic views showing a general structure of a millimeter wave signal transmission path for applying the space division multiplexing;

FIGS. 6A to 6D are block diagrams illustrating a basic mechanism for achieving moderation of an interference countermeasure in the relationship between multi-channeling and space division multiplexing;

FIG. 8 is a diagrammatic view illustrating a basis of a calculation method of the MIMO process applied to the reception side;

FIGS. 11A to 11D are diagrammatic views illustrating a first example of a constraint condition to antenna arrangement where two channels are involved;

FIGS. 12A to 12D are diagrammatic views illustrating a second example of the constraint condition to the antenna arrangement where two channels are involved;

DETAILED DESCRIPTION OF THE PREFERRED EMBODIMENTS

Figure 2A:
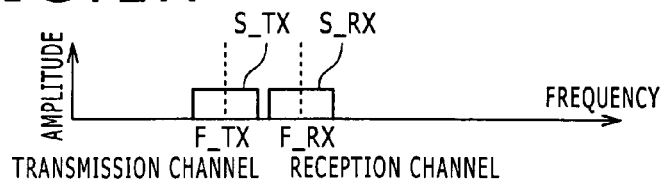
FIGS. 2A to 2E are diagrammatic views illustrating multiplexing of signals.

In the following, embodiments of the present invention are described in detail with reference to the drawings. When functional elements are distinguished among the different embodiments, reference characters of English capital letters such as A, B, C, . . . are applied to the functional elements and, when the embodiments are described without particularly distinguishing them, such reference characters are omitted. The omission of reference characters is similarly applied to the drawings.

It is to be noted that the present invention is described in the following order:

1. Communication Processing Channel: Basis (Space Division Multiplexing)
2. Application Technique of Space Division Multiplexing
3. Modulation and Demodulation (Application of Square Detection and Envelop Detection)
4. Relationship between Multi-Channel Transmission and Space Division Multiplexing
5. Outline of MIMO Process Applied to Reception Side: Calculation Process, Relationship with Carrier Frequency, Relationship with Antenna Arrangement, Relationship with Directivity, Application to Three Channels or More, Application to Three-Dimensional Arrangement, Digital Processing
6. Reception MIMO System: First and Second Embodiments First, when a wireless transmission system of the present embodiment is described, in order to facilitate understandings of the mechanism of the present embodiment, a basic general configuration is described first. Thereafter, details of a MIMO process applied to the reception side which is a characteristic portion in the wireless transmission system of the present embodiment are described.

<Communication Processing Channel: Basis>

Figure 2B:
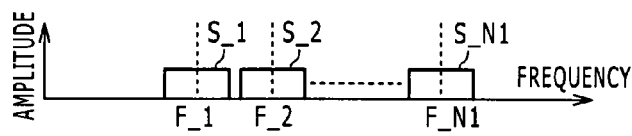
Figure 2C:
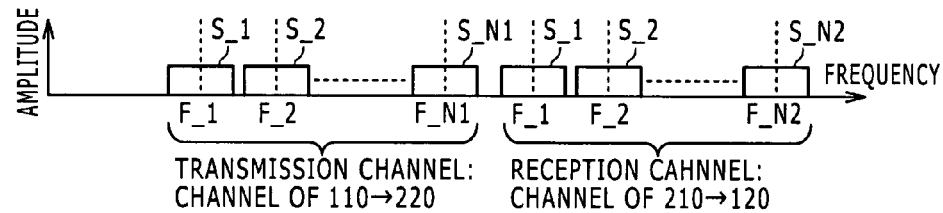
Figure 2D:
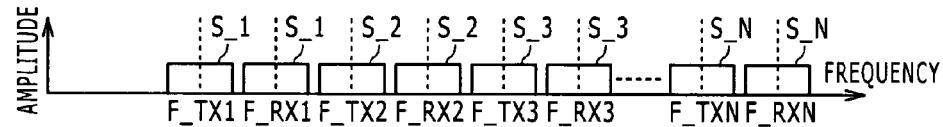
Figure 2E:
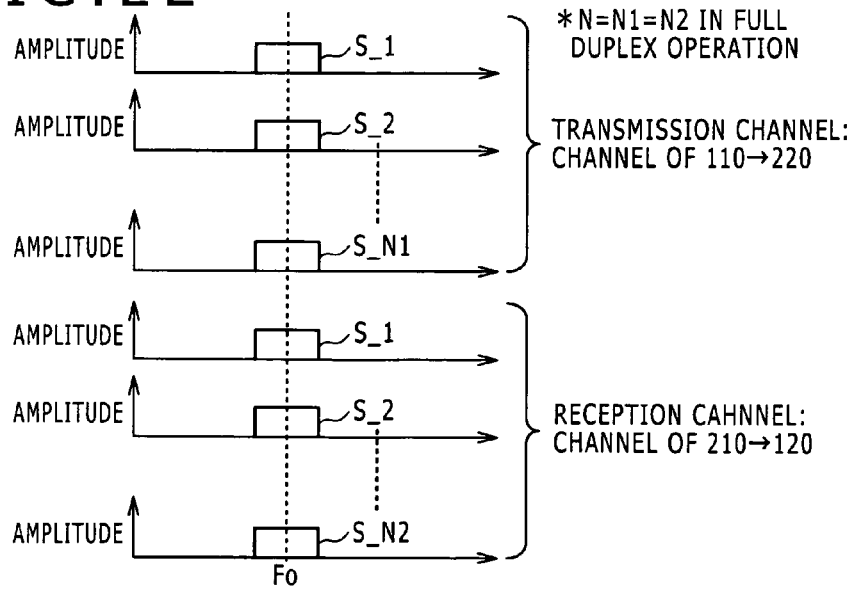

FIGS. 1 to 2E show the wireless transmission system of the present embodiment. In particular, FIG. 1 shows a signal interface of the wireless transmission system 1Y of the present embodiment from a point of view of a functional configuration. FIGS. 2A to 2E illustrates multiplexing of signals.

While a carrier frequency used for the wireless transmission system of the present embodiment described below is a frequency in the millimeter waveband, the mechanism of the present embodiment can be applied not only to a case wherein a carrier frequency of the millimeter waveband is used but also to another case wherein a carrier frequency in a shorter wavelength band such as, for example, a sub millimeter waveband is used. The wireless transmission system of the present embodiment is used, for example, for a digital recording and reproduction device, a ground wave television receiver, a portable telephone set, a game machine and a computer.

[Functional Configuration]

As seen in FIG. 1, the wireless transmission system 1Y is configured such that a first communication device 100Y which is an example of a first wireless device and a second communication device 200Y which is an example of a second wireless device are coupled to each other through a millimeter wave signal transmission path 9 and carry out signal transmission using the millimeter waveband. The millimeter wave signal transmission path 9 is an example of a wireless signal transmission path. A signal of a transmission subject is frequency-converted into a signal of the millimeter waveband suitable for wideband transmission, and the resulting signal is transmitted.

The wireless transmission system 1Y of the present embodiment is characterized in that, by using a plurality of paired transmission couplers 108 and 208, a plurality of channels of such millimeter wave signal transmission paths 9 are included. The plural channels of the millimeter wave signal transmission paths 9 are installed such that they do not interfere spatially with each other or are not influenced by interference, and can carry out communication at the same time using the same frequency along the plural channels for signal transmission.

The term "there is no spatial interference" signifies that signals of plural channels can be transmitted independently of each other. A mechanism therefor is hereinafter referred to as "space division multiplexing." When multi-channeling for a transmission channel is intended, if the space division multiplexing is not applied, then it is necessary to apply frequency division multiplexing such that different carrier frequencies are used for different channels. However, if the space division multiplexing is applied, then even if the same carrier frequency is used, transmission can be implemented without being influenced by interference.

The "space division multiplexing" may be any method of forming a plurality of channels of millimeter wave signal transmission paths 9 in a three-dimensional space in which a millimeter wave signal which is an electromagnetic wave can be transmitted. In particular, the method is not limited to configuration of plural channels of millimeter wave signal transmission paths 9 in a free space. For example, where a three-dimensional space in which a millimeter wave signal which is an electromagnetic wave can be transmitted is configured from a dielectric material which is an entity, plural channels of millimeter wave signal transmission paths 9 may be formed in the dielectric material. Further, each of the plural channels of millimeter wave signal transmission paths 9 is not limited to a free space but may have a form of a dielectric transmission path, a hollow waveguide or the like.

The wireless transmission device or system is configured from a first communication unit or first millimeter wave transmission device and a second communication unit or second millimeter wave transmission device. Further, between the first communication unit and the second communication unit which are disposed in a comparatively short range, a signal of a transmission subject converted into a millimeter wave signal is transmitted through the millimeter wave signal transmission path. The term "wireless transmission" in the present embodiment signifies transmission of a signal of a transmission subject not along an electric wiring line but by wireless, in the present example, by a millimeter wave.

The term "comparatively short range" signifies a shorter range than the distance between communication devices in a field or outdoors used for broadcasting or general wireless communication, and the transmission range may be a range which can be specified as a closed space. The term "closed space" signifies a space in a state wherein leakage of an electric wave from the inner side of the space to the outer side of the space is little and arrival or invasion of an electric wave from the outer side of the space at or into the inner side of the space is little. Typically, the term "closed space" signifies a state that the entire space is enclosed by a housing or case having a shielding effect against a radio wave.

The wireless transmission may be, for example, interboard communication in a housing of one electronic apparatus, inter-chip communication on the same board and inter-device communication where a plurality of electronic devices are integrated as in a case wherein one electronic apparatus is mounted on the other electronic apparatus.

While the "integration" described above typically signifies a state wherein both of the electronic apparatus fully contact with each other by mounting therebetween, it may be a state wherein a transmission range between both of the electronic apparatus can be substantially specified as a closed space. Also a case is included wherein both of the electronic apparatus are disposed at determined position in a state rather spaced from each other, that is, in a comparatively short range such as, for example, within several centimeters to ten and several centimeters and it may be considered that the electronic apparatus are substantially integrated with each other. In short, the integration signifies any state in which a radio wave leaks little from the inside to the outside of a space which is configured from both electronic apparatus and in which an electric wave can propagate and conversely an electric wave from the outside of the space little arrives or invades at or into the inside of the space.

Signal transmission in a housing of one electronic apparatus is hereinafter referred to as intra-housing signal transmission and signal transmission in a state wherein a plurality of electronic apparatus are integrated (including "substantially integrated" in the following description) is hereinafter referred to as inter-apparatus signal transmission. In the case of the intra-housing signal transmission, a communication device or communication unit or transmitter on the transmission side and a communication device or communication unit or receiver on the reception side are accommodated in the same housing, and the wireless transmission system of the present embodiment wherein a wireless signal transmission path is formed between the communication units or transmitter and receiver is the electronic apparatus itself. On the other hand, in the case of the inter-apparatus signal transmission, the communication device or communication unit or transmitter on the transmission side and the communication device or communication unit or receiver on the reception side are accommodated in individual housings of electronic apparatus which are different from each other. Further, wireless signal transmission paths are formed between the communication units or transmitters and receivers in both of the electronic apparatus when both electronic are arranged and integrated at determined positions such that the wireless transmission system of the present embodiment is constructed.

In the communication devices provided across the millimeter wave signal transmission path, the transmitter and the receiver are disposed in a paired and coupled relationship with each other. Signal transmission between one communication device and the other communication device may be carried out unidirectionally, that is, in one direction, or may be carried out bidirectionally. For example, where the first communication unit functions as the device on the transmission side and the second communication unit functions as the device on the reception side, the transmitter is disposed in the first communication unit and the receiver is disposed in the second communication unit. Where the second communication unit functions as the device on the transmission side and the first communication unit functions as the device on the reception side, the transmitter is disposed in the second communication unit and the receiver is disposed in the first communication unit.

The transmitter includes, for example, a signal generator on the transmission side for carrying out a signal process for a signal of a transmission subject to generate a millimeter wave signal, that is, a signal converter for converting an electric signal of a transmission subject into a millimeter wave signal, and a signal coupler on the transmission side for coupling the millimeter wave signal generated by the signal generator on the transmission side with a transmission path or millimeter wave signal transmission path for transmitting the millimeter wave signal. Preferably, the signal generator on the transmission side is provided integrally with a functional unit for generating a signal of a transmission subject.

For example, the signal generator on the transmission side includes a modulation circuit, and the modulation circuit modulates the signal of a transmission subject. The signal generator on the transmission side carries out frequency conversion for a signal modulated by the modulation circuit to generate a millimeter wave signal. As the principle, it seems a possible idea to convert the signal of a transmission subject directly into a millimeter wave signal. The signal coupler on the transmission side supplies the millimeter wave signal generated by the signal generator on the transmission side to the millimeter wave signal transmission path.

On the other hand, the receiver includes, for example, a signal coupler on the reception side for receiving the millimeter wave signal transmitted thereto through the millimeter wave signal transmission path and a signal generator on the reception side for carrying out a signal process for the millimeter wave signal or input signal received by the signal coupler on the reception side to generate a normal electric signal which is a signal of a transmission subject, that is, a signal converter for converting the millimeter wave signal into an electric signal of a transmission subject. Preferably, the signal generator on the reception side is provided integrally with a functional unit for receiving a signal of a transmission subject. For example, the signal generator on the reception side includes a demodulation circuit and carries out frequency conversion for the millimeter wave signal to generate an output signal. The demodulation circuit demodulates the output signal to generate a signal of a transmission subject. As the principle, it seems a possible idea to convert the millimeter wave signal directly into a signal of a transmission subject.

In particular, when it is tried to implement a signal interface, a signal of a transmission subject is transmitted in a contactless and cable-less manner using a millimeter wave signal, that is, not transmitted using an electric wiring line. Preferably, at least signal transmission, particularly transmission of an image signal for which high-speed and great amount data transmission is required, or of a high-speed clock signal or the like, is carried out using a millimeter wave signal. In particular, in the present embodiment, signal transmission carried out through an electric wiring line in the past is carried out using a millimeter wave signal. By carrying out signal transmission using the millimeter waveband, high-speed signal transmission on the Gbps order can be implemented and the range on which a millimeter wave signal has an influence can be easily limited, and also an effect arising from the characteristic just described is obtained.

Here, the signal couplers may be configured such that the first communication unit and the second communication unit can transmit a millimeter wave signal through the millimeter wave signal transmission path. For example, the signal couplers may individually include, for example, an antenna structure or antenna coupler or may be configured such that coupling of a signal is carried out without including an antenna structure.

While the "millimeter wave signal transmission path for transmitting a millimeter wave signal" may be configured from the air, that is, from a free space, preferably the millimeter wave signal transmission path includes a structure for transmitting a millimeter wave signal while confining the millimeter wave signal in the transmission path. If the characteristic just described is positively utilized, then layout of the millimeter wave signal transmission path can be determined arbitrarily, for example, like an electric wiring line.

While, as such a millimeter wave confining structure or wireless signal confining structure as described above, for example, a structure of a waveguide tube is considered typically, the present invention is not limited to this. For example, a structure configured from a dielectric material capable of transmitting a millimeter wave signal, hereinafter referred to as dielectric transmission path or millimeter wave dielectric transmission path, or a hollow waveguide which configures a transmission path and in which a shielding material for suppressing outside radiation of a millimeter wave signal is provided in such a manner as to surround a transmission path and the inside of the shielding material is hollow may be applied. By providing flexibility to the dielectric material or the shielding material, layout of a millimeter wave signal transmission path can be implemented.

Incidentally, in the case of the air called free space, each of the signal couplers includes an antenna structure such that signal transmission in a short range space is carried out through the antenna structure. On the other hand, where the device configured from a dielectric material is used, while an antenna structure may be applied, this is not essential.

[System Configuration wherein Space Division Multiplexing is Applied]

FIG. 1 shows a wireless transmission system 1Y according to the present embodiment. Referring to FIG. 1, as can be recognized from the basic description regarding the space division multiplexing given hereinabove, the wireless transmission system 1Y of the present invention includes a plurality of channels of millimeter wave signal transmission paths 9 interposed between a first communication device 100Y and a second communication device 200Y.

Here, a plurality of different signals _@ (@ is 1 to N1) are transmitted from the first communication device 100Y to the second communication device 200Y, and another plurality of different signals _@ (@ is 1 to N2) are transmitted from the second communication device 200Y to the first communication device 100Y.

Although details are hereinafter described, a semiconductor chip 103 includes a transmission-side signal generating unit 110 and a reception-side signal generating unit 120, and another semiconductor chip 203 includes a transmission-side signal generating unit 210 and a reception-side signal generating unit 220. Although stopgap illustration is given in FIG. 1, the transmission-side signal generating unit 110 and the reception-side signal generating unit 220 are provided for each of N1 channels, or in other words, N1 such transmission-side signal generating units 110 and N1 such reception-side signal generating units 220 are provided, and the transmission-side signal generating unit 210 and the reception-side signal generating unit 120 are provided for each of N2 channels, or in other words, N2 such transmission-side signal generating units 210 and N2 such reception-side signal generating units 120 are provided.

Since the space division multiplexing permits use of the same frequency band at the same time, the communication speed can be raised, and the simultaneity of bidirectional communication wherein signal transmission for the N1 channels from the first communication device 100Y to the second communication device 200Y and signal transmission for the N2 channels from the second communication device 200Y to the first communication device 100Y can be secured. Particularly a millimeter wave is short in wavelength, and an attenuation effect by the distance can be expected. Further, even where the offset is small, that is, even where the spatial distance between transmission channels is short, interference is less likely to occur, and propagation channels different from each other depending upon the place can be implemented readily.

As seen in FIG. 1, the wireless transmission system 1Y of the present embodiment includes "N1+N2" channels of transmission path couplers 108 and 208 each including a millimeter wave transmission terminal, a millimeter wave transmission path, an antenna and so forth and "N1+N2" channels of millimeter wave signal transmission paths 9. Each of the reference characters has a suffix "_@" (@ is 1 to N1+N2). Thus, a full duplex transmission system wherein millimeter wave transmission is carried out independently for transmission and reception can be implemented.

First, functional elements provided in the wireless transmission system 1Y of the present embodiment are described particularly. It is to be noted that, although the following description is given of an example wherein the functional elements are formed on a semiconductor integrated circuit or chip, this is not essential.

The semiconductor chip 103 which can carry out millimeter wave communication is provided in the first communication device 100Y, and the semiconductor chip 203 which can carry out millimeter wave communication is provided also in the second communication device 200Y.

Here, only signals which are demanded to be transmitted at a high speed and in a great amount are made a subject of the communication with the millimeter waveband, and other signals which may be transmitted at a low speed and in a small amount or which can be regarded as DC current such as power supply are not made a subject of conversion into a millimeter wave signal. The signals which are not made a subject of conversion into a millimeter wave signal including power supply are connected between boards using a mechanism similar to a conventional mechanism. Original electric signals of a subject of transmission before conversion into millimeter waves are hereinafter referred to collectively as baseband signals.

[First Communication Device]

The first communication device 100Y includes a board 102, a semiconductor chip 103 mounted on the board 102 and capable of carrying out millimeter waveband communication, and a transmission path coupler 108 mounted on the board 102. The semiconductor chip 103 is a system LSI (Large Scale Integrated Circuit) wherein an LSI functional unit 104 and a signal generating unit 107 which is a millimeter wave signal generating unit are integrated. Though not shown, the LSI functional unit 104 and the signal generating unit 107 may be configured otherwise such that they are not integrated. Where the LSI functional unit 104 and the signal generating unit 107 are formed as separate units, since a problem may possibly arise from transmission of a signal by an electric wiring line for signal transmission between them, they are preferably formed as a single integrated unit. Where they are formed as separate units, the two chips of the LSI functional unit 104 and the signal generating unit 107 are preferably disposed at a short distance to minimize the wire length thereby to minimize a possible bad influence.

The signal generating unit 107 and the transmission path coupler 108 are configured so as to have bidirectionality of data. To this end, the signal generating unit 107 includes a signal generation unit on the transmission side and a signal generation unit on the reception side. Although such transmission path couplers 108 may be provided separately for the transmission side and the reception side, here the single transmission path coupler 108 is used for both of transmission and reception.

In order to implement "bidirectional communication," in the case of single-core bidirectional communication wherein one channel or core of a millimeter wave signal transmission path 9 of a millimeter wave transmission channel is used, a half duplex system wherein time division multiplexing (TDM) is applied, a frequency division multiplexing (FDM) and so forth are applied.

However, in the case of the time division multiplexing, since separation of transmission and reception is carried out time-divisionally, "simultaneity of bidirectional communication," that is, "single-core simultaneous bidirectional transmission," wherein signal transmission from the first communication device 100Y to the second communication device 200Y and signal transmission from the second communication device 200Y to the first communication device 100Y are carried out simultaneously, is not implemented. The single-core simultaneous bidirectional transmission is implemented by the frequency division multiplexing.

Since the frequency division multiplexing uses different frequencies for transmission and reception as seen from FIG. 2A, the millimeter wave signal transmission path 9 must have a comparatively great transmission bandwidth. In addition, in order to implement multiplex transmission, that is, multi-channel transmission, by the frequency division multiplexing, it is necessary to use different carrier frequencies for modulation to convert frequencies of individual signals into frequencies within different frequency bands F_@ to generate signals of millimeter waves and transmit the millimeter wave signals whose carrier frequencies are different from each other in the same direction or in the opposite directions as seen in FIG. 2B. In this instance, where different frequencies are used for transmission, in the example shown, for a channel from the transmission-side signal generating unit 110 side to the reception-side signal generating unit 220 side, and for reception, in the example shown, for another channel from the transmission-side signal generating unit 210 side to the reception-side signal generating unit 120 side, it is necessary to further increase the transmission bandwidth as seen in FIGS. 2C and 2D.

In this regard, if the space division multiplexing is applied, then not only for implementation of bidirectional communication but also for implementation of multiplex transmission, that is, for multi-channel transmission, the same frequency band can be applied to the channels. Therefore, there is an advantage that there is no restriction to the transmission bandwidth.

The semiconductor chip 103 may not be mounted directly on the board 102 but may be formed as a semiconductor package wherein the semiconductor chip 103 is mounted on an interposed board and molded using resin such as epoxy resin and mounted as such on the board 102. In particular, the interposer board is used as a chip mounting board, and the semiconductor chip 103 is provided on the interposer board. The interposer board may be formed using a sheet member having a relative permittivity within a fixed range such as a range approximately from two to ten and formed from a combination of, for example, thermally reinforced resin and copper foil.

The semiconductor chip 103 is connected to the transmission path couplers 108. Each transmission path coupler 108 is formed from an antenna structure including, for example, an antenna coupling unit, an antenna terminal, a microstrip line, an antenna and so forth. It is to be noted that also it is possible to apply a technique of forming an antenna directly on a chip such that also the transmission path couplers 108 are incorporated in the semiconductor chip 103.

The LSI functional unit 104 carries out principal application control of the first communication device 100Y and includes, for example, a circuit for processing various signals to be transmitted to the opposite party and a circuit for processing various signals received from the opposite party.

The signal generating unit 107 or electric signal conversion unit converts a signal from the LSI functional unit 104 into a millimeter wave signal and carries out signal transmission control of the millimeter wave signal through the millimeter wave signal transmission path 9.

In particular, the signal generating unit 107 includes the transmission-side signal generating unit 110 and the reception-side signal generating unit 120. The transmission-side signal generating unit 110 and the transmission path coupler 108 cooperate with each other to form a transmission unit, that is, a communication unit on the transmission side. Meanwhile, the reception-side signal generating unit 120 and the transmission path coupler 108 cooperate with each other to form a reception unit, that is, a communication unit on the reception side.

The transmission-side signal generating unit 110 includes a parallel-serial converter 114, a modulator 115, a frequency converter 116 and an amplifier 117 in order to carry out signal processing of an input signal to generate a signal of a millimeter wave. It is to be noted that the modulator 115 and the frequency converter 116 may be formed as a unit of the direct conversion type.

The reception-side signal generating unit 120 includes an amplifier 124, a frequency converter 125, a demodulator 126 and a serial-parallel converter 127 in order to carry out signal processing of an electric signal of a millimeter wave received by the transmission path coupler 108 to generate an output signal. The frequency converter 125 and the demodulator 126 may be formed as a unit of the direct conversion type.

The parallel-serial converter 114 and the serial-parallel converter 127 are provided, where the present configuration is not applied, for parallel interface specifications wherein a plurality of signals for parallel transmission are used, but are not required for serial interface specifications.

The parallel-serial converter 114 converts parallel signals into a serial data signal and supplies the serial data signal to the modulator 115. The modulator 115 modulates a transmission subject signal and supplies the modulated transmission subject signal to the frequency converter 116. The modulator 115 may basically be of the type wherein the transmission subject signal is modulated at least in one of the amplitude, frequency and phase or may be modulated in an arbitrary combination of them.

For example, in the case of analog modulation, for example, amplitude modulation (AM) and vector modulation are available. As the vector modulation, frequency modulation (FM) and phase modulation (PM) are available. In the case of digital modulation, for example, amplitude shift keying (ASK), frequency shift keying (FSK), phase shift keying (PSK) and amplitude phase shift keying (APSK) which modulates the amplitude and the phase are available. As the amplitude phase modulation, quadrature amplitude modulation (QAM) is representative.

Incidentally, in the present embodiment, a method for modulating only the amplitude by the transmission subject signal is adapted in terms of the MIMO processing.

The frequency converter 116 frequency converts a transmission subject signal after modulation by the modulator 115 to generate an electric signal of a millimeter wave and supplies the millimeter wave electric signal to the amplifier 117. The electric signal of a millimeter wave is an electric signal having a frequency substantially within a range from 30 GHz to 300 GHz. The reason why the "substantially" is used is that the frequency may be any frequency with which an effect by millimeter wave communication is obtained and the lower limit is not restricted to 30 GHz while the upper limit is not restricted to 300 GHz.

While the frequency converter 116 can assume various circuit configurations, for example, it may have a configuration including a frequency mixing circuit, that is, a mixer circuit, and a local oscillation circuit. The local oscillation circuit generates a carrier to be used for modulation, that is, a carrier signal or reference carrier. The frequency mixing circuit multiplies or modulates a carrier in the millimeter waveband generated by the local oscillation circuit by or with a signal from the parallel-serial converter 114 to generate a modulation signal in the millimeter waveband and supplies the modulation signal to the amplifier 117.

The amplifier 117 amplifies an electric signal of a millimeter wave after frequency conversion and supplies the amplified electric signal to the transmission path coupler 108. The amplifier 117 is connected to the bidirectional transmission path coupler 108 through an antenna terminal not shown.

The transmission path coupler 108 transmits a signal of a millimeter wave generated by the transmission-side signal generating unit 110 to the millimeter wave signal transmission path 9, and receives a signal of a millimeter wave from the millimeter wave signal transmission path 9 and outputs the received millimeter wave signal to the reception-side signal generating unit 120.

The transmission path coupler 108 is configured from an antenna coupling unit. The antenna coupling unit configures an example or part of the transmission path coupler 108 or signal coupling unit. The antenna coupling unit is, in a narrow sense, a block which couples an electronic circuit in a semiconductor chip and an antenna disposed inside or outside the chip, and is, in a wide sense, a block which signal-couples a semiconductor chip and the millimeter wave signal transmission path 9. For example, the antenna coupling unit includes at least an antenna structure. Further, where the time division multiplexing is applied to transmission and reception, an antenna changeover unit, that is, an antenna sharing unit, is provided in the transmission path coupler 108.

The antenna structure is a structure in the coupling unit to the millimeter wave signal transmission path 9 and may be any structure only if it couples an electric signal in the millimeter waveband to the millimeter wave signal transmission path 9, but does not signify an antenna itself. For example, the antenna structure is configured including an antenna terminal, a microstrip line and an antenna. Where the antenna changeover unit is formed in the same chip, the antenna terminal except the antenna changeover unit and the microstrip line configure the transmission path coupler 108.

The antenna on the transmission side radiates an electromagnetic wave based on a signal of a millimeter wave to the millimeter wave signal transmission path 9. Meanwhile, the antenna on the reception side receives an electromagnetic wave of a millimeter wave from the millimeter wave signal transmission path 9. The microstrip line interconnects the antenna terminal and the antenna, and transmits a signal of a millimeter wave on the transmission side from the antenna terminal to the antenna, but transmits a signal of a millimeter wave on the reception side from the antenna to the antenna terminal.

The antenna changeover unit is used where the antenna is used commonly for transmission and reception. For example, when a signal of a millimeter wave signal is to be transmitted to the second communication device 200Y side which is the opposite party, the antenna changeover unit connects the antenna to the transmission-side signal generating unit 110. On the other hand, when a signal of a millimeter wave from the second communication device 200Y which is the opposite party is to be received, the antenna changeover unit connects the antenna to the reception-side signal generating unit 120. Although the antenna changeover unit is provided separately from the semiconductor chip 103 on the board 102, the location of the antenna changeover unit is not limited to this, but the antenna changeover unit may be provided otherwise in the semiconductor chip 103. Where antennas for transmission and reception are provided separately from each other, the antenna changeover unit can be omitted.

The reception-side signal generating unit 120 is connected to the transmission path coupler 108. The reception-side signal generating unit 120 includes the amplifier 124, frequency converter 125, demodulator 126, and serial-parallel converter 127 as well as a unification processing unit 128 in order to carry out signal processing for an electric signal of a millimeter wave received by the transmission path coupler 108 to generate an output signal. It is to be noted that the frequency converter 125 and the demodulator 126 may be formed as a unit of the direct conversion type.

The amplifier 124 on the reception side is connected to the transmission path coupler 108, and amplifies an electric signal of a millimeter wave after received by the antenna and supplies the amplified electric signal to the frequency converter 125. The frequency converter 125 frequency-converts the amplified millimeter wave electric signal and supplies the frequency-converted signal to the demodulator 126. The demodulator 126 demodulates the frequency-converted signal to acquire a baseband signal and supplies the baseband signal to the serial-parallel converter 127.

The serial-parallel converter 127 converts serial reception data into parallel output data and supplies the parallel output data to the LSI functional unit 104.

Where the semiconductor chip 103 is configured in such a manner as described above, input signals are subjected to parallel to serial conversion and a resulting serial signal is transmitted to the semiconductor chip 203. Meanwhile, a reception signal from the semiconductor chip 203 side is subjected to serial to parallel conversion. Consequently, the number of signals of a millimeter wave conversion subject is reduced.

Where original signal transmission between the first communication device 100Y and the second communication device 200Y is serial transmission, the parallel-serial converter 114 and the serial-parallel converter 127 need not be provided.

One of characteristics of the wireless transmission system 1Y of the present embodiment is that, in the first communication device 100Y, a MIMO processor 603 used commonly for all of the N1 channels is provided between the demodulator 126 and the serial-parallel converter 127 in the reception-side signal generating unit 120. Similarly, in the second communication device 200Y, a MIMO processor 604 used commonly for all of the N2 channels is provided between a demodulator 226 and a serial-parallel converter 227. Details of the MIMO processors 603 and 604 are hereinafter described.

While the basic configuration is described here, this is a mere example, and the form of accommodating the transmission-side signal generating unit 110, reception-side signal generating unit 120, the transmission-side signal generating unit 210 and reception-side signal generating unit 220 in the semiconductor chips 103 and 203, respectively, is not limited to that described hereinabove with reference to FIG. 1. For example, the system may be configured using the semiconductor chip 103 including only the signal generating unit 107 which accommodates one channel of the transmission-side signal generating unit 110 and the reception-side signal generating unit 120 and the semiconductor chip 203 including only a signal generating unit 207 which accommodates one channel of the transmission-side signal generating unit 210 and the reception-side signal generating unit 220. Further, the transmission-side signal generating unit 110, reception-side signal generating unit 120, transmission-side signal generating unit 210 and reception-side signal generating unit 220 may be accommodated in the individually different semiconductor chips 103 and 203 to configure the system. Depending upon such modifications, the system may be configured so as to satisfy N1=N2=N.

The functional units which should be accommodated in the semiconductor chips 103 and 203 need not be accommodated in a paired relationship between the first communication device 100Y side and the second communication device 200Y side but may be accommodated in an arbitrary combination. For example, the first communication device 100Y may be formed such that the functional units for the N1 channels on the transmission side and the N2 channels on the reception side are accommodated in one chip while the second communication device 200Y side is configured such that the transmission-side signal generating units 210 and the reception-side signal generating units 220 are accommodated in such different semiconductor chips 203 from each other.

Incidentally, since, in the present embodiment, the MIMO processor 603 common to all channels is provided between the demodulator 126 and the serial-parallel converter 127 of the channels and the MIMO processor 604 common to all channels is provided between the demodulator 226 and the serial-parallel converter 227 of the channels, it is preferable for the reception system to use chips in which the functional units for the N1 channels and the N2 channels are accommodated individually. Although it is not excluded to use a chip for each channel in the reception system, in this instance, between the chips for the individual channels of the reception system and the chip in which the MIMO processors 603 and 604 (which may be accommodated in one of the chips of the reception system) are accommodated, wiring lines outside the chips are required in order to interpose the MIMO processors 603 and 604 between the demodulator 126 and the serial-parallel converter 127 or between the demodulator 226 and the serial-parallel converter 227.

On the other hand, as regards the transmission system, no such restriction is applicable, and therefore, it does not make a basic problem whether functional units of a plurality of channels are accommodated in one chip or in individually different chips. However, functional units of a plurality of channels are accommodated preferably in one chip in order to use a common or same frequency for carrier signals of different channels.

The carrier frequencies of the channels may be same as each other or different from each other. For example, where a dielectric transmission path or a hollow waveguide is used, since a millimeter wave is confined in the inside of them, millimeter wave interference can be prevented. Therefore, there is no problem even if the same frequency is used. On the other hand, in the case of a free space transmission path, if frequency space transmission paths are spaced from each other by a certain distance, then there is no problem if the same frequency is used. However, where frequency space transmission paths are spaced but by a small distance, different frequencies should be used. However, in order to effectively carry out MIMO processing or minimize the circuit scale of the demodulation functional unit on the reception side, preferably a common carrier frequency is used irrespective of the form of the millimeter wave signal transmission path 9, that is, even where the millimeter wave signal transmission path 9 is a free space transmission path.

For example, in order to implement bidirectional communication, time division multiplexing and frequency division multiplexing are available in addition to space division multiplexing. As a method for implementing data transmission and reception using the millimeter wave signal transmission path 9 of one channel, one of a half duplex method wherein transmission and reception are changed over by time division multiplexing and a full duplex method wherein transmission and reception are carried out simultaneously by frequency division multiplexing is adopted.

However, the time division multiplexing has a problem that transmission and reception cannot be carried out concurrently. Further, as seen from FIGS. 2A to 2C, the frequency division multiplexing has a problem that the millimeter wave signal transmission path 9 must have a great frequency bandwidth.

In contrast, in the wireless transmission system 1Y of the present embodiment to which the space division multiplexing is applied, same carrier frequency setting can be applied to a plurality of signal transmission channels, that is, to a plurality of channels. Consequently, it is facilitated to re-utilize carrier frequencies, that is, to use the same frequency for a plurality of channels. Even if the millimeter wave signal transmission path 9 does not have a great bandwidth, transmission and reception of signals can be implemented simultaneously. If a plurality of transmission channels are used in the same direction and the same frequency band is used at the same time, then increase of the communication speed can be achieved.

Where the millimeter wave signal transmission paths 9 of N channels are used for N (N=N1=N2) base band signals, in order to achieve bidirectional transmission and reception, time division multiplexing or frequency division multiplexing must be applied to transmission and reception. In contrast, in application of the space division multiplexing, the millimeter wave signal transmission paths 9 of 2N channels are used, and therefore, also as regards bidirectional transmission and reception, transmission can be carried out using the millimeter wave signal transmission paths 9 of different channels, that is, using the transmission paths which are fully independent of each other. In short, where N signals of a subject of communication in the millimeter waveband are used for transmission and reception, even if such a multiplexing process as time division multiplexing, frequency division multiplexing or code division multiplexing is not carried out, the N different signals can be transmitted through the individual millimeter wave signal transmission paths 9 of the 2N channels.

[Second Communication Device]

The second communication device 200Y includes a functional configuration generally similar to that of the first communication device 100Y. Each of the functional units of the second communication device 200Y is denoted by a reference numeral in the two hundreds, and a functional unit similar to that of the first communication device 100Y is denoted by a reference numeral including digits in the tens and the ones same as those of the first communication device 100Y. A transmission unit is formed from a transmission-side signal generating unit 210 and a transmission path coupler 208, and a reception unit is formed from a reception-side signal generating unit 220 and the transmission path coupler 208.

A LSI functional unit 204 carries out principal application control of the second communication device 200Y and includes, for example, a circuit for processing various signals to be transmitted to the opposite party and another circuit for processing various signals received from the opposite party.

[Connection and Operation]

A technique of frequency-converting and transmitting an input signal is used generally in broadcasting and wireless communication. In such applications, comparatively complicated transmitters, receivers and so forth are used which can cope with such problems as α) in what range communication can be carried out (problem of the S/N ratio regarding thermal noise), β) how to cope with reflection and multipath transmission and γ) how to suppress disturbance and interference with other channels. In contrast, the signal generating units 107 and 207 used in the present configuration are used in the millimeter waveband which is a higher frequency band than frequencies used in complicated transmitters and receivers used popularly in broadcasting and wireless communication. Thus, since the wavelength λ is low, frequencies can be re-utilized readily, and therefore, signal generators suitable for communication between many devices positioned in the neighborhood of each other are used.

With the present configuration, signal transmission is carried out using the millimeter waveband as described above so as to flexibly cope with high speed transmission and large amount data transmission, different from an existing signal interface which utilizes electric wiring lines. For example, only signals for which high speed transmission or large amount data transmission is required are made a subject of communication in the millimeter waveband. Depending upon the system configuration, the communication devices 100Y and 200Y include an interface by existing electric wiring lines, that is, an interface by a terminal and a connector, for signals for low speed transmission or small amount data transmission or for power supply.

The signal generating unit 107 carries out signal processing for input signals inputted from the LSI functional unit 104 to generate a signal of a millimeter wave. The signal generating unit 107 is connected to the transmission path coupler 108 by a transmission path such as, for example, a microstrip line, a strip line, a coplanar line or a slot line such that the generated signal of a millimeter wave is supplied to the millimeter wave signal transmission path 9 through the transmission path coupler 108.

The transmission path coupler 108 has an antenna structure and has a function of converting a signal of a millimeter wave transmitted thereto into an electromagnetic wave and signaling the electromagnetic wave. The transmission path coupler 108 is coupled to the millimeter wave signal transmission path 9 such that an electromagnetic wave converted by the transmission path coupler 108 is supplied to one end portion of the millimeter wave signal transmission path 9. To the other end of the millimeter wave signal transmission path 9, the transmission path coupler 208 on the second communication device 200Y side is coupled. Since the millimeter wave signal transmission path 9 is provided between the transmission path coupler 108 of the first communication device 100Y side and the transmission path coupler 208 of the second communication device 200Y side, an electromagnetic wave in the millimeter waveband is propagated to the millimeter wave signal transmission path 9.

The transmission path coupler 208 of the second communication device 200Y side is connected to the millimeter wave signal transmission path 9. The transmission path coupler 208 receives an electromagnetic wave transmitted to the other end of the millimeter wave signal transmission path 9, converts the electromagnetic wave into a signal of the millimeter band and supplies the signal of the millimeter band to the signal generating unit 207 which is a baseband signal generation unit. The signal generating unit 207 carries out signal processing for the converted signal of the millimeter wave to generate an output signal, that is, a baseband signal, and supplies the generated output signal to the LSI functional unit 204.

While, in the foregoing description, signal transmission is carried out from the first communication device 100Y to the second communication device 200Y, also signal transmission from the LSI functional unit 204 of the second communication device 200Y to the first communication device 100Y is carried out similarly. Thus, a signal of a millimeter wave can be transmitted bidirectionally.

Here, in comparison with the wireless transmission system 1Y of the basic configuration, a signal transmission system which carries out signal transmission through an electric wiring line has the following problems.

i) Although great amount data transmission and high speed transmission of transmission data are demanded, there is a limitation to the transmission speed and the transmission capacity of an electric wiring line.

ii) It seems a possible countermeasure to increase, in order to cope with the problem of achievement of high speed transmission of transmission data, the number of wiring lines to achieve parallel transmission of transmission data while reducing the transmission speed per one signal line. However, this countermeasure increases the number of input and output terminals. As a result, complication of a printed circuit board and a cable wiring scheme, increase in physical size of a connector unit and an electric interface and so forth are required. This complicates the shape of the elements mentioned, resulting in such problems of deterioration of the reliability of the element and increase of the cost.

iii) As the bandwidth of the frequency band of a baseband signal increases together with significant increase of the information amount of movie images or computer images, the problem of EMC (electromagnetic compatibility) becomes further tangible. For example, where an electric wiring line is used, the wiring line serves as an antenna and a signal corresponding to a tuning frequency of the antenna suffers from interference. Further, reflection or resonance caused by impedance mismatching of a wiring line makes a cause of unnecessary radiation. Since a countermeasure against such problems is taken, the configuration of an electronic apparatus is complicated.

iv) In addition to EMC, if reflection exists, then also a transmission error caused by interference between symbols on the reception side or a transmission error by jumping in of disturbance becomes a problem.

Meanwhile, the wireless transmission system 1Y of the basic configuration uses not an electric wiring line but a millimeter wave to carry out signal transmission. A signal to be transmitted from the LSI functional unit 104 to the LSI functional unit 204 is converted into a millimeter wave signal, which is transmitted through the millimeter wave signal transmission path 9 between the transmission path couplers 108 and 208.

Since the millimeter wave signal transmission is wireless transmission, there is no necessity to take care of the wiring line shape or the position of a connector, and therefore, the problem of the restriction to the layout does not occur very often. Since a wiring line and a terminal for a signal whose transmission is changed to signal transmission by a millimeter wave can be omitted, the problem of EMC is eliminated. Generally since the communication devices 100Y and 200Y do not include any other functional unit which uses a frequency of the millimeter waveband, a countermeasure against EMC can be implemented readily.

Since the transmission between the first communication device 100Y and the second communication device 200Y is wireless transmission in a state in which they are positioned closely to each other and therefore is signal transmission between fixed positions or in a known positional relationship, the following advantages are achieved.

1) It is easy to appropriately design a propagation channel or waveguide structure between the transmission side and the reception side.

2) By designing a dielectric structure of the transmission path couplers for enclosing the transmission side and the reception side together with a propagation channel, that is, the waveguide structure of the millimeter wave signal transmission path 9, good transmission of high reliability can be achieved by free space transmission.

3) Since also control of a controller for managing wireless transmission, which corresponds to the LSI functional unit 104 in the present embodiment, need not be carried out so dynamically, adaptively or frequently as is carried out by general wireless communication, the overhead by the control can be reduced from that of general wireless communication. As a result, miniaturization, reduction in power consumption and increase in speed can be anticipated.

4) If, upon production or designing, the wireless transmission environment is calibrated to grasp a dispersion and so forth of each individual product, then high quality communication can be anticipated by referring to the data of the dispersion and so forth to carry out transmission.

5) Even if reflection exists, since this is fixed reflection, an influence of the reflection can be eliminated readily by a small equalizer at he reception side. Also setting of the equalizer can be carried out by preset or static control and can be implemented readily.

Further, since wireless communication in the millimeter waveband in which the wavelength is short is used, the following advantages can be anticipated.

a) Since a wide communication bandwidth can be assured by the millimeter wave communication, it is possible to use a high data rate simply.

b) The frequency to be used for transmission can be spaced away from a frequency for a different baseband signal process, and therefore, interference in frequency between a millimeter wave and a baseband signal is less likely to occur.

c) Since wavelengths in the millimeter waveband are short, the antenna and the waveguide structure which depend upon the wavelength can be made small. In addition, since the distance attenuation is great and the diffraction is small, electromagnetic shielding can be carried out readily.

d) A millimeter wave can be blocked readily and prevented from leaking to the outside particularly for signal transmission between fixed positions or in a known positional relationship.

While, in the description of the present embodiment, a system which carries out communication in the millimeter waveband is described as an example of the wireless transmission system, the application range thereof is not limited to a system which uses the millimeter waveband for communication. Communication in a frequency band lower than the millimeter waveband or conversely higher than the millimeter waveband may be applied alternatively. For example, the microwave waveband may be applied. However, where a MIMO process, that is, an inverse matrix calculation process, is adopted for signal transmission within a housing or in signal transmission between different apparatus, it is considered most effective to use the millimeter waveband whose wavelength is not excessively long nor excessively short in a relationship between the size of various members and the wavelength.

<Application Technique of Space Division Multiplexing>

FIGS. 3A to 3C illustrate appropriate conditions, that is, application conditions, of the "space division multiplexing" adopted in the present embodiment. FIGS. 4A to 4F show an outline of a structure of the millimeter wave signal transmission path 9 for applying the "space division multiplexing."

[Appropriate Conditions of the Space Division Multiplexing]

FIGS. 3A to 3C particularly illustrate a manner of setting of appropriate conditions where the space division multiplexing is applied. For example, the propagation loss L of a free space can be represented by "L [dB]=$10 \log_{10}((4\pi d/\lambda)^2)$ ... (A)" as seen in FIG. 3A where d is the distance and $\lambda$ is the wavelength.

Two kinds of space division multiplexing are considered as seen in FIGS. 3A to 3C. In FIGS. 3A to 3C, the transmitter is represented by "TX" and the receiver is represented by "RX." Reference character "_100" represents the first communication device 100Y side and "_200" represents the second communication device 200Y side. Referring to FIG. 3B, the first communication device 100Y includes two channels of transmitters TX_100_1 and TX_100_2, and the second communication device 200Y includes two channels of receivers RX_100_1 and RX_200_2. In particular, signal transmission from the first communication device 100Y side to the second communication device 200Y side is carried out between the transmitter TX_100_1 and the receiver RX_100_1 and between the transmitter TX_100_2 and the receiver RX_200_2. In other words, signal transmission from the first communication device 100Y side to the second communication device 200Y side is carried out through the two channels.

Meanwhile, referring to FIG. 3C, the first communication device 100Y includes a transmitter TX_100 and a receiver RX_100 while the second communication device 200Y includes a transmitter TX_200 and a receiver RX_200. In particular, signal transmission from the first communication device 100Y side to the second communication device 200Y side is carried out between the transmitter TX_100 and the receiver RX_200, and signal transmission from the second communication device 200Y side to the first communication device 100Y side is carried out between the transmitter TX_200 and the receiver RX_100. Different channels are used for transmission and reception, and transmission (TX) and reception (RX) of data from and to both apparatus can be carried out by full duplex transmission.

The relationship between an inter-antenna distance $d_1$ and a spatial channel distance $d_2$, particularly a space distance between free space transmission paths 9B, necessary to obtain a necessary DU [dB], that is, a necessary ratio between a desired wave and an unnecessary wave, where an antenna having no directivity is given, from the expression (A), by "$d_2/d_1 = 10^{DU/20}$ ... (B)."

For example, if DU=20 dB, then $d_2/d_1=10$, and the spatial channel distance $d_2$ must be as long as ten times the inter-antenna distance $d_1$. Since usually an antenna has some directivity, even in the case of the free space transmission paths 9B, the spatial channel distance $d_2$ can be set shorter.

For example, if the distance to an antenna of the opposite party of communication is short, then the transmission power for the antennas can be suppressed low. If the transmission power is sufficiently low and a pair of antennas can be installed at positions sufficiently spaced away from each other, then interference between the paired antennas can be suppressed sufficiently low. Particularly in millimeter wave communication, since the wavelength of a millimeter wave is short, the distance attenuation is great and also the diffraction is small, and therefore, space division multiplexing can be implemented readily. For example, even with the free space transmission paths 9B, the spatial channel distance $d_2$, that is, the space distance between the free space transmission paths 9B, can be set smaller than ten times the inter-antenna distance $d_1$.

In the case of a dielectric transmission path or a hollow waveguide having a millimeter wave confining structure, since a millimeter wave can be transmitted while it is confined in the inside, the spatial channel distance $d_2$, that is, the space distance between the free space transmission paths, can be set shorter than ten times the inter-antenna distance $d_1$. Particularly in contrast to the free space transmission paths 9B, the channel distance can be reduced further.

[Examples of the Structure of the Millimeter Wave Signal Transmission Path for the Space Division Multiplexing]

FIGS. 4A to 4F show several examples of the structure of the millimeter wave signal transmission path for the space division multiplexing. When it is intended to increase the number of transmission channels, where the space division multiplexing is not applied, it seems a possible idea, for example, to apply frequency division multiplexing to use carrier frequencies different among different channels. However, if the space division multiplexing is applied, then even if the same carrier frequency is used, simultaneous signal transmission can be carried out without being influenced by interference.

In particular, the "space division multiplexing" may be achieved using any configuration only if a plurality of channels of independent millimeter wave signal transmission paths 9 are formed in a three-dimensional space through which a millimeter wave signal or an electromagnetic wave can be transmitted. Thus, the configuration is not limited to the specific configuration wherein a plurality of channels of free space transmission paths 9B are formed in a free space such that they are spaced from each other by a distance with which interference does not occur (refer to FIG. 4A).

For example, as seen in FIG. 4B, where a plurality of channels of free space transmission paths 9B are provided in a free space, a structure for disturbing propagation of a radio wave, that is, a millimeter wave blocking body MX, may be arranged between each adjacent ones of transmission channels in order to suppress interference between the transmission channels. The millimeter wave blocking body MX may be or may not be a conductor.

Each of the plural channels of millimeter wave signal transmission paths 9 may be configured as a free space transmission path 9B such that a signal propagates, for example, in a space in a housing. However, a free space is not necessarily required, but a millimeter wave confining structure may be used instead. The millimeter wave confining structure is preferably formed from a waveguide structure of a waveguide pipe, a transmission path, a dielectric line or the inside of a dielectric member such that it has a characteristic of transmitting an electromagnetic wave in the millimeter waveband efficiently.

For example, such a dielectric transmission path 9A as seen in FIG. 4C may be adopted which is configured including a dielectric material having a relative dielectric constant within a fixed range and a dielectric loss tangent within a fixed range. For example, if a dielectric material is filled in the entire housing, then not free space transmission paths but dielectric transmission paths 9A are disposed between the transmission path coupler 108 and the transmission path coupler 208. Or, the dielectric transmission path 9A may be configured by connecting the antenna of the transmission path coupler 108 and the antenna of the transmission path coupler 208 to each other by a dielectric line which is a line member formed from a dielectric material and having a certain diameter.

The "fixed range" may be any range of the relative dielectric constant or the dielectric loss tangent within which an effect of the present configuration can be achieved, and the relative dielectric constant or the dielectric loss tangent may have a value within this range. In short, the dielectric material may be any material which can transmit a millimeter wave and has a characteristic with which the effect of the present configuration can be achieved. Since the effect of the present configuration does not rely only upon the dielectric material itself but relates also to the transmission path length or the frequency of the millimeter wave, the relative dielectric constant or the dielectric loss tangent cannot necessarily be determined definitely. However, as an example, they can be determined in the following manner.

In order to allow a signal of a millimeter wave to be transmitted at a high speed in the dielectric transmission path 9A, the relative dielectric constant of the dielectric material preferably is approximately 2 to 10, and more preferably is approximately 3 to 6, and the dielectric loss constant of the dielectric material preferably is 0.00001 to 0.01, more preferably is approximately 0.00001 to 0.001. As the dielectric material which satisfies such conditions as given above, acrylic resin-based, urethane resin-based, epoxy resin-based, silicone-based, polyimide-based and cyanoacrylate-based materials are available. Unless otherwise specified, such ranges of the relative dielectric constant and the dielectric loss constant of the dielectric material as given above are applied similarly in the present configuration.

Where the dielectric transmission path 9A is configured in a millimeter wave confining structure, a dielectric shielding member of a metal member or the like for suppressing external radiation of a millimeter wave signal, that is, a millimeter wave blocking body MY, may be provided on an outer periphery of the dielectric transmission path 9A as seen in FIG. 4D to suppress external radiation of a millimeter wave. Preferably, the millimeter wave blocking body MY is set to a fixed potential such as, for example, the ground potential, on the circuit board. Where the millimeter wave blocking body MY is formed from a conductor, a shielding performance can be assured with a higher degree of certainty than where the millimeter wave blocking body MY is not formed from a conductor.

As another example of the millimeter wave confining structure, a hollow waveguide 9L which is surrounded over an outer periphery thereof by a shielding member and has a hollow structure may be used. For example, as seen in FIG. 4E, the hollow waveguide 9L is structured such that it is surrounded over an outer periphery thereof by a conductor MZ which is an example of a shielding member and is hollow. The surrounding conductor MZ may be provided on any one of two boards disposed in an opposing relationship to each other. The propagation loss L between the surrounding conductor MZ and one of the boards, more particularly, the length of a gap from an end of the conductor MZ to the opposing board, is set to a sufficiently low value in comparison with the wavelength of the millimeter wave. Where the surrounding shielding member is formed as the conductor MZ, the shielding performance can be assured with a higher degree of certainty than where it is not formed from a conductor.

If FIGS. 4B and 4E are compared with each other, then the hollow waveguide 9L has a structure similar to the free space transmission path 9B where the millimeter wave blocking body MX is disposed in the free space transmission path 9B but is different from the free space transmission path 9B in that the conductor MZ which is an example of a millimeter wave shielding member is provided in such a manner as to surround the antenna. Since the inside of the conductor MZ is hollow, there is no necessity to use a dielectric material, and the millimeter wave signal transmission path 9 can be configured simply and readily at a low cost. Preferably, the conductor MZ is set to a fixed potential such as, for example, the ground potential on the board.

The configuration of the hollow waveguide 9L is not limited to that wherein an enclosure is formed from the conductor MZ on the board, but the hollow waveguide 9L may be configured such that a hole which may be or may not be a through-hole is formed in a rather thick board such that the wall face of the hole is utilized as the enclosure as seen in FIG. 4F. The hole may have an arbitrary sectional shape such as a circular shape, a triangular shape or a quadrangular shape. In this instance, the board functions as a shielding member. The hole may be formed in one or both ones of a pair of boards disposed in an opposing relationship to each other. The side wall of the hole may be or may not be covered with a dielectric member. Where the hole is formed as a through-hole, an antenna should be disposed on or attached to the rear face of a semiconductor chip. Where the hole is formed not as a through-hole but as a bottomed or blind hole, an antenna should be installed on the bottom of the hole.

Since the dielectric transmission path 9A and the hollow waveguide 9L confine a millimeter wave therein by the enclosure thereof, they can achieve such advantages that a millimeter wave can be transmitted efficiently with comparatively low loss, that external radiation of a millimeter wave is suppressed and that an EMC countermeasure can be taken comparatively easily.

As a further example of the millimeter wave confining structure, where a three-dimensional space which can transmit a millimeter wave signal which is an electromagnetic signal is configured from a dielectric material which is an entity, a plurality of channels of independent millimeter wave signal transmission paths 9, particularly the dielectric transmission paths 9A (this similarly applies in this paragraph), are formed on the dielectric material. For example, it seems a possible idea to configure a printed board, on which electronic circuit parts are mounted, from a dielectric material and use the printed board as a dielectric transmission path 9A. In this instance, it seems a possible idea to form a plurality of independent dielectric transmission paths 9A in the board.

Where the space division multiplexing is applied, it may seem a possible idea to adopt a system configuration which includes various types of millimeter wave signal transmission paths 9 which are combined such that one of the millimeter wave signal transmission paths 9 is formed as the free space transmission path 9B and another one of the millimeter wave signal transmission paths 9 is formed so as to have a millimeter wave confining structure like the dielectric transmission path 9A or the hollow waveguide 9L.

<Modulation and Demodulation>

Figure 5A:
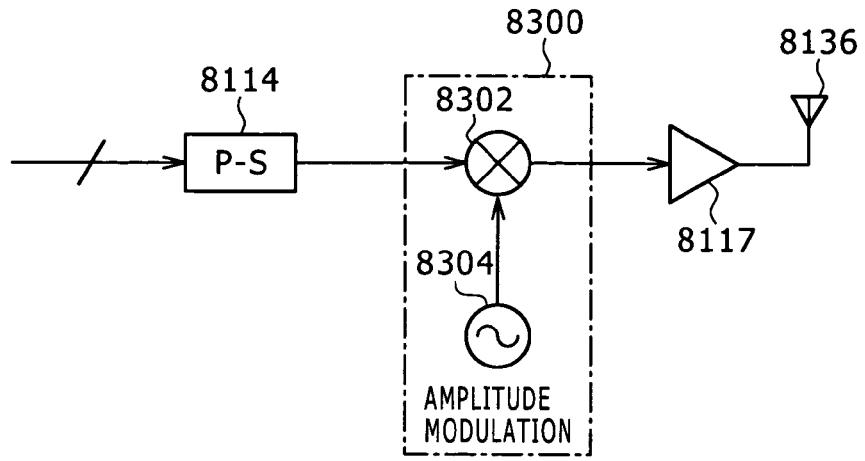
FIGS. 5A to 5C are block diagrams illustrating a configurational example of a modulation functional unit and a demodulation functional unit in a communication processing channel.
Figure 5B:
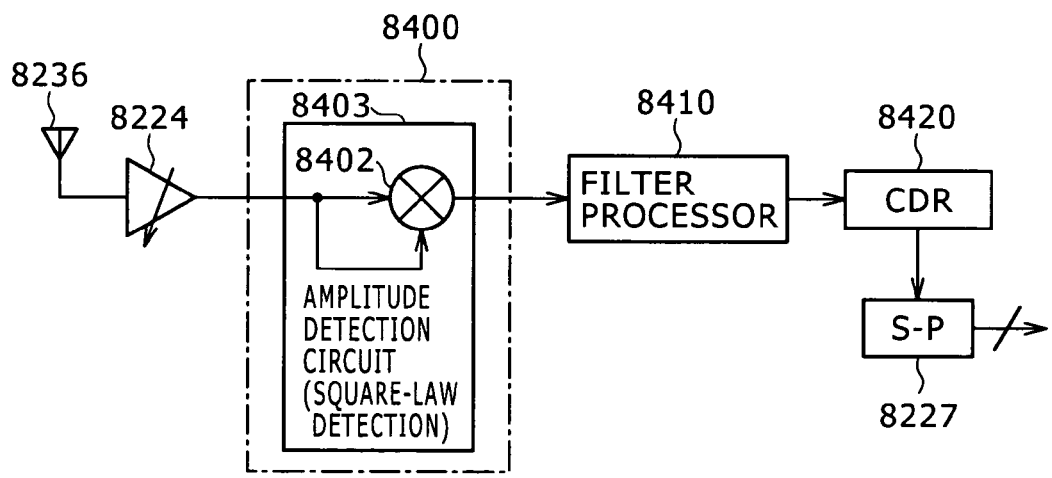

FIGS. 5A and 5B show a configurational example of a modulation functional unit and a demodulation functional unit in the communication processing channel.

[Modulation Functional Unit]

FIG. 5A shows a configuration of a modulation functional unit 8300 provided on the transmission side. A signal of a transmission subject, for example, an image signal of 12 bits, is converted by the parallel-serial converter 114 into a high-speed serial data string and supplied to the modulation functional unit 8300.

The modulation functional unit 8300 can adopt various circuit configurations in accordance with the modulation method. However, for example, if a method of modulating only the amplitude is adopted, then the modulation functional unit 8300 should be configured such that it includes a frequency mixer 8302 and a transmission side local oscillator 8304.

The transmission side local oscillator 8304 which serves as a first carrier signal generating unit generates a carrier signal to be used for modulation, that is, a modulation carrier signal. The frequency mixer 8302 which serves as a first frequency converter multiplies or modulates a carrier in the millimeter waveband generated by the transmission side local oscillator 8304 by or with a signal from a parallel-serial converter 8114 which corresponds to the parallel-serial converter 114 to generate a modulation signal in the millimeter waveband. The modulation signal is supplied to an amplifier 8117 which corresponds to the amplifier 117. The modulation signal is amplified by the amplifier 8117 and radiated from an antenna 8136.

[Demodulation Functional Unit]

Figure 5C:
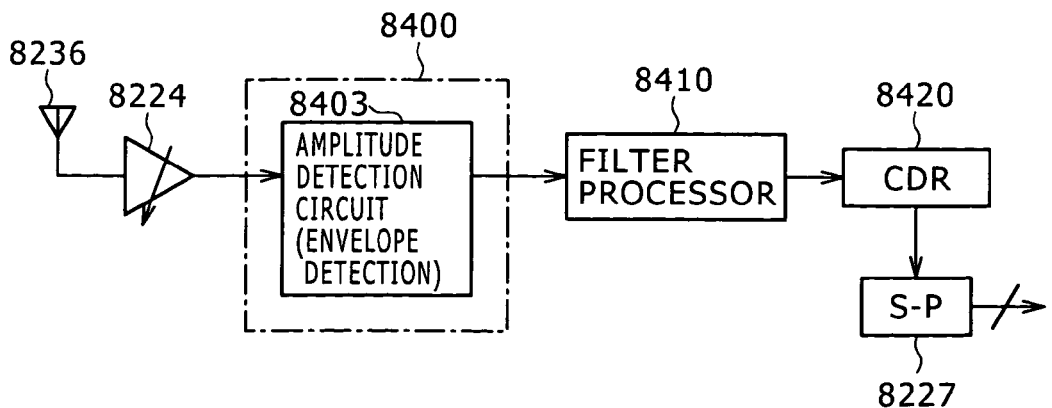

FIGS. 5B and 5C show a configuration of a demodulation functional unit 8400 provided on the reception side. While the demodulation functional unit 8400 can have various circuit configurations within a range corresponding to the modulation method on the transmission side, it is assumed here that the demodulation functional unit 8400 adopts a method applied where only the amplitude is modulated so as to correspond to the description of the modulation functional unit 8300 given hereinabove.

As seen in FIG. 5B, the demodulation functional unit 8400 of the first example includes a frequency mixer 8402 or mixer circuit of the 2-input type as an example of an amplitude detection circuit 8403 and uses a square-law detection circuit from which a detection output which increases in proportion to the square of the amplitude of an envelope of a received millimeter wave signal can be obtained.

A filter processor 8410, a clock recovering unit 8420 which is a clock data recovery (CDR) unit and a serial-parallel converter (S-P) 8127 which corresponds to the serial-parallel converter 127 are provided on the succeeding stage to the frequency mixer 8402. The filter processor 8410 includes, for example, a low-pass filter (LPF).

A millimeter wave reception signal received by an antenna 8236 is inputted to an amplifier 8224 of the variable gain type, which corresponds to the amplifier 224 and by which amplitude adjustment is carried out for the millimeter wave reception signal. An output signal of the amplifier 8224 is supplied to the demodulation functional unit 8400. In particular, the amplitude-adjusted reception signal from the amplifier 8224 is inputted simultaneously to two input terminals of the frequency mixer 8402, by which a square signal is generated. The square signal is supplied to the filter processor 8410. The low-pass filter of the filter processor 8410 removes high frequency components from the square signal generated by the frequency mixer 8402 to generate a waveform of the input signal sent from the transmission side, that is, a baseband signal. The baseband signal is supplied to the clock recovering unit 8420.

The filter processor 8410 (CDR) recovers a sampling clock based on the baseband signal and samples the baseband signal with the recovered sampling clock to generate a reception data string. The generated reception data string is supplied to a serial-parallel converter 8227 (S-P), by which parallel signals, for example, an image signal of 12 bits, are recovered. Although various methods are available for clock recovery, for example, a symbol synchronizing method is adopted.

It is to be noted that it seems a possible idea for the amplitude detection circuit 8403 to be configured using a simple envelope detection circuit which does not have a square-law characteristic in place of the square-law detection circuit as in the case of the second example shown in FIG. 5C. The envelope detection circuit has an advantage that it is free from a problem of secondary strain of an input-output characteristic although such secondary strain matters with the square-low detection circuit.

<Relationship between Multi-Channel Transmission and Space Division Multiplexing>

FIGS. 6A to 6D illustrate a basic mechanism for achieving moderation of an interference countermeasure in the relationship between multi-channel transmission and space division multiplexing.

As one of techniques for achieving multi-channel transmission, it seems a possible idea to apply space division multiplexing as described hereinabove with reference to FIGS. 1 to 4F. However, also it seems a possible idea to use different carrier frequencies between communication transmission and reception pairs. That is, multi-channel transmission can be implemented by a frequency division multiplexing. Also full duplex bidirectional transmission can be implemented readily if different carrier frequencies are used, and also it is possible to implement a situation in which a plurality of semiconductor chips (such as a set of the transmission-side signal generating unit 110 and the reception-side signal generating unit 220 and a set of the transmission side signal generation unit 210 and the reception-side signal generating unit 120) communicate independently with each other within a housing of an electronic apparatus.

[Problems]

However, if a multi-channel configuration is adopted based on frequency division multiplexing in this manner, then as can be recognized from the description of frequency multiplexing given hereinabove with reference to FIGS. 2A to 2E, there is the necessity to assure a considerably great use band for the entire millimeter wave signal transmission path 9. This makes a problem to a transmission path whose bandwidth, is limited like the dielectric transmission path 9A although the free space transmission path 9B can satisfy this requirement.

Meanwhile, the space division multiplexing can be applied readily to wireless communication within an apparatus or between different apparatus, and since the same carrier frequency can be used among different channels, there is an advantage that the restriction to the transmission bandwidth is eliminated. However, with the space division multiplexing, such an interference countermeasure as described hereinabove with reference to FIGS. 4A to 4F is required. For example, with such a free space transmission path 9B as described hereinabove with reference to FIG. 4A, it is essential to assure a sufficient distance between transmission (reception) antennas. However, this signifies that there is a restriction to the distance between channels, and makes a problem where there is the necessity to dispose a large number of antenna pairs (transmission channels) within a limited space.

As another technique for an interference countermeasure, it seems a possible idea to adopt such a structure as to prevent propagation of radio waves between the transmission (reception) antennas as shown, for example, in FIG. 4B. Alto it seems a possible idea to adopt such a confining structure as the dielectric transmission path 9A or the hollow waveguide 9L as described hereinabove with reference to FIGS. 4C to 4F to reduce the distance between channels. However, those techniques have a difficult point that a higher cost is required than that of the free space transmission path 9B.

[Principle of the Countermeasure against the Problems]

Therefore, the wireless transmission system 1 of the present embodiment is proposed as a system which can moderate the degree of the requirement for an interference countermeasure even where the millimeter wave signal transmission path 9 is formed as the free space transmission path 9B in order to implement multiplexing transmission by space division multiplexing. "To moderate the degree of the requirement for an interference countermeasure" signifies that it is made possible to reduce the distance between channels without the millimeter wave blocking body MX or that the interference countermeasure can be moderated.

A basic concept is to make it possible to reduce the distance between channels by providing the MIMO processors 603 and 604 on the reception side to take an interference countermeasure from the aspect of baseband signal processing.

The MIMO processors 603 and 604 are an example of transmission characteristic correction units which carry out correction calculation based on a transmission characteristic of the millimeter wave signal transmission path 9 (transmission space) between the antenna 136 and the antenna 236 (reception antennas) for each of a plurality of transmission-subject signals corresponding to the plural antennas 136 (transmission antennas). The transmission characteristic is represented by a channel matrix, and as the correction calculation, inverse matrix calculation is carried out for the transmission-subject signals of the channels.

The significance of the correction calculation (inverse matrix calculation) is to make it possible to acquire a transmission-subject signal from which an influence of a transmission characteristic is eliminated as a processed signal by correcting a transmission characteristic of a demodulation signal. Where the modulation methods for the channels are same as each other, demodulation components based on unnecessary waves received by the antennas 236 are canceled fully. Where the modulation methods for the channels are different from each other, although components of unnecessary waves are not cancelled fully, an influence of the unnecessary wave components can be prevented by treatment of a demodulation process.

Here, the MIMO process of the MIMO processors 603 and 604 in the present embodiment is characterized in that it is a MIMO process which is intended only for direct waves between transmission and reception of each antenna. This is much different from an ordinary MIMO process for wireless transmission which may be carried out between different apparatus or within a housing in that the ordinary MIMO process becomes a signal process which handles a plurality of reception signals. This is because, as a countermeasure for multipath transmission that a radio wave transmitted from the transmission side is reflected or diffracted by parts, walls and so forth in a housing and consequently the same radio wave arrives at the reception side from a plurality of different routes, one reception antenna handles a plurality of reception signals including also reflection waves transmitted along different routes which are different from a route along which a direct wave emitted from the same transmission antenna is transmitted.

This is because, where a millimeter wave or (microwave) having a comparatively short wavelength is used in wireless signal transmission within an apparatus or between different apparatus, it is possible to substantially eliminate an obstacle to the wireless transmission in a space in which the millimeter wave signal transmission path 9 to which the space division multiplexing is applied is formed, and in this instance, there is little necessity to take an influence of reflected waves into consideration.

If a radio wave from a plurality of paths is received on the reception side in a multipath environment, then since the paths are different in distance therebetween, the time required for the radio wave from the transmission side to arrive at the reception side differs between the different paths. Therefore, a plurality of radio waves having phases displaced from each other are received by the reception side. As a result, the waveform of the reception signal is distorted, resulting in the possibility that the signal may not be received. As a countermeasure against this, it seems a possible idea to apply a MIMO process. In this instance, also an approach to the channel matrix becomes conforming to the multipath countermeasure.

However, the MIMO process in the present embodiment is different from such a MIMO process for a multipath countermeasure as just described, and also the approach to the channel matrix is different from that for a multipath countermeasure.

However, although it is easy to solve an inverse matrix to a channel matrix in an environment in which reflected waves exist abundantly, there is the possibility that it may be difficult to obtain an inverse matrix to a channel matrix in a real environment in which direct waves only exist without reflected waves. In the present embodiment, the antenna arrangement is restricted so as to prevent it from becoming difficult to obtain an inverse matrix to a channel matrix.

Thereupon, although details are hereinafter described, in the present embodiment, the antenna arrangement (the distance between the antennas on the transmission side and the reception side) is set to a predetermined distance so that the number of multipliers (components of amplifiers) and adders required in a MIMO process can be reduced, and the MIMO process on the reception side is set in conformity with the setting. In other words, the antenna arrangement is determined so that the number of MIMO processes can be reduced, and MIMO processing on the reception side is carried out only for direct waves in conformity with the antenna arrangement.

The relationships described have an influence on whether or not quadrature detection or synchronous detection is required in the demodulation functional unit 8400. If quadrature detection or synchronous detection is unnecessary, then envelope detection or square-law detection can be applied. Although details are hereinafter described, the present embodiment adopts a configuration of applying envelope detection or square-law detection by setting the inter-antenna distance of the antennas 136 on the transmission side and the antennas 236 on the reception side so that the necessity for such quadrature detection or synchronous detection may be eliminated.

Anyway, by applying MIMO processing to the reception side, the demand for an interference countermeasure where the free space transmission path 9B is applied is moderated. Further, by commonly using a carrier frequency among different channels, it is made possible to carry out MIMO processing in a baseband on the reception side, and by restricting the antenna arrangement, the MIMO processing amount (inverse matrix calculation amount) is reduced.

While, in embodiments hereinafter described, a carrier frequency common to each channel is used, this is not essential, but at least it is necessary for the carrier frequencies of each channel to be in a mutually synchronized relationship. A basic approach to the space division multiplexing normally is to make carrier frequencies in different channels common (or equal) to each other. If a common frequency is applied to carrier signals on the transmission side, then since the influence of the carrier frequency is equal among each channel with certainty, MIMO processing in the baseband region can be carried out efficiently with certainty. Where the carrier frequencies are different among the different channels, such a countermeasure as to provide a demodulator or a frequency selection filter corresponding to each carrier frequency for each channel is required on the reception side, resulting in increase of the system scale. In those regards, use of a common carrier frequency among each channel exhibits significant advantages.

The MIMO process generally requires complex number processing (or corresponding processing) and increases the circuit scale. In contrast, by restricting the antenna arrangement paying attention to the fact that only direct waves are determined as a subject of processing and carrying out signal processing in conformity with the antenna arrangement, the MIMO calculation amount (inverse matrix calculation amount) can be reduced.

While, in the first example shown in FIG. 6A, the reception side has a one-chip configuration for the N channels while the transmission side has a configuration wherein the semiconductor chip 103 which accommodates the modulation functional unit 8300 (MOD) therein is used for each of the channels. Thus, the first example shown in FIG. 6A has an N:1 configuration. However, this is not an essential requirement where the MIMO processing is applied to the reception side.

For example, a second example shown in FIG. 6B has a 1:1 configuration wherein the reception side has a one-chip configuration and also the transmission side has a one-chip configuration. Where the configuration of the second example is adopted, since the transmission side has a one-chip configuration, it is not essential for the modulation functional unit 8300 in the transmission-side signal generating unit 110 to include the transmission side local oscillator 8304 for each of the channels. In particular, the transmission side local oscillator 8304 should be provided for only one channel, and in the remaining channels, a carrier signal itself generated by the transmission side local oscillator 8304 should be used to carry out frequency conversion (modulation).

A third example shown in FIG. 6C had a 1:N configuration wherein the transmission side has a one-chip configuration and the reception side has a configuration which uses a chip for each of the channels. A fourth example shown in FIG. 6D has an N:N configuration wherein the transmission side uses a chip for each of the channels and also the reception side uses a chip for each of the channels. In the third or fourth example, the MIMO processor 604 used commonly by all of the channels is provided between the demodulation functional units 8400 (DEMOD) of the individual channels and the serial-parallel converter 8227.

In the following, the wireless transmission system 1 of the present embodiment which carries out a MIMO process is described particularly paying attention to the MIMO process. It is to be noted that, unless otherwise specified, unidirectional communication from the first communication device 100 to the second communication device 200 is described for simplified description. Further, it is assumed that the transmission system has a chip configuration as an optimum form wherein the first communication devices 100 of M channels each accommodating the modulation functional unit 8300 are accommodated in one semiconductor chip 103. Also the reception system has a chip configuration as an optimum form wherein all of the reception-side signal generating units 220 of M channels each accommodating the demodulation functional unit 8400 are accommodated in one semiconductor chip 203. In short, communication is carried out from the first communication device 100 which incorporates one semiconductor chip 103 which accommodates the transmission-side signal generating units 110 of M channels to the second communication device 200 which incorporates one semiconductor chip 203 which accommodates the reception-side signal generating units 220 of M channels.

<Outline of MIMO Process Applied to Reception Side>

Figure 7A:
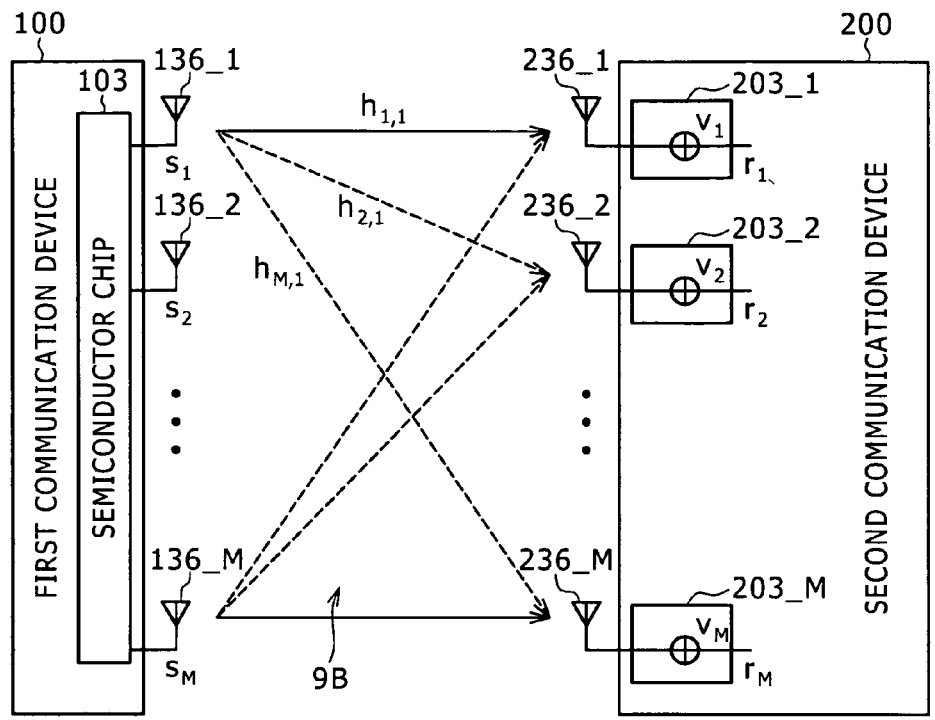
FIGS. 7A and 7B are diagrammatic views illustrating calculation of a MIMO process applied to the reception side.
Figure 7B:
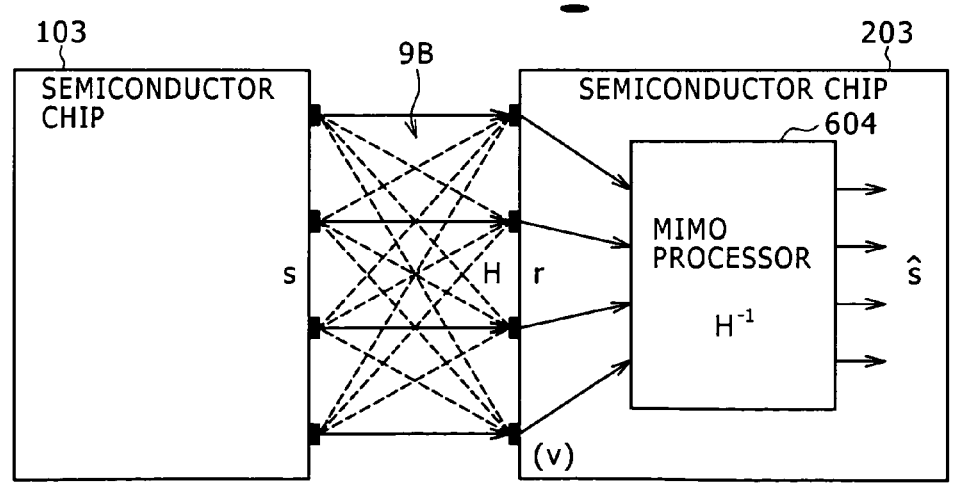
Figure 9A:
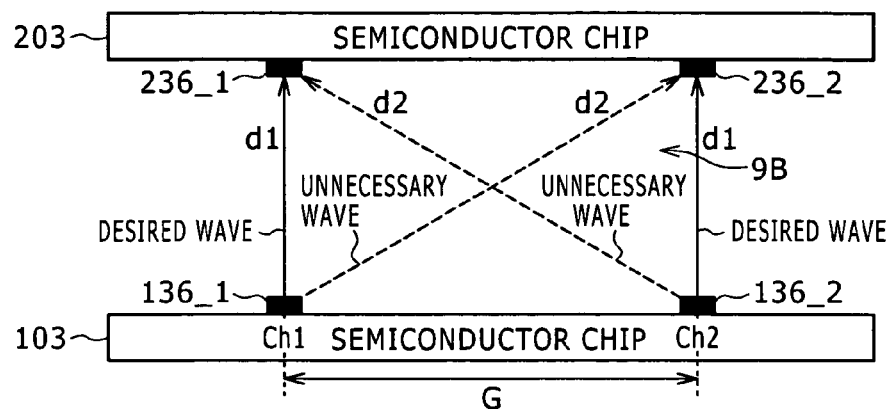
FIGS. 9A and 9B are a schematic view and a diagrammatic view, respectively, illustrating a basis of the MIMO process on the reception side where two channels are involved.
Figure 9B:
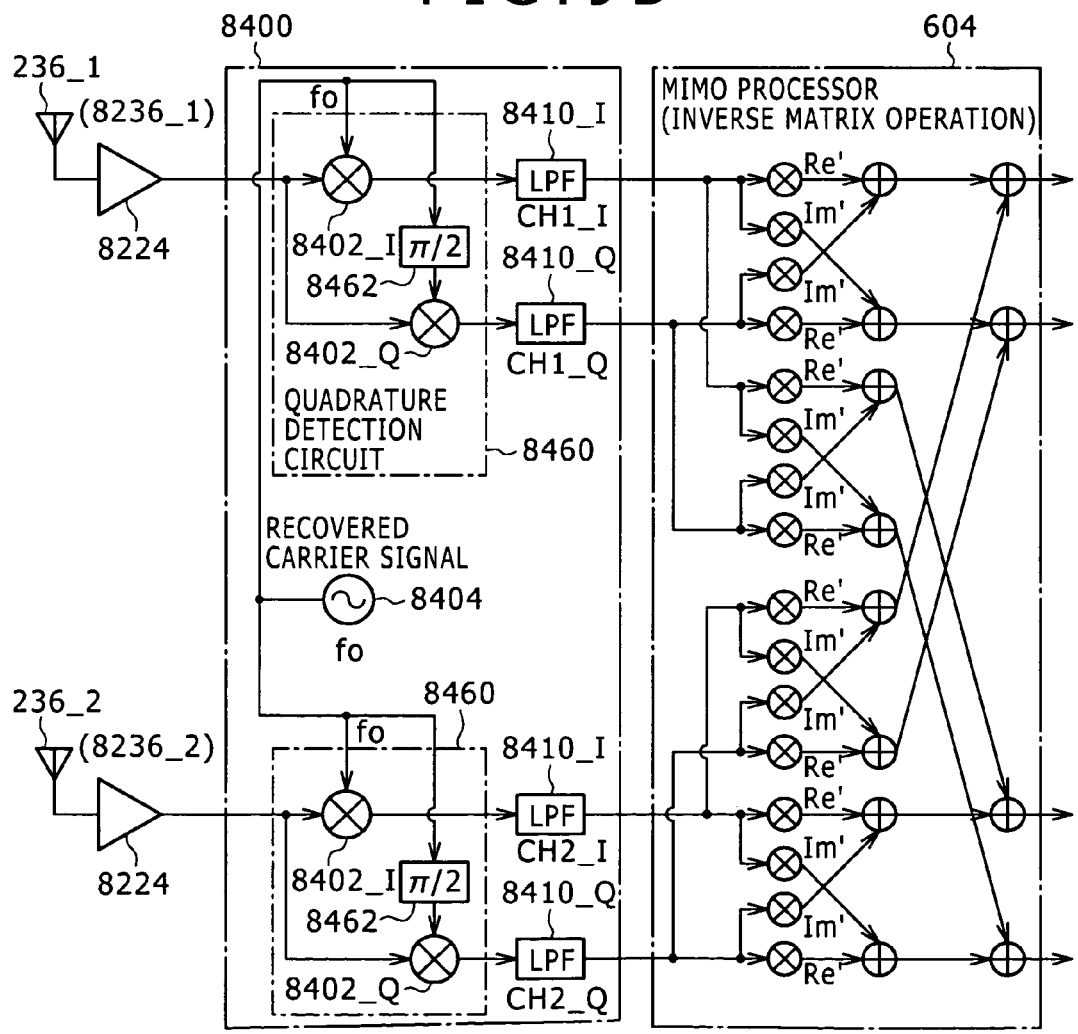
Figure 10A:
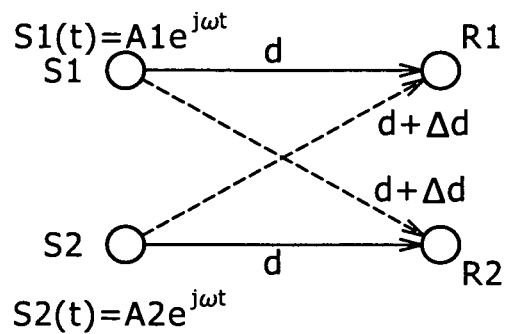
FIGS. 10A to 10C are diagrammatic views illustrating a relationship between a path difference and a channel matrix where two channels are involved.
Figure 10B:
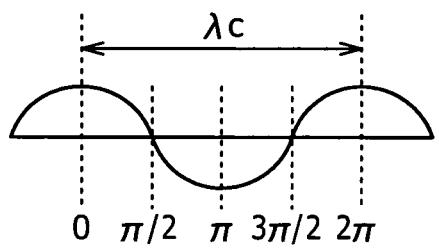
Figure 10C:
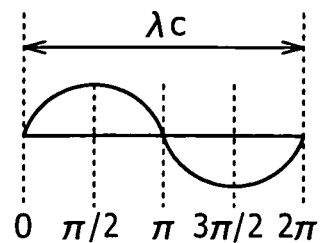
Figure 13:
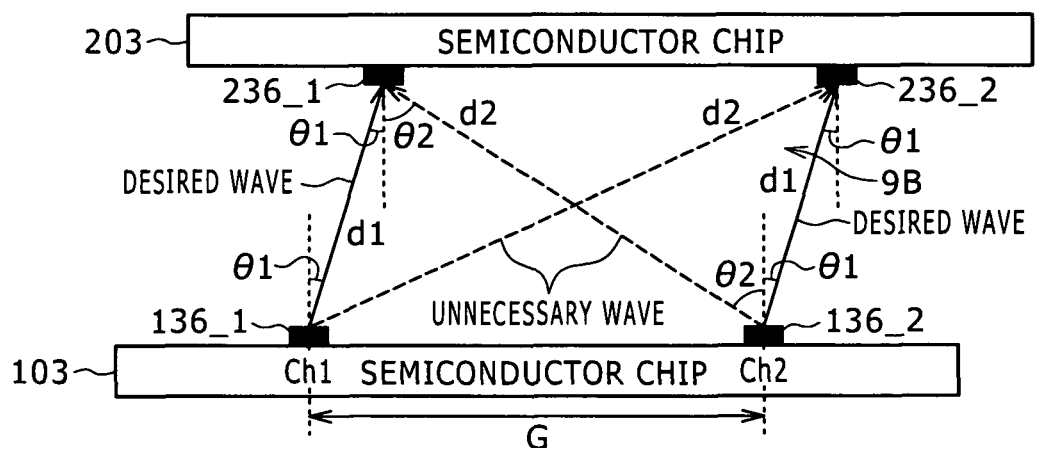
FIG. 13 is a schematic view illustrating an adjustment method of a path difference where an antenna has a phase characteristic which relies upon directivity.
Figure 14:
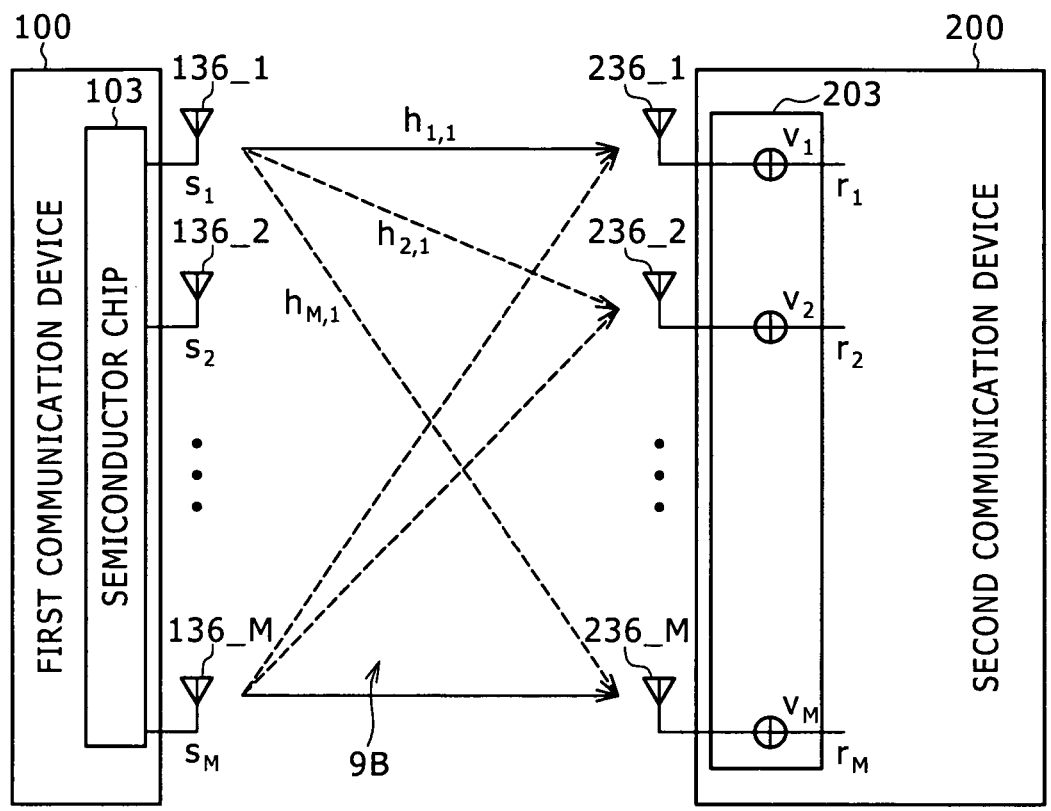
FIGS. 14 and 15 are diagrammatic views illustrating an application method of the MIMO process to a case wherein three or more antenna pairs are involved.
Figure 15:
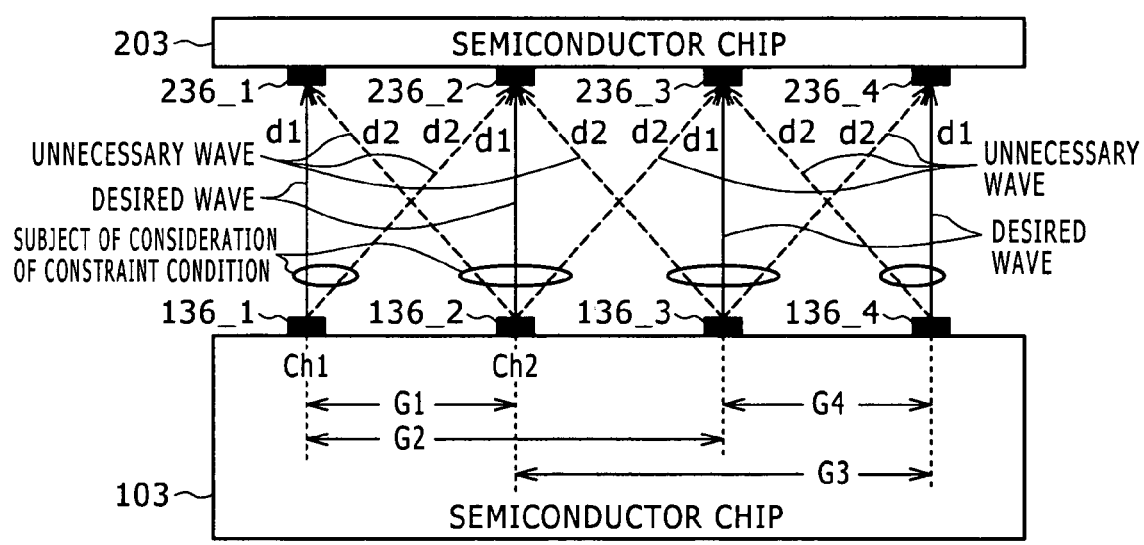
Figure 16A:
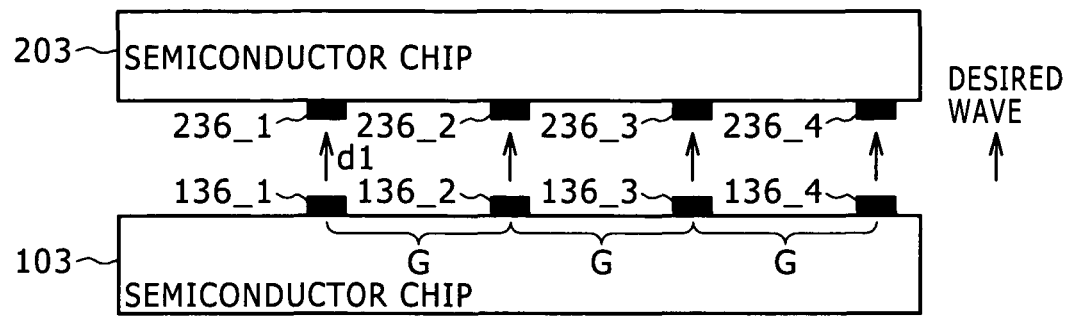
FIGS. 16A and 16B are schematic views illustrating an application method to a case wherein transmission and reception antennas are arranged three-dimensionally.
Figure 16B:
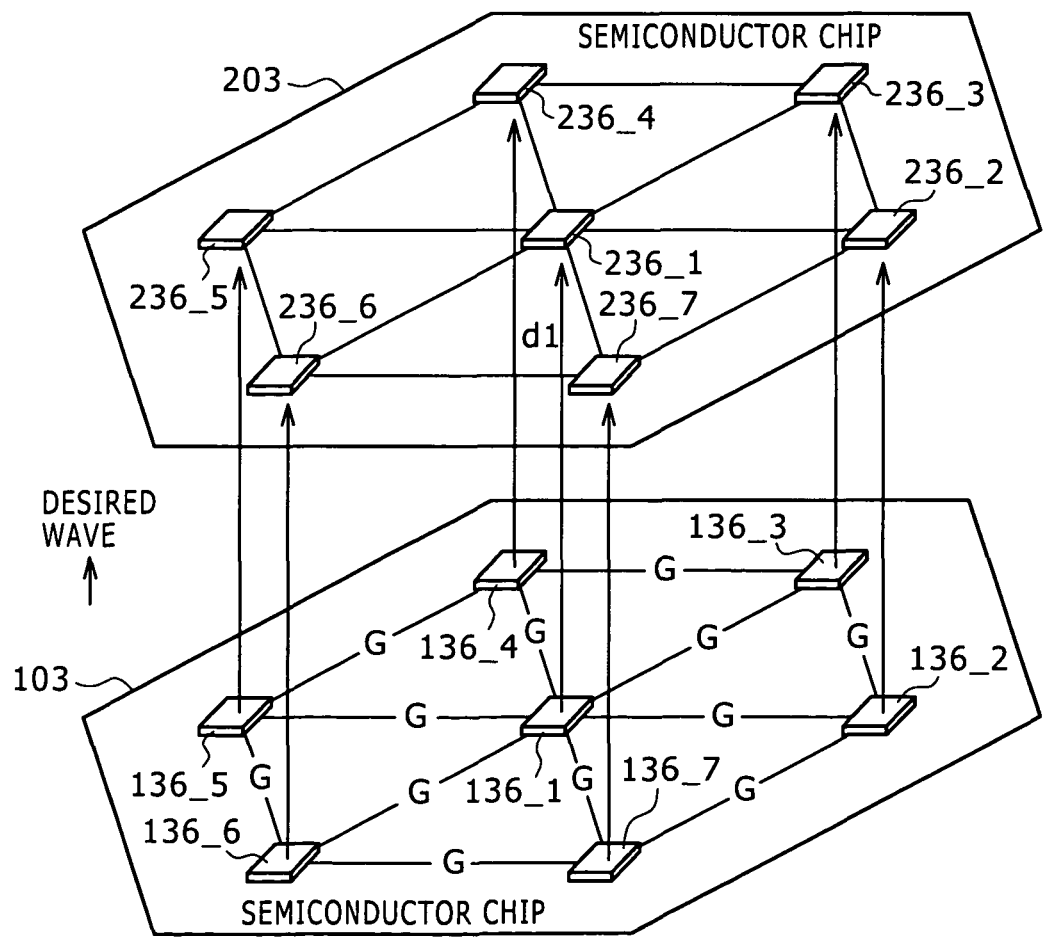
Figure 17A:
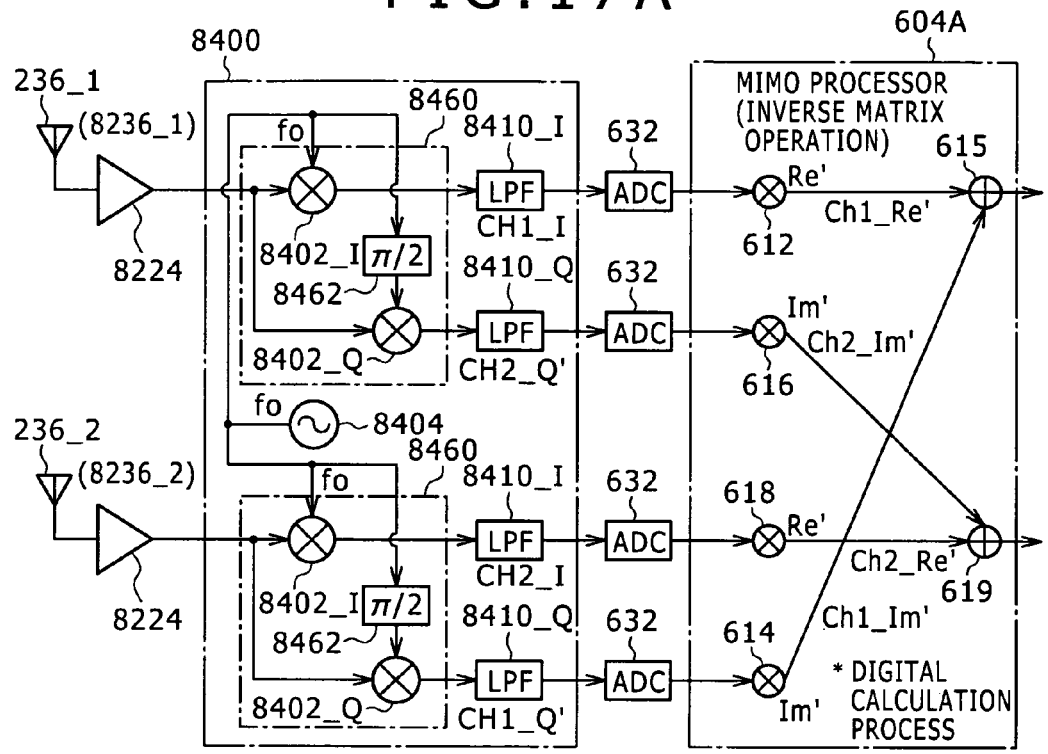
FIGS. 17A and 17B are block diagrams showing a basic configuration where the MIMO process on the reception side is carried out by digital processing.
Figure 17B:
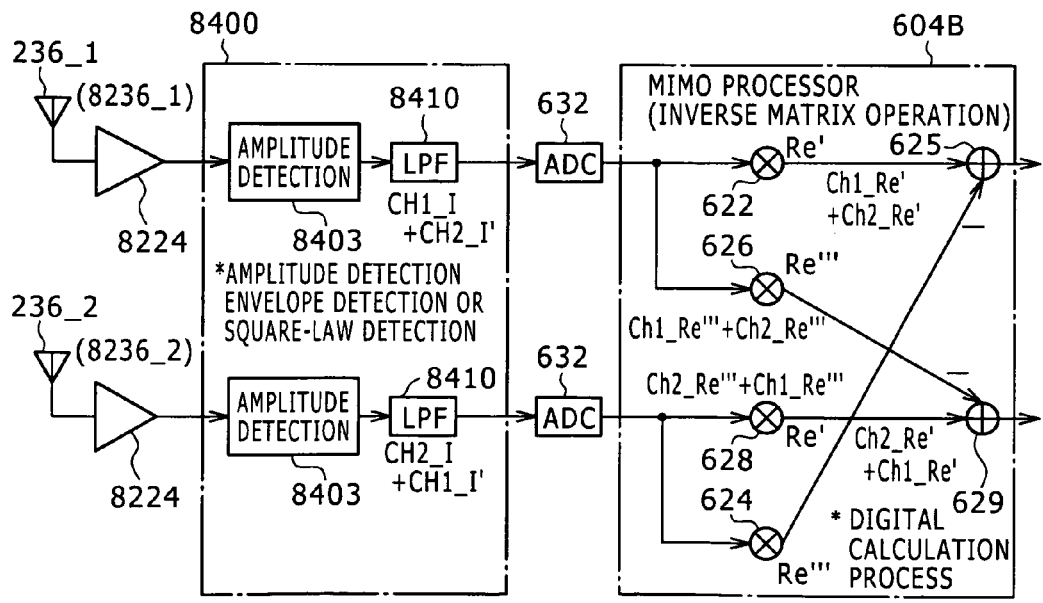

FIGS. 7A to 17B illustrate an outline of a MIMO process applied to the reception side. In particular, FIGS. 7A and 7B illustrate calculation of the MIMO process applied to the reception side. FIG. 8 illustrates a basis of a calculation technique of the MIMO process applied to the reception side. FIGS. 9A and 9B illustrate a basis of the MIMO process on the reception side where two channels are used. FIGS. 10A to 10C illustrate a relationship between a path difference and a channel matrix where two channels are used. FIGS. 11A to 11D illustrate reference example (referred to as first example) of constraint conditions for antenna arrangement where two channels are used. FIGS. 12A to 12D illustrate constraint conditions of the present embodiment (referred to as second example) for antenna arrangement where two channels are used. FIG. 13 illustrates an adjustment or correction method of a path difference where an antenna has a phase characteristic which relies upon directivity. FIGS. 14 and 15 illustrate application techniques of the MIMO process where three or more antenna pairs are used. FIGS. 16A and 16B illustrate an application technique of the MIMO process to a case wherein antennas for transmission and reception are arranged three-dimensionally. FIGS. 17A and 17B illustrate basic configurations where a MIMO process on the reception side is carried out by digital processing.

[Calculation of the MIMO Process]

FIGS. 7A and 7B illustrate an approach to a calculation method of the MIMO process applied in the present embodiment. In FIGS. 7A and 7B, in order to use M transmission channels in space division multiplexing, M antennas 136 and 236 are used. From each of the antennas 136 on the transmission side, a millimeter wave signal is transmitted to the antennas 236 on the reception side which are disposed in an opposing relationship to the antennas 136.

Referring to FIGS. 7A and 7B, a solid line indicates a desired wave transmitted from the antenna 136_1 directly to the antenna 236_1 disposed in an opposing relationship to the antenna 136_1. Meanwhile, a broken line indicates an unnecessary wave or interference wave transmitted from the antenna 136_1 to another antenna 236_2 which is not disposed in an opposing relationship to the antenna 136_1. Both of the desired wave and the unnecessary wave are direct waves transmitted directly from the antenna 136_1 to the antennas 236_1 and 236_2, respectively.

Here, a channel matrix H applied to calculation of the MIMO process is represented by an expression (1-1) given below. In the channel matrix H of M rows and M columns, an element of i=j from among matrix elements $h_{i,j}$ is an element relating to a desired wave, and an element of i≠j is an element relating to an unnecessary wave. Further, a reception signal r at this time is represented by an expression (1-2) given below. In the expression (1-2), s denotes a transmission signal and v denotes noise.

$$H = \begin{pmatrix} h_{1,1} & h_{1,2} & \cdots & h_{1,M} \\ h_{2,1} & h_{2,2} & \cdots & h_{2,M} \\ & & \ddots & \\ h_{M,1} & h_{M,2} & \cdots & h_{M,M} \end{pmatrix}_{M \times M} \quad (1\text{-}1)$$

$$\begin{pmatrix} r_1 \\ r_2 \\ \vdots \\ r_M \end{pmatrix} = \begin{pmatrix} h_{1,1} & h_{1,2} & \cdots & h_{1,M} \\ h_{2,1} & h_{2,2} & \cdots & h_{2,M} \\ \vdots & \vdots & \ddots & \\ h_{M,1} & h_{M,2} & \cdots & h_{M,M} \end{pmatrix} \begin{pmatrix} s_1 \\ s_2 \\ \vdots \\ s_M \end{pmatrix} + \begin{pmatrix} v_1 \\ v_2 \\ \vdots \\ v_M \end{pmatrix} \quad (1\text{-}2)$$

$$r = Hs + v$$

$$(1)$$

As seen from FIG. 7B, in the MIMO process on the reception side by the MIMO processor 604, an inverse matrix $H^{-1}$ (also called reception signal weight matrix) to the channel matrix H is multiplied by the reception signal r. As a result, on the reception side, a transmission-subject signal s (+noise component $H^{-1} \cdot v$) is obtained. The transmission-subject signal s is a baseband signal before the modulation.

As can be recognized from this, if the MIMO process is applied in the baseband region after the demodulation on the reception side, then the transmission-subject signal s which is free from an influence of an interference wave can be acquired. As a result, where it is intended to implement multiplexing transmission by space division multiplexing, even where the millimeter wave signal transmission path 9 is formed as the free space transmission path 9B, the degree of requirement for an interference countermeasure can be moderated, and the interference countermeasure can be eliminated. Alternatively, the interference countermeasure can be moderated.

The inverse matrix calculation by the MIMO processor 604 based on the inverse matrix $H^{-1}$ is a process of superposing inverse components in a baseband region to components based on unnecessary waves received by the antenna 236 on the reception side on demodulation outputs of the reception signals of desired waves and unnecessary waves so that the components based on the unnecessary waves may be canceled.

[Relationship between MIMO Process Applied to Reception Side and Carrier Frequency]

FIG. 8 illustrates a relationship between the MIMO process applied to the reception side and the carrier frequency. Referring to FIG. 8, the first communication device 100 includes a modulation functional unit 8300 which in turn includes a plurality of amplitude detection frequency mixers 8302 for individual channels. In the present example, the frequency mixers 8302 of the individual channels adopt a method which modulates the amplitude but do not adopt quadrature modulation. The modulation functional unit 8300 further includes a single transmission side local oscillator 8304 used commonly to all channels. A carrier signal itself generated by the transmission side local oscillator 8304 is used by the frequency mixers 8302 of the channels to carry out modulation. This configuration is convenient because the semiconductor chip 103 on the transmission side has a one-chip configuration.

The second communication device 200 includes a demodulation functional unit 8400 which in turn includes a plurality of amplitude detection circuits 8403 for individual channels. The amplitude detection circuit 8403 is of the type which does not adopt quadrature detection or synchronous detection but simply demodulates an amplitude component of an amplitude modulation wave and is configured using, for example, an envelope detection circuit or a square-law detection circuit.

If the single transmission side local oscillator 8304 used commonly to all channels is provided and the carrier signal generated by the transmission side local oscillator 8304 is used by the frequency mixers 8302 of the channels to carry out modulation, then the influence of the carrier signal is equal among the different channels. By using a carrier frequency commonly to all channels in order to make the most of the basic advantage of the space division multiplexing, the influence of the carrier frequency becomes equal among the different symbols, and consequently, a MIMO process can be carried out in the baseband region on the reception side.

[Relationship between Constraint to Antenna Arrangement and MIMO Processing Amount]

FIGS. 9A to 12D illustrate a relationship between a constraint to the antenna arrangement and the MIMO processing amount, that is, the inverse matrix calculation amount.

For example, FIGS. 9A and 9B show the simplest configuration ready for two channels including two antenna pairs. Referring first to FIG. 9A, the semiconductor chip 103 on the transmission side includes antennas 136_1 and 136_2, and an antenna 236_1 is provided on a semiconductor chip 203_1 in a facing relationship to the antenna 136_1 while another antenna 236_2 is provided in a facing relationship to the antenna 136_2. It is to be noted that the antennas 136 are equivalent to the antennas 8136 while the antennas 236 are equivalent to the antennas 8236. This similarly applies also to the following description.

The term "facing" signifies that paired antennas are disposed such that they do not have a phase characteristic which relies upon directivity. In other words, the "facing" signifies that the radiation angle of a desired wave from an antenna 136 and the incidence angle of the desired wave to a corresponding antenna 236 are zero. Details of this "facing," a phase characteristic which relies upon the directivity of an antenna and so forth are hereinafter described. In the following description, unless otherwise specified, it is assumed that paired antennas are disposed in the "facing" state.

The distance between antennas relating to a desired wave is represented by d1. In particular, the facing distance between the antenna 136_1 of the semiconductor chip 103 and the antenna 236_1 of the semiconductor chip 203 is d1. Similarly, also the facing distance between the antenna 136_2 of the semiconductor chip 103 and the antenna 236_2 of the semiconductor chip 203 is d1. On the other hand, the distance between antennas relating to an unnecessary wave is d2. In particular the distance between the antenna 136_1 of the semiconductor chip 103 and the antenna 236_2 of the semiconductor chip 203 is d2. Similarly, also the distance between the antenna 136_2 of the semiconductor chip 103 and the antenna 236_1 of the semiconductor chip 203 is d2.

A desired wave transmitted from the antenna 136_1 is received directly by the antenna 236_1. A desired wave transmitted from the antenna 136_2 is received directly by the antenna 236_2. An unnecessary wave transmitted from the antenna 136_1 is received directly by the antenna 236_2. An unnecessary wave transmitted from the antenna 136_2 is received directly by the antenna 236_1.

Since the distance d1<distance d2, even if the transmission levels of the antennas 136_1 and 136_2 are equal, the reception level of the desired wave received by the antenna 236_1 or 236_2 is higher than the reception level of the unnecessary wave received by the antenna 236_2 or 236_1 due to distance attenuation. This makes also a factor of the fact that an inverse matrix to a channel matrix exists without exception.

A MIMO process generally requires complex number calculation or a process corresponding to such complex number calculation, and this increases the circuit scale. For example, in such a case wherein two antenna pairs are provided as seen in FIG. 9A, such a circuit configuration intended for universal use as seen in FIG. 9B is adopted. Where biaxial modulation, that is, modulation of an I component and a Q component, is carried out as in the QPSK, if path condition setting hereinafter described is not carried out, then real number multiplication is required by 16 ($=2\cdot 2\cdot 2^2$) times and addition is required by 12 times. If three channels are used, then real number multiplication is required by $2\cdot 2\cdot 3^2$ times, and generally if M channels are used, then real number multiplication is required by $2\cdot 2\cdot M^2$ times. In the case of uniaxial modulation as in the ASK method or the BPSK method, where M channels are used, real number multiplication is required by $2\cdot M^2$ times.

FIGS. 10A to 10C illustrate basic matters of a relationship between a distance difference $\Delta d$ (=d2−d1: hereinafter referred to as path difference $\Delta d$) between the inter-antenna distance d1 of a desired wave and the inter-antenna distance d2 of an unnecessary wave where two channels, that is, two antenna pairs, are used and a channel matrix.

FIG. 10A illustrates a relationship between desired waves and unnecessary waves at the two antennas 236_1 and 236_2 on the reception side from the two antennas 136_1 and 136_2 on the transmission side, and a solid line indicates a desired wave while a broken line indicates an unnecessary wave. FIG. 10B illustrates a situation of the real number term (cos term) of elements of a channel matrix H and an inverse matrix $H^{-1}$ to the channel matrix H in a relation to the phase. FIG. 10C illustrates a situation of the imaginary number term (sin term) of the elements of the channel matrix H and an inverse matrix $H^{-1}$ to the channel matrix H in a relation to the phase.

Two transmission signals are represented by S1(t)=A1·exp(jwt) and S2(t)=A2·exp(jwt). A distance attenuation factor of an unnecessary wave with respect to a desired wave is represented by α where 0≤α<1. The frequency of a carrier signal is represented by fo, and the wavelength of the carrier signal is represented by λc. The transmission and reception antenna distance d1 of a desired wave is represented by "d," and the transmission and reception spatial channel distance $d_2$ of an unnecessary wave is represented by "d+Δd." "Δd" is a range difference or path difference between the desired wave and the unnecessary wave, and this is converted into time and represented by Δt.

A reception signal R1(t) of the antenna 236_1 on the reception side is a combination of the desired wave from the opposing antenna 136_1 and the unnecessary wave from the antenna 136_2 which does not oppose to the antenna 236_1, and is represented by an expression (2-1) given below. A reception signal R2(t) of the antenna 236_2 is a combination of the desired wave from the opposing antenna 136_2 and the unnecessary wave from the antenna 136_1 which does not oppose to the antenna 236_2, and is represented by an expression (2-2) given below.

$$\left.\begin{aligned} R1(t) &= S1(t) + \alpha \cdot S2(t - \Delta t) \quad (2\text{-}1), \\ &= S1(t) + \alpha \cdot A2 e^{j\omega(t-\Delta t)} \\ &= S1(t) + \alpha \cdot S2(t) \cdot e^{j\omega\Delta t} \\ R2(t) &= \alpha \cdot S1(t - \Delta t) + S2(t) \quad (2\text{-}2) \\ &= \alpha \cdot A1 e^{j\omega(t-\Delta t)} + S2(t) \\ &= \alpha \cdot S1(t) + e^{-j\omega\Delta t} + S2(t) \end{aligned}\right\} \quad (2)$$

If e(–jωΔt) in the expressions (2-1) and (2-2) is replaced with "D" (=cos ωΔt–j sin ωΔt), then expressions (3-1) and (3-2) given below are obtained, respectively.

$$\left.\begin{aligned} R1 &= S1 + \alpha \cdot D \cdot S2 \\ R2 &= \alpha \cdot D \cdot S2 + S1 \end{aligned}\right\} (3\text{-}1) \\ \begin{pmatrix} R1 \\ R2 \end{pmatrix} = \begin{pmatrix} 1 & \alpha \cdot D \\ \alpha \cdot D & 1 \end{pmatrix} \cdot \begin{pmatrix} S1 \\ S2 \end{pmatrix} \right\} (3\text{-}2) \quad (3)$$

Then, from the expression (3-2), a channel matrix H represented by an expression (4-1) and an inverse matrix $H^{-1}$ represented by an expression (4-2) are obtained. In the expression (4-2), detH=1–(α·D)².

$$\left.\begin{aligned} H &= \begin{pmatrix} 1 & \alpha \cdot D \\ \alpha \cdot D & 1 \end{pmatrix} \quad (4\text{-}1) \\ H^{-1} &= \frac{1}{\det H}\begin{pmatrix} 1 & -\alpha \cdot D \\ -\alpha \cdot D & 1 \end{pmatrix} \quad (4\text{-}2) \\ \det H &= 1 - \alpha^2 \cdot D^2 \end{aligned}\right\} \quad (4)$$

In this instance, if a fixed condition is set for the path difference Δd, then each element of the channel matrix H includes only a real number term (cos term) or an imaginary number term (sin term). Further, due to the presence of the distance attenuation element α, the inverse matrix $H^{-1}$ to the channel matrix H is determined without fail, and also each element of the inverse matrix $H^{-1}$ includes only a real number term (cos term) or an imaginary number term (sin term).

For example, where a channel matrix H where two channels are used is normalized, an element of a desired wave (in the first row of the first column or the second row of the second column) is a real number term (=1) irrespective of the path difference Δd. In contrast, an element of an unnecessary wave (in the first row of the second column or the second row of the first column) is one of a real number term only, an imaginary number term only and a "real number term+imaginary number term" depending upon the path difference Δd.

For example, where "Δd=(n/2+¼)λc (n is 0 or a positive integer equal to or higher than 1)" is satisfied (hereinafter referred to as path condition 1), the path difference Δd has a relationship that it is equal to an odd-number of times of π/2 in phase, and since the real number term (cos term) becomes equal to zero, the path difference Δd has only the imaginary number term (sin term). If the path difference Δd is displaced from the relationship of the path condition 1, then the element comes to be represented by the "real number term and imaginary number term." However, if the path difference Δd is proximate to the relationship of the path condition 1, then the real number term component with respect to the imaginary number term component is much smaller and therefore may be treated substantially as including only the imaginary number term. In other words, although it is optimum to fully satisfy Δd=(n/2+¼)λc, there is no problem even if the path difference Δd is displaced a little from the relationship of the path condition 1. In the present specification, the term "only the imaginary number term" is intended to include such a case that the path difference Δd has some displacement from the relationship of the path condition 1.

Here, particularly where n is 0 or an even number, the imaginary number term becomes "+1," and therefore, an unnecessary wave rotates by π/2 in phase with respect to a desired wave because of a path difference. At this time, since "detH=1–(α·D)²=1–(α·–j)²>1," the inverse matrix $H^{-1}$ to the channel matrix H can exist. Since "–α·D=–j·α" in the MIMO process on the transmission side, an unnecessary component is made to have a phase of "–π/2" with respect to a desired component.

On the other hand, where n is an odd number, since the imaginary number term becomes "–1," an unnecessary wave rotates by –π/2 in phase with respect to a desired wave because of a path difference. At this time, since "detH=1α (α·D)²=1–(α·j)²>1," the inverse matrix $H^{-1}$ to the channel matrix H can exist. Since "–α·D=–j·α" in the MIMO process on the transmission side, an unnecessary component is made to have a phase of "π/2" with respect to a desired component.

On the other hand, where "Δd=(n/2)λC (n is a positive integer equal to or greater than 1)" is satisfied (hereinafter referred to as path condition 2), the path difference Δd has a phase equal to an integral number of times of π, and since the imaginary number term (sin term) becomes zero, only the real number term remains. If the path difference Δd is displaced from the relationship of the path condition 2, then the element comes to be represented by the "real number term and imaginary number term." However, if the path difference Δd is proximate to the relationship of the path condition 2, then the imaginary number term component with respect to the real number term component is much smaller and therefore may be treated substantially as including only the real number term. In other words, although it is optimum to fully satisfy Δd=(n/2)λc, there is no problem even if the path difference Δd is displaced a little from the relationship of the path condition 2. In the present specification, the term "only the real number term" is intended to include such a case that the path difference Δd has some displacement from the relationship of the path condition 2.

Here, particularly where n is an even number, the real number term becomes "+1," and therefore, an unnecessary wave rotates by 2π in phase with respect to a desired wave because of a path difference. At this time, since "detH=1–

"$(\alpha \cdot D)^2 = 1 - (\alpha \cdot 1)^2 > 1$," the inverse matrix $H^{-1}$ to the channel matrix H can exist. Since "$-\alpha \cdot D = -\alpha$" in the MIMO process on the transmission side, an unnecessary component is made have a phase of "$-\pi$" with respect to a desired component, that is, have a same phase of the opposite polarity.

On the other hand, where n is an odd number, since the real number term becomes "$-1$," an unnecessary wave rotates by n in phase with respect to a desired wave, that is, comes to have the same phase in the opposite polarity. At this time, since "$\det H = 1 - (\alpha \cdot D)^2 = 1 - (\alpha \cdot -1)^2 > 1$," the inverse matrix $H^{-1}$ to the channel matrix H can exist. Since "$-\alpha \cdot D = \alpha$" in the MIMO process on the transmission side, an unnecessary component is made to have a phase of "$2\pi$" with respect to a desired component, that is, comes to have the same phase in the same polarity.

In short, the difference between the inter-antenna distance d1 of a desired wave and the inter-antenna distance d2 of an unnecessary wave between the antenna 136 which is a transmission antenna and the antenna 236 which is a reception antenna should be set such that each of the elements of unnecessary waves of a channel matrix H which defines the transmission characteristic of the free space transmission path 9B (and also of an inverse matrix $H^{-1}$ to the channel matrix H) can be represented substantially only by a real number term or an imaginary number term.

Paying attention to such a characteristic based on the preset value of the path difference Δd as described above, the antenna arrangement is determined so as to satisfy the path condition 1 or the path condition 2. By the configuration, each of elements of unnecessary waves of a channel matrix can include only an imaginary number term or a real number term. As a result, an inverse matrix calculation process by the MIMO processor 604 can be simplified. Particularly in the present invention, if the antenna arrangement is determined so as to satisfy the path condition 2 where each element includes only a real number term, then the demodulation functional unit 8400 come to be configured without using a quadrature detection circuit.

[Path Condition 1]

FIGS. 11A to 11D illustrate a reference example of a constraint condition of the antenna arrangement where two channels or two antenna pairs are used. It is to be noted that the example is hereinafter referred to as antenna arrangement of the first example. The antenna arrangement of the first example is configured such that the path difference Δd satisfies the path condition 1 described hereinabove. In other words, the distance difference or path difference Δd between the inter-antenna distance d1 of a desired wave and the inter-antenna distance d2 of an unnecessary wave is set so as to approach the relationship of "$(n/2+\frac{1}{4})\lambda c$."

Where the path difference Δd satisfies the path condition 1, as described hereinabove with reference also to FIGS. 10A to 10C, the channel matrix H includes elements only of a real number term Re or an imaginary number term Im as seen in FIG. 11B, and also the inverse matrix $H^{-1}$ to the channel matrix H includes elements only of a real number term Re' or an imaginary number term Im'. In other words, elements of desired waves in the first row in the first column and in the second row in the second column include only a real number term, and elements of unnecessary waves in the first row in the second column and in the second row in the first column include only an imaginary number term. Therefore, the MIMO processing amount can be reduced.

It is to be noted that, since the imaginary number term Im' (quadrature component) exists, even if the modulation method where the present configurational example is not applied is modulation which originally involves no quadrature component like, for example, the ASK method or the BPSK method, a demodulation circuit for a quadrature component, that is, a quadrature detection circuit, is required as the demodulation functional unit 8400.

FIG. 11C illustrates a state of reception signals of individual channels where a MIMO process is carried out applying the path condition 1 where the modulation method is the BPSK method. As seen in FIG. 11C, components of the first channel ch1 are received as a composite signal of an I-axis component (Ch1_I) of an original desired value, that is, a desired wave for a desired signal, and a Q-axis component (Ch2_Q') of an unnecessary wave for an unnecessary signal originating from the second channel ch2 by the antenna 236_1. Components of the second channel ch2 are received as a composite signal of an I-axis component (Ch2_I) of an original desired wave for a desired signal and a Q-axis component (Ch1_Q') of an unnecessary wave for an unnecessary signal originating from the first channel ch1 by the antenna 236_2. As can be recognized from FIG. 11C, since the desired wave and the unnecessary wave are quadrature to each other, the demodulation functional unit 8400 requires a quadrature detection circuit. Since, in the MIMO process on the reception side, a component of an unnecessary wave which appears as a quadrature component to the desired signal is canceled, the demodulation functional unit 8400 requires a quadrature detection circuit.

FIG. 11D shows the MIMO processor 604A of the first example (reference example) corresponding to FIG. 11C and preceding stage circuits including the antenna 236, amplifier 8224 and demodulation functional unit 8400.

The demodulation functional unit 8400 includes a reception side local oscillator 8404 provided commonly to the channels for generating a carrier signal and a quadrature detection circuit 8460 provided for each of the channels. Each of the quadrature detection circuits 8460 includes a frequency mixer 8402_I for demodulating an I-axis component, a frequency mixer 8402_Q for demodulating a Q-axis component, and a phase shifter 8462 for shifting the phase of a recovered carrier signal by 90 degrees, that is, by π/2. A recovered carrier signal is supplied from the reception side local oscillator 8404 to the frequency mixer 8402_I. The recovered carrier signal from the reception side local oscillator 8404 is supplied to the frequency mixer 8402_Q after it is shifted by π/2 by the phase shifter 8462. The demodulation functional unit 8400 carries out quadrature detection on a reception signal or desired wave regarding a desired signal and a reception signal or unnecessary wave regarding an unnecessary signal for each transmission channel. Consequently, a desired signal and an unnecessary signal are demodulated individually for each channel.

The quadrature detection circuit 8460 for the first channel supplies a demodulation output of the frequency mixer 8402_I to a filter processor 8410_I and supplies a demodulation output of the frequency mixer 8402_Q to a filter processor 8410_Q. From the filter processor 8410_1, a demodulation signal CH1_I of the first channel ch1 which is a desired component is outputted, and from the filter processor 8410_Q, a demodulation signal CH2_Q' of the second channel ch2 which is an unnecessary component to the first channel is outputted.

Also the quadrature detection circuit 8460 for the second channel similarly supplies a demodulation output of the frequency mixer 8402_I to the filter processor 8410_I and supplies a demodulation output of the frequency mixer 8402_Q to the filter processor 8410. From the filter processor 84101, a demodulation signal CH2_I of the second channel ch2 which is a desired component is outputted, and from the filter processor 8410_Q, a demodulation signal CH1_Q' of the first channel ch1 which is an unnecessary component to the second channel is outputted.

A MIMO processor 604A carries out an inverse matrix calculation process by analog processing and includes four multipliers 612, 614, 616 and 618 and two adders 615 and 619. To the multiplier 612, the demodulation signal CH1_I outputted from the filter processor 8410_I of the first channel is inputted, and to the multiplier 614, the demodulation signal CH1_Q' outputted from the filter processor 8410_Q of the second channel is inputted. To the multiplier 616, the demodulation signal CH2_Q' outputted from the filter processor 8410_Q of the first channel is inputted, and to the multiplier 618, the demodulation signal CH2_I outputted from the filter processor 8410_I of the second channel is inputted.

The multiplier 612 multiplies or amplifies the demodulation signal CH1_I of the first channel ch1 of a desired signal by or with an element, which is the real number term Re', in the first row in the first column of the inverse matrix. The multiplier 614 multiplies or amplifies the demodulation signal CH1_Q' of the first channel ch1 of an unnecessary signal to the second channel ch2 by or with an element, which is the imaginary number term Im', in the first row in the second column of the inverse matrix. The multiplier 616 multiplies or amplifies the demodulation signal CH2_Q' of the second channel ch2 of an unnecessary signal to the first channel ch1 by or with an element, which is the imaginary number term Im', in the second row in the first column of the inverse matrix. The multiplier 618 multiplies or amplifies the demodulation signal CH2_I of the second channel ch2 of a desired signal by or with an element, which is the real number term Re', in the second row in the second column of the inverse matrix. It is to be noted that, if an element of the matrix is in the negative, then it is inverted and then amplified.

Each of the adders 615 and 619 adds a signal of a self channel, that is, a channel for the adder itself, received and demodulated as a desired wave in the self channel and a signal of the self channel received and demodulated as an unnecessary wave in the other channel. By such addition, a demodulation component of a desired wave of a self channel and another demodulation component treated as an unnecessary component based on an unnecessary wave in the other channel is acquired.

In particular, the adder 615 adds a signal CH1_Re' of the first channel received as a desired wave and demodulated by signal processing for the self channel and a signal CH1_Im' of the first channel received as an unnecessary wave and demodulated by signal processing for the second channel. By the addition, the demodulation component Ch1_Re' of the desired wave of the self channel and the demodulation component CH1_Im' treated as an unnecessary signal based on an unnecessary wave in the other channel are combined to acquire a transmission-subject signal of the first channel.

Similarly, the adder 619 adds a signal Ch2_Re' of the second channel received as a desired wave and modulated by signal processing for the self channel and a signal Ch2_Im' of the second channel received as an unnecessary wave and demodulated by signal processing for the first channel. By the addition, the demodulation component Ch2_Re' of the desired wave of the self channel and the demodulation component CH2_Im' treated as an unnecessary signal based on an unnecessary wave in the other channel are combined to acquire a transmission-subject signal of the second channel.

In this manner, where the modulation method in the case wherein the present configuration is not applied is the PBSK method and the number of antennas is two, by carrying out the MIMO process on the reception side applying the path condition 1, the number of times by which real number calculation must be carried out in inverse matrix calculation by the MIMO processor 604A is four, and the number of adders is 2. Thus, the number of times of real number multiplication can be reduced to ¼ and the number of adders can be reduced from those in the case wherein the path condition 1 of the present configuration is not applied.

[Path Condition 2]

FIGS. 12A to 12D illustrate the constraint condition to the antenna arrangement of the present embodiment where two channels or two antenna pairs are used. It is to be noted that the example is hereinafter referred to as antenna arrangement of the second example. The antenna arrangement of the second example is configured so as to make the path difference Δd to satisfy the path condition 2 described hereinabove. In particular, the antenna arrangement of the second example is configured so that the distance difference or path difference Δd between the inter-antenna distance d1 of a desired wave and the inter-antenna distance d2 of an unnecessary wave may approach the relationship of "(n/2)λc."

Where the path difference Δd satisfies the path condition 2, as described hereinabove with reference also to FIGS. 10A to 10C, the channel matrix H includes elements only of a real number term Re or Re" as seen in FIG. 12B. Also the inverse matrix $H^{-1}$ to the channel matrix H includes elements only of a real number term Re' or Re'". In other words, elements of desired waves in the first row in the first column and in the second row in the second column include only a real number term, and also elements of unnecessary waves in the first row in the second column and in the second row in the first column include only a real number term. Therefore, the MIMO processing amount can be reduced.

In this instance, since no imaginary number term, that is, no quadrature component, exists, if the modulation method where the present configurational example is not applied is modulation which originally involves no quadrature component like, for example the ASK method, a demodulation circuit for a quadrature component, that is, a quadrature detection circuit, is not required in the demodulation functional unit 8400.

FIG. 12C illustrates a state of transmission signals of individual channels where a MIMO process is carried out applying the path condition 2 where the modulation method where the present configurational example is not applied is the ASK method. As seen in FIG. 12C, components of the first channel ch1 are received as a composite signal of an I-axis component (Ch1_I) of an original desired value, that is, a desired wave for a desired signal, and an I-axis component (Ch2_I') of an unnecessary wave for an unnecessary signal originating from the second channel ch2 by the antenna 236_1. Components of the second channel ch2 are received as a composite signal of an I-axis component (Ch2_I) of an original desired wave for a desired signal and an I-axis component (Ch1_I') of an unnecessary wave for an unnecessary signal originating from the first channel ch1 by the antenna 236_2. As can be recognized from FIG. 12C, in the MIMO process on the reception side, only it is necessary to cancel a component of an unnecessary component which appears as an in-phase component with respect to the desired wave, and the demodulation functional unit 8400 does not require a quadrature detection circuit.

FIG. 12D shows a MIMO processor 604B of the second example corresponding to FIG. 12C and preceding stage circuits including the antenna 236, amplifier 8224 and demodulation functional unit 8400.

The demodulation functional unit 8400 includes an amplitude detection circuit 8403 for each channel. As described hereinabove, amplitude detection circuit 8403 in the present embodiment uses not synchronous detection but envelope detection or square-law detection to demodulate a signal regarding a desired wave and a signal regarding an unnecessary wave.

The amplitude detection circuit 8403 for the first channel supplies demodulation outputs of the first channel ch1 of a desired signal and the second channel ch2 of an unnecessary signal to the filter processor 8410. From the filter processor 8410, a composite component of a demodulation signal CH1_I of the first channel ch1 of a desired signal and a component CH2_I' of the second channel ch2 of an unnecessary signal is outputted.

Also the amplitude detection circuit 8403 for the second channel similarly supplies demodulation outputs of the second channel ch2 of a desired signal and the first channel ch1 of an unnecessary signal to the filter processor 8410. From the filter processor 8410, a composite component of a component CH2_I of the second channel ch2 of a desired signal and a component CH1_I' of the first channel ch1 of an unnecessary signal is outputted.

The MIMO processor 604B carries out an inverse matrix calculation process by analog processing and includes four multipliers 622, 624, 626 and 628 and two adders 625 and 629. To the multipliers 622 and 626, the demodulation signal CH1_I+CH2_I' outputted from the filter processor 8410 of the first channel is inputted, and to the multipliers 624 and 628, the modulation signal CH2_I+CH1_I' outputted from the filter processor 8410 of the second channel is inputted.

The multiplier 622 multiplies or amplifies the modulation signal CH1_I+CH2_I' by or with an element, which is a real number term Re', in the first row in the first column of the inverse matrix. The multiplier 624 multiplies or amplifies the modulation signal CH2_I+CH1_I' by or with an element, which is a real number term Re''', in the first row in the second column of the inverse matrix. The multiplier 626 multiplies or amplifies the modulation signal CH1_I+CH2_I' by or with an element, which is the real number term Re''', in the second row in the first column of the inverse matrix. The multiplier 628 multiplies or amplifies the modulation signal CH2_I+CH1_I' by or with an element, which is the real number term Re', in the second row in the second column of the inverse matrix. It is to be noted that, if an element of the matrix is in the negative, then it is inverted and then amplified.

Each of the adders 625 and 629 adds a gain R' correction amount for a composite component of a demodulation signal of the self channel received as a desired wave and demodulated in the self channel and a demodulation signal for the other channel received as an unnecessary wave and demodulated in the self channel and a gain R''' correction amount for a composite component for a demodulation signal of the other channel received as a desired wave and demodulated in the other channel and a demodulation signal of the self channel received as an unnecessary wave and demodulated in the other channel. By such addition, a demodulation component of the other channel demodulated by the demodulation process in the self channel is cancelled to obtain a transmission-subject channel for the self channel.

In particular, the adder 625 adds a signal CH1_Re'+Ch2_Re' outputted from the multiplier 622 and a signal Ch2_Re'''+Ch1_Re''' outputted from the multiplier 624. By the addition, an interference component based on the unnecessary wave from the second channel is canceled and a transmission-subject signal of the first channel is acquired.

Similarly, the adder 629 adds a signal Ch2_Re'+Ch1_Re' outputted from the multiplier 628 and a signal Ch1_Re'''+Ch2_Re''' outputted from the multiplier 626. By the addition, an interference component based on the unnecessary wave from the first channel is canceled and a transmission-subject signal of the second channel is acquired.

In this manner, where the modulation method in the case wherein the present configurational example is not applied is the ASK method and the number of antennas is two, by carrying out the MIMO process on the reception side applying the path condition 2, the number of times by which real number calculation must be carried out in inverse matrix calculation by the MIMO processor 604B is four, and the number of adders is two. Thus, the number of times of real number multiplication can be reduced to ¼ and the number of adders can be reduced from those in the case wherein the path condition 2 of the present embodiment is not applied. The demodulation functional unit 8400 does not require a demodulation circuit for a quadrature component, that is, a quadrature detection circuit, and the amplitude detection circuit 8403 adopted square-law detection or envelop detection can be used. Thus, the circuit configuration on the reception side is simplified in comparison with that where the path condition 1 shown in FIGS. 11A to 11D is applied.

[Phase Characteristic which Depends Upon Directivity]

FIG. 13 illustrates a countermeasure method where an antenna has a phase characteristic which relies upon directivity. In FIGS. 9A to 12D, the antenna pairs are arranged in a "facing" relationship to each other such that the antennas may not have a phase characteristic which relies upon the directivity. In contrast, where the antenna pairs have a phase characteristic $\phi a$ which relies upon the directivity, it is necessary to take an influence not only of the path difference $\Delta d$ but also of the phase characteristic $\phi a$ into consideration. Basically, the influence of the phase characteristic $\phi a$ should be eliminated in the following manner.

In FIG. 13, reference character $\theta 1$ denotes an incidence angle of a desired wave of the first channel to the antenna 236_1 which corresponds to a radiation angle of the desired wave from the antenna 136_1 which thus cooperates with the antenna 236_1 to form the first antenna pair. The angle $\theta 1$ also is an incidence angle of a desired wave of the second channel to the antenna 236_2 which corresponds to a radiation angle of the desired wave from the antenna 136_2 which thus cooperates with the antenna 236_2 to form the second antenna pair. Here, the angle $\theta 1$ has a value close to zero. Meanwhile, reference character $\theta 2$ denotes an incidence angle of an unnecessary wave of the first channel to the antenna 236_1 which corresponds to a radiation angle of the unnecessary wave from the antenna 136_2. Further, since the angle $\theta 1$ is close to zero, the angle $\theta 2$ is also an incidence angle of an unnecessary wave of the second channel to the antenna 236_2 which correspond to the radiation angle of the unnecessary wave from the antenna 136_1.

Although detailed description of a derivation process of expressions is omitted, if an influence amount of the phase characteristic $\phi a$ is converted into and represented by a distance, then it is given by an expression (5-1). Further, if the path condition 1 is re-calculated with the influence amount taken into consideration, then it is represented by an expression (5-2) given below. If the path condition 2 is re-calculated with the influence amount taken into consideration, then it is represented by an expression (5-3) given below. In all cases, the influence amount of the phase characteristic φa is corrected.

Conversion of influence amount of phase difference into distance $$\left. \begin{array}{l} \lambda c\left\{ \dfrac{\phi_a(\theta_2) - \phi_a(\theta_1)}{\pi} \right\} \quad (5\text{-}1) \\ \Delta d = d2 - d1 = \lambda c\left\{ \dfrac{n}{2} + \dfrac{1}{4} - \dfrac{\phi_a(\theta_2) - \phi_a(\theta_1)}{\pi} \right\} \quad (5\text{-}2) \\ \Delta d = d2 - d1 = \lambda c\left\{ \dfrac{n}{2} - \dfrac{\phi_a(\theta_2) - \phi_a(\theta_1)}{\pi} \right\} \quad (5\text{-}3) \end{array} \right\} \quad (5)$$

[Application to Three or More Channels]

FIGS. 14 and 15 illustrate a countermeasure method where three or more antenna pairs are involved. Also where the number of antenna pairs increases to three or more, if the path difference Δd is set so as to satisfy the path condition 1, then a channel matrix and an inverse matrix to the channel matrix include only elements of a real number term or an imaginary number term similarly as in the case wherein two antenna pairs are involved. In particular, an element of a desired wave where i=j includes only a real number term Re, but an element of an unnecessary wave where i≠j includes only an imaginary number term Im.

Further, as seen in FIG. 15, even where three or more antenna pairs are involved, if the path difference Δd is set so as to satisfy the path condition 2, then a channel matrix and an inverse matrix to the channel matrix come to include elements only of a real number term similarly as in the case wherein two antenna pairs are involved. In particular, an element of a desired wave where i=j includes only a real number term Re, and also an element of an unnecessary wave where i≠j includes only a real number term Re. A combination denoted by an ellipsis in FIG. 15 represents a subject of consideration of a constraint condition.

Generally where the number of channels is M, as can be presupposed from a channel matrix, in regard to both of the path conditions 1 and 2, it is necessary for real number multiplication to be carried out, in such biaxial modulation as the QPSK, by $2 \cdot M^2$ times, and in such uniaxial modulation as the ASK method or the BPSK method, by $M^2$ times. This signifies that, where the number of antenna pairs is three or more, if an approach similar to that where the number of antenna pairs is two is applied simply as it is, then the calculation amount in the real number calculation increases in proportion to the square of the antenna pair number.

Therefore, in the present embodiment, where the number of antenna pairs is three or more, a countermeasure is taken based on the characteristic of the antenna arrangement described above such that the number of times of real number calculation may not increase in proportion to the square of the channel number, that is, increase of the number of times of real number calculation may be suppressed. In particular, attention is paid to the fact that the influence of an interference wave from an adjacent antenna is highest and that the influence of an interference wave from the other antennas is comparatively lower. By this, an antenna distance is determined taking an unnecessary wave or interference wave from an adjacent antenna into consideration and is applied also to the other antennas.

By the countermeasure, for example, where the path condition 1 is applied, with regard to the inner side channels except the opposite end channels, it becomes necessary to take only the real number term of an antenna 136 of a desired wave and the imaginary number term regarding those antennas 136 of an unnecessary wave positioned on the opposite sides of the antenna 136 into consideration. In particular, when attention is paid to the ith channel, only a desired wave from the ith antenna 136_i to the antenna 236_i and an unnecessary wave from the i−1th antenna 136_i to the antenna 236_i as well as an unnecessary wave from the i+1th antenna 136_i+1 to the antenna 236_i should be taken into consideration. Therefore, in the ith row of a channel matrix and an inverse matrix to the channel matrix, the element of a desired wave in the ith column becomes a real number term and the elements of an unnecessary wave in the i−1th column and the i+1th column become an imaginary number term while the other elements of an unnecessary wave become zero.

Where the path condition 2 is applied, on the inner side channels except the opposite end channels, it is necessary to take only the real number term regarding an antenna 136 of a desired wave and the real number term regarding those antennas 136 of an unnecessary wave positioned on the opposite sides of the antenna 136 into consideration. In particular, when attention is paid to the ith channel, only it is necessary to take a desired wave from the ith antenna 136_i to the antenna 236_i and an unnecessary wave from the i−1th antenna 136_i−1 to the antenna 236_i as well as an unnecessary wave from the i+1th antenna 136_i+1 to the antenna 236_i into consideration. Therefore, in the ith row of a channel matrix and an inverse matrix to the channel matrix, the element of a desired wave in the ith column becomes a real number term and also the elements of an unnecessary wave in the i−1th column and the i+1th column become a real number term while the other elements of an unnecessary wave become zero.

In regard to both of the path conditions 1 and 2, the number of times of real number multiplication for the opposite end channels is two, and the number of times of real number multiplication for the inner side channels except the opposite end channels is three. Thus, the MIMO processing amount can be reduced from that where the present technique is not applied.

In particular, where the number of channels is M which is an integer equal to or greater than 3, in the case of both of the path conditions 1 and 2, the number of times of real number calculation is in the case of biaxial modulation such as the QPSK, $2 \cdot \{2 \cdot 2 + (M-2) \cdot 3\}$, but in the case of uniaxial modulation such as the ASK method or the BPSK method, $\{2 \cdot 2 + (M-2) \cdot 3\}$. This signifies that, where the number of antenna pairs is three or more, the calculation amount of real number calculation can be reduced from that where an approach similar to that where the number of antenna pairs is two is applied simply as it is.

[Application to Three-Dimensional Arrangement]

FIGS. 16A and 16B illustrate an application technique of a MIMO process, which is applied to the reception side described hereinabove with reference to FIGS. 7A to 15, to a case wherein transmission and reception antennas are arranged three-dimensionally.

The matter described hereinabove with reference to FIGS. 7A to 15 is application examples to a case wherein antennas 136 on the transmission side and antennas 236 on the reception side are arranged two-dimensionally.

However, the mechanism for reducing the MIMO processing amount on the reception side in the present embodiment can be applied not only to a case wherein transmission and reception antennas are arranged two-dimensionally but also to another case wherein transmission and reception antennas are arranged three-dimensionally as seen in FIG. 16B.

For example, in FIG. 16B, seven antennas 136_1 to 136_7 are arranged in a spaced relationship by a distance G from each other on a semiconductor chip 103 on the transmission side, and antennas 236_@ are provided on a semiconductor chip 203_@ in a facing relationship with the antennas 136_@. Also the antennas 236_@ are provided in a spaced relationship by the distance G from each other.

While, in FIG. 16B, only a desired wave from the semiconductor chip 103 on the transmission side to the semiconductor chip 203 on the reception side is illustrated, as regards unnecessary waves between those antennas which are not disposed in a facing relationship with each other, a similar approach to that in the case of the two-dimensional arrangement described hereinabove may be applied. Also in the three-dimensional arrangement, similar operation and effects to those described hereinabove can be achieved by setting the path difference Δd of desired waves and unnecessary waves so as to satisfy the path condition 2 described hereinabove.

Incidentally, the places at which the antennas 236 of the semiconductor chip 203 are arranged with respect to the antennas 136 of the semiconductor chip 103 are positioned basically on a plane parallel to the plane of the semiconductor chip 103, that is, of the antennas 136. A minimum cell formed from the antennas 136 or the antennas 236 is a regular triangle.

Where unnecessary waves or interference waves from the antennas on the opposite sides adjacent a desired wave are considered, a channel matrix to be applied to the three dimensions may be studied paying attention to a state of a regular hexagon as seen in FIG. 16B. For example, it is assumed that a channel of a desired wave is provided by the antennas 136_1 and 236_1 at the center of a regular hexagon. In other words, a desired wave is transmitted from the antenna 136_1 at the center of the regular triangle on the transmission side to the antenna 236_1 at the center of the regular hexagon on the reception side. At this time, the adjacent antennas which make a subject of analysis of unnecessary waves to the antenna 236_1 are the antennas 136_2 to 136_7 arranged at the vertices of the regular polygon.

[Digital MIMO Process]

FIGS. 17A and 17B illustrate a basic technique where the MIMO process on the reception side is carried out by digital processing. In the configuration shown in FIG. 11D as the reference example where the antenna arrangement is set so as to satisfy the path condition 1 and the configuration shown in FIG. 12D where the antenna arrangement is set so as to satisfy the path condition 2, the MIMO processor 604 (604A and 604B) is ready for analog processing.

However, the inverse matrix calculation by the MIMO processor 604 is not necessarily carried out by an analog circuit but may be carried out digital signal processing if there is no problem in the processing speed. In this instance, an analog signal after a demodulation process outputted from the demodulation functional unit 8400 or after a LPF process outputted from the filter processor 8410 should be supplied to the MIMO processor 604 after it is converted into a digital signal.

However, FIG. 17A illustrates an example of a countermeasure for the configuration of FIG. 11D ready for the path condition 1 as the reference example, and FIG. 17B illustrates an example of a countermeasure for the configuration of FIG. 12D ready for the path condition 2 which is adopted in the present embodiment. In both examples, an AD converter 632 (ADC) is interposed between the filter processor 8410 and the MIMO processor 604. No alternation is applied to the other part. Though not shown, if also the LPF process is to be carried out digitally, the AD converter 632 should be interposed between the demodulation functional unit 8400 and the filter processor 8410.

<Reception MIMO System>

Figure 18:
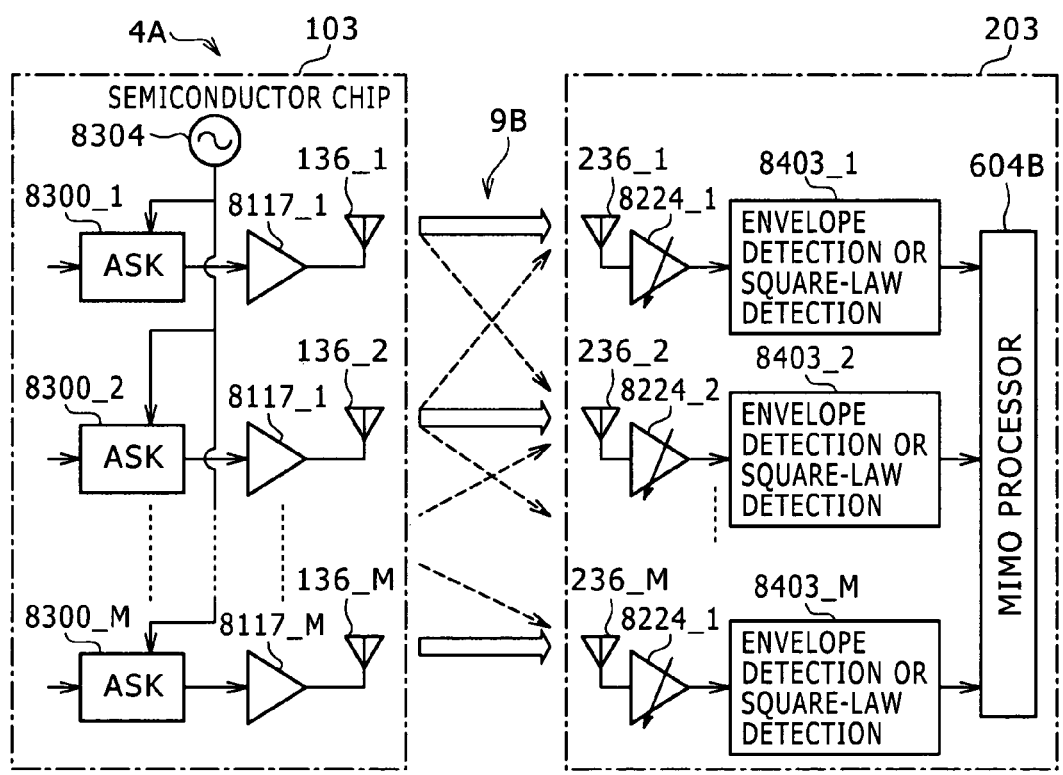
FIG. 18 is a diagrammatic view showing a reception MIMO system of a first embodiment.
Figure 19:
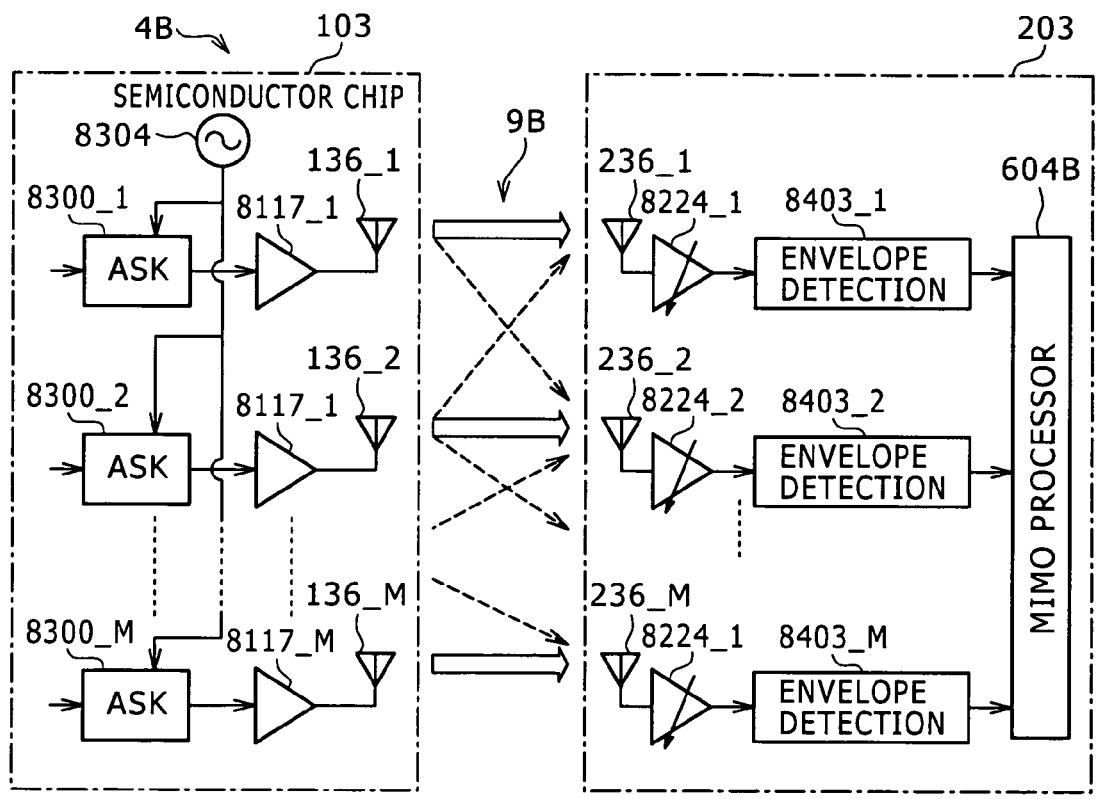
FIG. 19 is a diagrammatic view illustrating a reception MIMO system of a second embodiment.
Figure 20A:
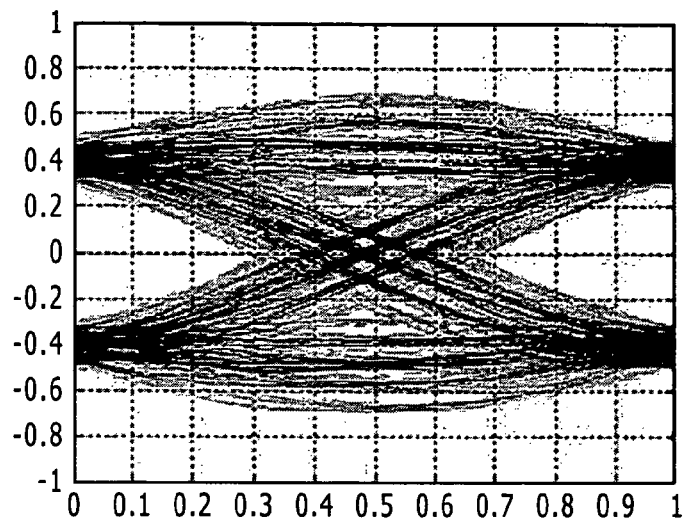
FIGS. 20A to 20C are graphical views illustrating a situation of a composite signal of a desired wave and an unnecessary wave received by an antenna on the reception side.
Figure 20B:
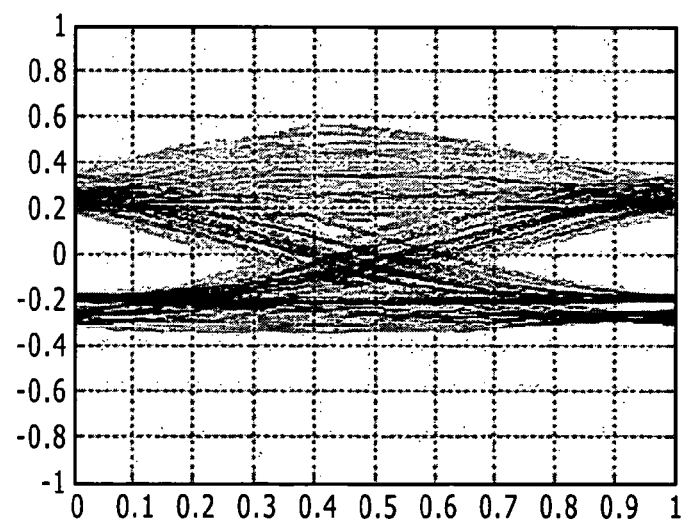
Figure 20C:
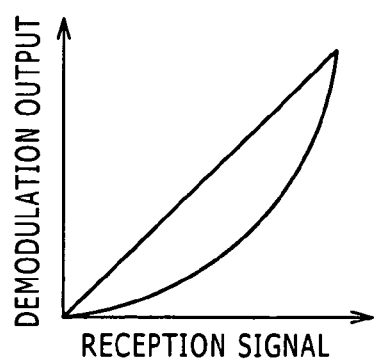

FIGS. 18 to 21D show particular applications (hereinafter referred to as reception MIMO systems) of the MIMO process applied to the reception side described hereinabove with reference to FIGS. 7A to 17B. The reception MIMO system 4A of the first embodiment shown in FIG. 18 has a configuration ready for a case wherein "n" which prescribes the path condition is an even number (n=2m:m is a positive integer). The reception MIMO system 4B of the second embodiment shown in FIG. 19 has a configuration ready for a case wherein "n" which prescribes the path condition is an odd number (n=2m−1:m is a positive integer). In FIGS. 18 and 19, a 1:1 configuration is shown wherein, while M channels are involved, the transmission side has a one-chip configuration and also the reception side has a one-chip configuration. However, a 1:N configuration may otherwise be used wherein a semiconductor chip 203 is used for each channel on the reception side. FIGS. 20A to 20C illustrate a situation of a composite signal of a desired wave and an unnecessary wave received by an antenna 236. FIGS. 21A to 21D illustrate difference between envelop detection and square-law detection.

In the reception MIMO system 4A of the present embodiment, the amplitude detection circuit 8403 of the demodulation functional unit 8400 on the reception side does not apply quadrature detection or synchronous detection but applies envelope detection or square-low detection. Further, taking a combination with the envelope detection or the square-law detection into consideration, all of the M channels adopt a method which modulates only the amplitude, here, the ASK method.

The antenna arrangement is set such that the path difference Δd satisfies the path condition 2. In particular, the antennas 136 and 236 are arranged so that the relationship of the path difference Δd=(n/2+¼)λc may be approached. Since the path condition 2 is applied, the MIMO processor 601B of the second example described hereinabove with reference to FIG. 12D is used as the MIMO processor 604.

More preferably, the antenna arrangement is set such that particularly n in the path condition 2 may be an even number, that is, Δd=mλc may be satisfied, as in the first embodiment shown in FIG. 18. Naturally, it is not excluded that the antenna arrangement is set such that n in the path condition 2 is an odd number, that is, Δd=(m−½)λc is satisfied, as in the second embodiment shown in FIG. 19.

Figure 21A:
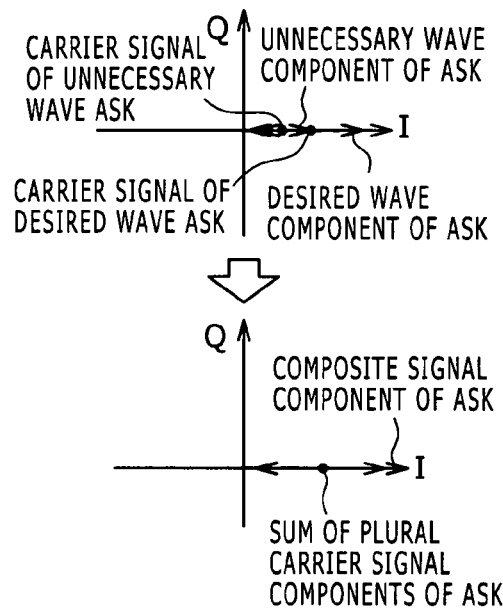
FIGS. 21A to 21D are diagrammatic views illustrating difference between envelop detection and square-law detection.
Figure 21B:
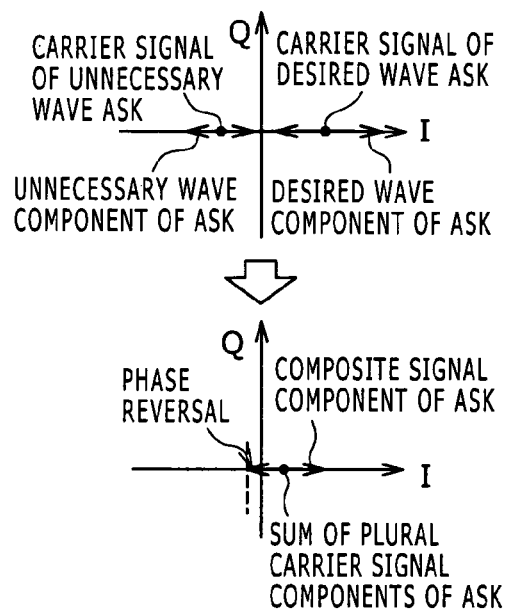
Figure 21C:
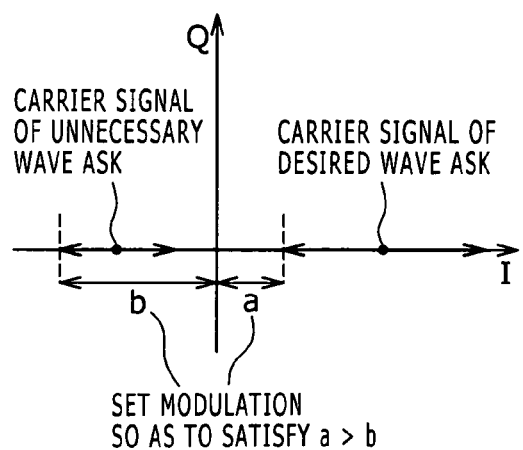
Figure 21D:
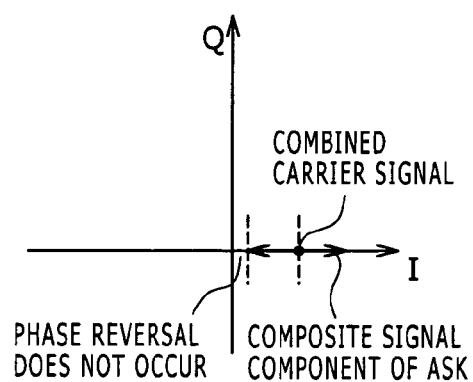

While, according to the envelope detection, an envelope of an input signal is outputted as it is as seen from FIG. 21A, according to the square-law detection, a result of squaring an envelope of an input signal is outputted as seen from FIG. 21B. Therefore, although an envelope detection output exhibits a linear variation with respect to the input signal as seen in FIGS. 21C and 21D, according to the square-law detection, the degree of the influence of squaring varies depending upon the level of the input signal and the square-law detection output exhibits a nonlinear variation. Therefore, the square-law detection has a difficult point that a result of an ordinary MIMO process which carries out linear processing becomes rather inaccurate. Further, as can be recognized from FIGS. 21C and 21D, when the reception signal level is low, the demodulation output as a result of the square-law detection becomes prominently low. Therefore, the square-law detection cannot be adopted willingly where the composite signal level of a desired wave and an unnecessary wave is low.

Therefore, where inaccuracy or nonlinearity cannot be accepted, a MIMO process should be used in combination with an envelope detection output. However, where inaccuracy can be accepted, it is possible to use a MIMO process in combination with the square-law detection and the configuration of the first embodiment shown in FIG. 14 will be adopted.

On the other hand, where "n" is an odd number, since the average value of the composite signal is low, a MIMO process is preferably combined with the envelope detection, and since it is actually difficult to adopt a combination of a MIMO process with the square-low detection, the configuration of the second embodiment shown in FIG. 19 will be adopted.

Here, as can be supposed from FIGS. 10A to 10O, the magnitude of the average level of the received composite signal is influenced by whether n is an even number or an odd number. Specifically, where n is an even number as seen in FIG. 21A, since the real number term or cos term is in the positive as seen in FIG. 10B, that is, there is no phase delay and the phase is same, a desired phase and an unnecessary wave appear in the same phase. Therefore, the effective carrier signal component of the ASK increases. In other words, the average value of the composite signal received by the antenna 236 on the reception side increases certainly, and The phase of the composite signal cannot be reversed.

For example, the OOK is assumed as an example of the ASK in order to facilitate understandings. Where the desired wave is "1," the unnecessary wave level is lower than the desired wave level, and therefore, even if the unnecessary wave is "1," the phase of the reception signal is not reversed. Therefore, even if the demodulation functional unit 8400 carries out the envelope detection or the square-law detection, demodulation of a composite signal of a desired wave and an unnecessary wave can be carried out appropriately. Since the phase of the reception signal is not reversed irrespective of the modulation degree, that is, even by application of the OOK, the amplitude information is maintained by both of the envelope detection and the square-law detection and the individual signals can be received.

Where "n" is an even number in application of the path condition 2, the average value of a desired wave and an unnecessary wave is high. Therefore, the combination of a MIMO process with the envelope detection can naturally be adopted as in the case of the first embodiment shown in FIG. 18. Further, where inaccuracy can be accepted, also the combination with the square-law detection can be adopted.

On the other hand, where n is an odd number as seen in FIG. 21B, since the real number term or cos term is in the negative as seen in FIG. 10B because there is a phase delay of $\pi$ or the phase is reversed, an unnecessary wave appears in the opposite phase to that of a desired wave. Therefore, an effective carrier signal component of the ASK drops in level. In other words, the average value of the composite signal received by the antenna 236 on the reception side decreases.

Thus, where "n" is an odd number, since the desired wave and the unnecessary wave at the antenna 236 on the reception side have an opposite phase relationship to each other and the phase of the composite signal of them may possibly be reversed, the reception signal or the composite signal may possibly become like that of the BPSK.

For example, the OOK is assumed as an example of the ASK in order to facilitate understandings. In case of OOK, when the desired wave is "0," if the unnecessary wave is "1," then the phase of the composite signal is reversed. Accordingly, if the demodulation functional unit 8400 carries out the envelope detection or the square-law detection directly, then modulation of the composite signal of the desired wave and the unnecessary wave cannot be carried out appropriately.

If this is taken into consideration, then where the path condition 2 is applied, when the demodulation functional unit 8400 carries out the envelope detection or the square-law detection, it is preferable to set "n" to an even number (n=2m) and arrange the antennas so that the path difference $\Delta d$ may approach the relationship of $m\lambda c$ thereby to adopt the configuration of the first embodiment shown in FIG. 18. By this, the phases of a desired wave and an unnecessary wave can be adjusted to each other, and amplitude information of the desired wave and the unnecessary wave is maintained even if the envelope detection or the square-law detection is applied. Also this is an application of the path condition 2, and the channel matrix H or the inverse matrix $H^{-1}$ of the same includes elements only of real numbers. Consequently, the MIMO processing amount can be reduced.

On the other hand, where the path condition 2 is applied, if "n" is set to an odd number (n=2m−1) and the antennas are arranged so that the path difference $\Delta d$ may approach (m−½) $\lambda c$, then level drop or phase reversal of the reception signal can possibly occur. Therefore, also it is difficult to directly adopt the configuration of the second embodiment shown in FIG. 19.

However, even where the path difference $\Delta d$ satisfies the path condition 2 and "n" is set to an odd number (n=2m−1), the difficulty described above can be coped with by lowering the modulation degree on the transmission side in advance so that phase reversal of a composite signal of a desired wave and an unnecessary wave may not occur as seen in FIGS. 21C and 21D. In particular, where a minimum signal level of a desired wave received by the antenna 236 is represented by a and a maximum signal amplitude level of an unnecessary wave received by the antenna 236 is represented by b as seen in FIG. 21C, the modulation degree should be set so as to satisfy a>b.

Where the modulation degree is lowered by an amount corresponding to the reception amplitude of a signal component of the unnecessary wave on the transmission side, even where "n" is set to an odd number in application of the path condition 2, phase reversal of the composite signal of the desired wave and the unnecessary wave can be prevented as seen in FIG. 21D. Thus, demodulation of the composite signal can be assured.

Since the demodulation degree is lowered, it is actually difficult to apply the OOK. However, by setting the modulation degree appropriately so that the phase of the reception signal may not be reversed, amplitude information is maintained in both of the envelope detection and the square-law detection, and individual signals can be received. It is to be noted that, since the level of the composite signal of the desired wave and the unnecessary wave is low, only it is actually possible to apply the envelope detection while application of the square-law detection is very difficult as in the case of the configuration of the second embodiment shown in FIG. 14A.

The present application contains subject matter related to that disclosed in Japanese Priority Patent Application JP 2009-223683 filed in the Japan Patent Office on Sep. 29, 2009, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A wireless communication system, comprising:
antenna pairs, a radio signal radiated from a transmission antenna of a first one of the antenna pairs arriving as a desired signal at a reception antenna of the first one of the antenna pairs while a radio signal radiated from a transmission antenna of a second one of the antenna pairs different from the first one of the antenna pairs arriving as an unnecessary signal at the reception antenna of the first one of the antenna pairs;
a modulation functional unit associated with each of the antenna pairs, the modulation functional unit being configured to generate a modulated carrier signal by modulating a carrier signal with a desired transmission subject signal, the modulation functional unit being configured to transmit the modulated carrier signal from a transmission antenna of a corresponding one of the antenna pairs, the modulation functional unit adopting amplitude modulation;
a demodulation functional unit configured to use envelope detection or square-law detection to detect modulation signals received with regard to all channels of transmission subject signals; and
a transmission characteristic correction unit configured to carry out correction calculation based on a transmission characteristic of a transmission space between a transmission antenna from a particular one of the antenna pairs and a reception antenna from any of the antenna pairs based on a demodulation signal demodulated by said demodulation functional unit, the demodulation signal corresponding to the reception antenna from any of the antenna pairs to acquire an output signal corresponding to one of the transmission subject signals,
wherein, where a wavelength of a demodulation carrier signal used in said demodulation functional unit is represented by $\lambda c$ and a phase characteristic which relies upon directivity of the antenna pairs is represented by zero, a path difference which is a difference between an inter-antenna distance of the desired signal and an inter-antenna distance of the unnecessary signal is set to $(n/2)\lambda c$, n being a positive integer equal to or higher than 1.

2. The wireless communication system according to claim 1, wherein said transmission characteristic correction unit carries out the correction calculation regarding a real number term corresponding to the desired signal and the correction calculation regarding a different real number term corresponding to the unnecessary signal for demodulation components demodulated by said demodulation functional unit, said transmission characteristic correction unit adding a corrected signal regarding the real number term and a corrected signal regarding the different real number term regarding one of the channels between the transmission antenna from the particular one of the antenna pairs and the reception antenna from any of the antenna pairs to acquire an output signal corresponding to the desired transmission subject signal.

3. The wireless communication system according to claim 1, wherein path differences each of which is a difference between an inter-antenna distance of the desired signal and an inter-antenna distance of the unnecessary signal is set such that each of elements of the desired signal of a matrix which defines the transmission characteristic can be represented only by a real number term corresponding to the desired signal while each of elements of the unnecessary signal of the matrix which defines the transmission characteristic can be represented only by a different real number term corresponding to the unnecessary signal.

4. The wireless communication system according to claim 1, wherein n is an even number and the path difference is set to $m\lambda c$ where m is a positive integer equal to or greater than 1.

5. The wireless communication system according to claim 1, wherein n is an odd number and the path difference is set to $(m-\frac{1}{2})\lambda c$ where m is a positive integer equal to or greater than 1.

6. The wireless communication system according to claim 1, wherein, where a radiation angle of the desired signal from the transmission antenna of the first one of the antenna pairs and an incidence angle of the desired signal to the reception antenna of the first one of the antenna pairs are represented by $\theta 1$;
a radiation angle of the unnecessary signal from the transmission antenna of the second one of the antenna pairs and an incidence angle of the unnecessary signal to the reception antenna of the first one of the antenna pairs are represented by $\theta 2$; and
phase characteristics which rely upon a directivity of the transmission antenna of the first one of the antenna pairs and the reception antenna of the first one of the antenna pairs are represented by $\phi a(\theta 1)$ and $\phi a(\theta 2)$, respectively, the path difference is corrected by $-(\phi a(\theta 2) - \phi a(\theta 1))/\Pi)\lambda c$.

7. The wireless communication system according to claim 1, wherein carrier signals used by the modulation functional unit and carrier signals used by the demodulation functional unit have a common frequency to all of the channels.

8. A wireless communication system which includes antenna pairs, a radio signal radiated from a transmission antenna of a first one of the antenna pairs arriving as a desired signal at a reception antenna of the first one of the antenna pairs while a radio signal radiated from a transmission antenna of a second one of the antenna pairs different from the first one of the antenna pairs arriving as an unnecessary signal at the reception antenna of the first one of the antenna pairs, said wireless communication system comprising:
a demodulation functional unit corresponding to the reception antenna of the first one of the antenna pairs, the demodulation functional unit being configured to use envelope detection or square-law detection to detect a received modulation signal wherein only an amplitude of a carrier signal is modulated for all channels of transmission subject signals; and
a transmission characteristic correction unit configured to carry out correction calculation based on a transmission characteristic of a transmission space between a transmission antenna from a particular one of the antenna pairs and a reception antenna from any of the antenna pairs based on a demodulation signal demodulated by said demodulation functional unit, said demodulation functional unit corresponding to the reception antenna from any of the antenna pairs to acquire an output signal corresponding to a transmission subject signal,
wherein a path difference is a difference between an inter-antenna distance of the desired signal and an inter-antenna distance of the unnecessary signal between the transmission antenna from the particular one of the antenna pairs and the reception antenna from any of the antenna pairs is set such that each of elements of the desired signal of a matrix which defines the transmission characteristic can be represented only by a real number term corresponding to the desired signal while each of elements of the unnecessary signal of the matrix which defines the transmission characteristic can be represented only by a different real number term corresponding to the unnecessary signal.

9. The wireless transmission system according to claim 8, wherein said transmission characteristic correction unit carries out the correction calculation regarding the real number term and the correction calculation regarding the different real number term, and adds a corrected signal regarding the real number term and a corrected signal regarding the different real number term regarding a channel of a different reception antenna to acquire an output signal corresponding to a desired transmission subject signal.

10. The wireless communication system according to claim 8, wherein, where a wavelength of a demodulation carrier signal used in said demodulation functional unit is represented by $\lambda c$ and a phase characteristic which relies upon directivity of the antenna pairs is represented by zero, a path difference which is a difference between an inter-antenna distance of the desired signal and an inter-antenna distance of the unnecessary signal is set to $(n/2)\lambda c$, n being a positive integer equal to or higher than 1.

11. The wireless communication system according to claim 10, wherein n is an even number and the path difference is set to $m\lambda c$ where m is a positive integer equal to or greater than 1.

12. The wireless communication system according to claim 10, wherein n is an odd number and the path difference is set to $(m-\frac{1}{2})\lambda c$ where m is a positive integer equal to or greater than 1.

13. The wireless communication system according to claim 10, wherein, where a radiation angle of the desired signal from the transmission antenna of the first one of the antenna pairs and an incidence angle of the desired signal to the reception antenna of the first one of the antenna pairs are represented by $\theta 1$;
   a radiation angle of the unnecessary signal from the transmission antenna of the second one of the antenna pairs and an incidence angle of the unnecessary signal to the reception antenna of the first one of the antenna pairs are represented by $\theta 2$; and
   phase characteristics which rely upon a directivity of the transmission antenna of the first one of the antenna pairs and the reception antenna of the first one of the antenna pairs are represented by $\phi a(\theta 1)$ and $\phi a(\theta 2)$, respectively, the path difference is corrected by $-(\phi a(\theta 2)-\phi a(\theta 1))/\Pi) \lambda c$.

14. The wireless communication system according to claim 8, further comprising:
   a modulation functional unit associated with each of the antenna pairs, the modulation functional unit being configured to generate a modulated carrier signal by modulating a carrier signal with a desired transmission subject signal,
   wherein carrier signals used by the modulation functional unit and carrier signals used by the demodulation functional unit have a common frequency to all of the channels.

15. A communication method for a wireless communication system which includes antenna pairs, a radio signal radiated from a transmission antenna of a first one of the antenna pairs arriving as a desired signal at a reception antenna of the first one of the antenna pairs while a radio signal radiated from a transmission antenna of another one of the antenna pairs different from the first one of the antenna pairs arriving as an unnecessary signal at the reception antenna of the first one of the antenna pairs, the wireless communication method comprising the steps of:
   modulating, by a wireless communication device on a transmission side, only an amplitude of a carrier signal for all channels of transmission subject signals and transmitting modulated carrier signals by space division multiplexing by wireless;
   using, by a wireless communication device on a reception side, envelope detection or square-law detection for the modulated carrier signals received for all the channels to acquire demodulation signals;
   performing, by the wireless communication device on the reception side, correction calculation based on a transmission characteristic of a transmission space among the transmission antennas and reception antennas based on the demodulation signals individually corresponding to the reception antennas to acquire output signals corresponding to the transmission subject signals;
   performing, for each of the channels respectively of the reception antennas, correction calculation regarding a real number term corresponding to the desired signal and correction calculation regarding a different real number term corresponding to the unnecessary signal for demodulation components; and
   adding a corrected signal regarding the real number term and a corrected signal regarding the different real number term regarding a channel of a different reception antenna to acquire an output signal corresponding to a desired transmission subject signal.

16. The wireless communication method according to claim 15, wherein path differences each of which is a difference between an inter-antenna distance of the desired signal and an inter-antenna distance of the unnecessary signal is set such that each of elements of the desired signal of a matrix which defines the transmission characteristic can be represented only by the real number term while each of elements of the unnecessary signal of the matrix which defines the transmission characteristic can be represented only by the different real number term.

17. The wireless communication method according to claim 15, wherein, where a wavelength of a demodulation carrier signal is represented by $\lambda c$ and a phase characteristic which relies upon directivity of the antenna pairs is represented by zero, a path difference which is a difference between an inter-antenna distance of the desired signal and an inter-antenna distance of the unnecessary signal is set to $(n/2)\lambda c$, n being a positive integer equal to or higher than 1.

* * * * *

UNITED STATES PATENT AND TRADEMARK OFFICE
CERTIFICATE OF CORRECTION

PATENT NO.       : 8,687,725 B2                                       Page 1 of 1
APPLICATION NO.  : 12/805875
DATED            : April 1, 2014
INVENTOR(S)      : Norihito Mihota It is certified that error appears in the above-identified patent and that said Letters Patent is hereby corrected as shown below:

Title Page

Item (75) Inventor: should read:

-- Norihito Mihota, Saitama (JP) --

Signed and Sealed this
Fifteenth Day of July, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,687,725 B2 | Page 1 of 1 |
| APPLICATION NO. | : 12/805875 | |
| DATED | : April 1, 2014 | |
| INVENTOR(S) | : Norihito Mihota | |

It is certified that error appears in the above-identified patent and that said Letters Patent is hereby corrected as shown below:

Title Page

Item (12) "Mihoto" should read -- Mihota --

Item (75) Inventor: should read:

-- Norihito Mihota, Saitama (JP) --

This certificate supersedes the Certificate of Correction issued July 15, 2014.

Signed and Sealed this
Fifth Day of August, 2014

Michelle K. Lee
*Deputy Director of the United States Patent and Trademark Office*